United States Patent
Noel et al.

[11] Patent Number: 6,125,430
[45] Date of Patent: Sep. 26, 2000

[54] VIRTUAL MEMORY ALLOCATION IN A VIRTUAL ADDRESS SPACE HAVING AN INACCESSIBLE GAP

[75] Inventors: Karen Lee Noel, Pembroke; Michael Seward Harvey, Hollis, both of N.H.

[73] Assignee: Compaq Computer Corporation, Houston, Tex.

[21] Appl. No.: 09/183,677

[22] Filed: Oct. 30, 1998

Related U.S. Application Data

[63] Continuation of application No. 08/642,706, May 3, 1996, Pat. No. 5,978,892.

[51] Int. Cl.[7] .................................................. G06F 9/45
[52] U.S. Cl. ........................ 711/152; 711/153; 711/202; 711/203
[58] Field of Search .................................. 711/152, 153, 711/163, 202, 203; 395/703

[56] References Cited

U.S. PATENT DOCUMENTS

| | | | |
|---|---|---|---|
| 4,907,151 | 3/1990 | Bartlett | 711/166 |
| 5,088,036 | 2/1992 | Ellis et al. | 711/206 |
| 5,301,327 | 4/1994 | McKeeman et al. | 395/703 |
| 5,355,469 | 10/1994 | Sparks et al. | 395/183.14 |
| 5,491,808 | 2/1996 | Geist, Jr. | 711/100 |
| 5,535,329 | 7/1996 | Hastings | 395/183.11 |
| 5,555,385 | 9/1996 | Osisek | 711/1 |
| 5,559,980 | 9/1996 | Connors et al. | 711/100 |
| 5,644,709 | 7/1997 | Austin | 395/185.06 |
| 5,835,961 | 11/1998 | Harvey et al. | 711/206 |

*Primary Examiner*—Eddie P. Chan
*Assistant Examiner*—Than Nguyen
*Attorney, Agent, or Firm*—Sharp, Comfort & Merrett, P.C.

[57] ABSTRACT

A new virtual memory system is disclosed having a virtual address space including a gap of inaccessible virtual addresses within the virtual address space. A new virtual memory allocation routine is disclosed providing a starting address of accessible virtual addresses allocated to a currently executing process in a response to a request. The accessible virtual addresses are virtually contiguous, and include no addresses from within the gap of inaccessible virtual addresses. A new virtual memory deallocation routine is further disclosed providing deallocation of ranges of virtual addresses which may or may not include addresses within the inaccessible gap.

7 Claims, 27 Drawing Sheets

VIRTUAL MEMORY ALLOCATION IN A VIRTUAL ADDRESS SPACE HAVING AN INACCESSIBLE GAP

RELATED APPLICATIONS

This application is a continuation of U.S. patent application Ser. No. 08/642,706 filed May 3, 1996, now U.S. Pat. No. 5,978,892, the entire teachings of which are incorporated herein by reference.

FIELD OF THE INVENTION

The disclosed invention relates generally to memory management in computer systems, and more specifically to a system and method for allocating and deallocating virtual memory to a process where the virtual memory system includes an inaccessible gap within the virtual address space.

BACKGROUND OF THE INVENTION

One of the elements within a computer operating system is memory management. Memory management consists of hardware and software that controls the allocation and use of physical memory. The effect of memory management is exemplified in multiprogramming systems in which several processes reside in memory at the same time. Memory management typically includes a virtual memory system. The virtual memory system provides the CPU (central processing unit) with mapping information. The CPU generates virtual addresses when an image is executed. Before these virtual addresses can be used to access instructions and data, they must be translated into physical addresses. Memory management software maintains tables of mapping information (page tables) that keep track of where each page of virtual addresses is located in physical memory. The CPU uses this mapping information when it translates virtual addresses to physical addresses. The mapping of virtual addresses through page tables in a virtual memory system provides a large virtual address space, and allows programs to run on hardware with smaller physical memory configurations.

The range of virtual addresses is referred to as the virtual address space. The virtual address space is that set of virtual addresses accessible by the current process. A process is current when its process context is loaded into the CPU and the process is actively executing. Only one process may be current on a given CPU at a given time. In existing systems, the virtual address space is divided into a shared address space, sometimes referred to as the system address space, and a per-process address space. The per-process address space is referred to as process private space. The shared address space maps code and data shared by all processes, and that is available to any process that is current. The shared address space may for example contain operating system code and data used by all processes. The process private space maps code and data associated with and available to one specific process only when that specific process is current. When the process context is changed, a new process is made current, and the mapping of process private space is changed to map process private space to process private code and data of that process.

A page table is typically used to map the virtual address space to physical memory, in units of "pages". A page is a multibyte unit of memory having a predetermined size. The specific size of a page varies from system to system. A page table contains page table entries (PTEs), each one of which defines a relationship (referred to as a "mapping") between a single virtual page and a physical page of memory. The physical address of a physical page of memory is referred to as a page frame number (PFN). Thus a given virtual page of memory is "mapped" to a page of physical memory by a specific PTE, and similarly that physical page of memory is "mapped" to the virtual page by that specific PTE. The PTE in that case is referred to as "mapping" the virtual page and the physical page of memory.

In existing computer systems, page table entries within a page table may be located in either process private or shared space. Where page table entries mapping process private space for a given process are located within process private space, the contents of those page table entries can ordinarily only be accessed when that specific process is current. Thus for a process to access the process private page table entries of another process, a context switch is typically required.

As computer systems evolve, the size of the virtual addresses they support grows. For example, some newer generations of computer systems use 64 bit virtual addresses, in contrast with past generations in which smaller sizes were used. The amount of virtual address space that may be addressed by a process on such newer systems is potentially as large as is permitted by the larger virtual address size. However, implementing the full range of virtual space permitted by such larger virtual address sizes may be prohibitively costly in terms of hardware bits in a virtual to physical address translation cache, the size of page tables required to map the entire space, or the complexity of accessing page table entries within such large page tables.

As a result, it is desirable to implement only a subset of the full range of virtual space permitted by large virtual address sizes. Implementation of a subset of the full range of virtual space would result in one or more "gaps" within the virtual address space. Such resulting gaps would be areas of the virtual address space for which no page table entries could be obtained to map physical memory. Accordingly virtual addresses within such gaps could not be accessed by a process that is currently executing. In a typical existing process, attempts by an existing process to access a virtual address within any inaccessible gap in the virtual address space result in an execution error.

In existing systems, when a process is initially created, some minimal set of virtual addresses is allocated to that process in order that the process may execute. When the process executes, it issues requests to the operating system for allocation and/or deallocation of further virtual addresses according to its resource needs. The allocation of virtual addresses by the operating system typically involves addition of page table entries to the page table structure. These newly added page table entries are subsequently used to map the newly allocated virtual addresses to physical memory. When a deallocation request is subsequently received to deallocate those virtual addresses, the operating system removes the page table entries from the page table.

In existing systems the executing process is permitted to allocate virtual addresses only within a predetermined virtually contiguous range of virtual addresses. No accommodation is made for any gaps in the virtual address space, and consequently inaccessible gaps in the virtual address space cannot exist within the range of virtual addresses that may be allocated to the executing process. As a result, the range of virtual addresses that may be allocated by an executing process must be fully implemented by the operating system. As the range of virtual addresses that may be allocated by an executing process is advantageously a very large portion of the total virtual address space, the lack of gap accommodation in existing systems imposes a significant limitation with regard to flexibility. Moreover, as computer systems continue to develop, the amount of virtual address space needed for process execution will increase, thus exacerbating the problem.

For these reasons and others there is required a new memory management and virtual addressing system in which the entire virtual address space need not be implemented. In the new system the currently executing process must be allocated virtual addresses in spite of any gaps of inaccessible virtual addresses located anywhere in the virtual address space of the system. The new system should specifically permit one or more gaps to be present within the range of virtual addresses which may be allocated to the executing process. And the new system should be easily extensible to future implementations in which any gaps of inaccessible virtual addresses are decreased or eliminated.

SUMMARY OF THE INVENTION

In accordance with principles of the invention there is disclosed a new virtual memory system. In a first aspect of the invention there is disclosed a virtual memory system having a virtual address space including a gap of inaccessible virtual addresses within the virtual address space.

A new virtual memory allocation routine is disclosed providing a starting address of a range of accessible virtual addresses to a currently executing process. The currently executing process is the requesting process. The disclosed virtual memory allocation routine allocates virtual memory to the requesting process by adding page table entries to the page table structure of the requesting process that map a range of virtual addresses. The requesting process indicates the length of the request, as well as a first free virtual address within a virtual memory region associated with the request. Any gap of inaccessible addresses within the virtual memory region is described in part by a gap base and a gap limit, describing the beginning and end of the gap respectively.

The disclosed virtual memory allocation routine calculates an end virtual address of the request equal to a sum of the first free virtual address in the region plus the byte length of the request. If the calculated end address is within a gap of inaccessible virtual addresses, the allocation routine sets the starting address to be returned to the requester to the gap limit. Further the allocation routine also sets the starting address to the gap limit if the first free virtual address is less than the gap base, and the calculated end address is greater than or equal to the gap limit.

The disclosed virtual memory allocation routine sets the starting address to the first free virtual address of the virtual memory region if the first free virtual address is less than the gap base, and the calculated end address is less than or equal to the gap base. The allocation routine also sets the starting address to the first free virtual address of the region if the first free virtual address and the calculated end address are both greater than or equal to the gap limit.

In an example embodiment of the present system, the disclosed virtual memory system includes a virtual address format having a length of m bits, where bits 0 through n−1 map the virtual address to a physical address, and where bits n through m−1 contain all zeros or all ones to match the value of bit n−1. In the example embodiment, a virtual address space is provided including a gap of inaccessible virtual addresses located halfway between a highest virtual address and a lowest virtual address, and having a size equal to $2^m - 2^n$.

A new virtual memory deallocation routine is also disclosed for deallocating a requested amount of virtual memory by removing from the page structure page table entries mapping virtual addresses within a specified range. The virtual memory deallocation routine successfully handles requests for deallocation requests where a length of the specified range provided by the requester either includes or does not include the size of a gap of inaccessible virtual memory within the specified range.

In this way there is provided a new memory management and virtual addressing system in which the entire virtual address space need not be implemented. In the new system the currently executing process may be allocated new virtual addresses even in the presence of gaps of inaccessible virtual addresses located anywhere in the virtual address space of the system. The new system permits one or more gaps to be present within the range of virtual addresses which may be allocated to the executing process. And the new system is easily extensible to future implementations in which any gaps of inaccessible virtual addresses are decreased or eliminated.

BRIEF DESCRIPTION OF THE DRAWINGS

The foregoing features and other aspects of the invention will now become apparent when the accompanying description is read in conjunction with the following drawings in which.

DETAILED DESCRIPTION OF THE PREFERRED EMBODIMENTS

Figure 1:
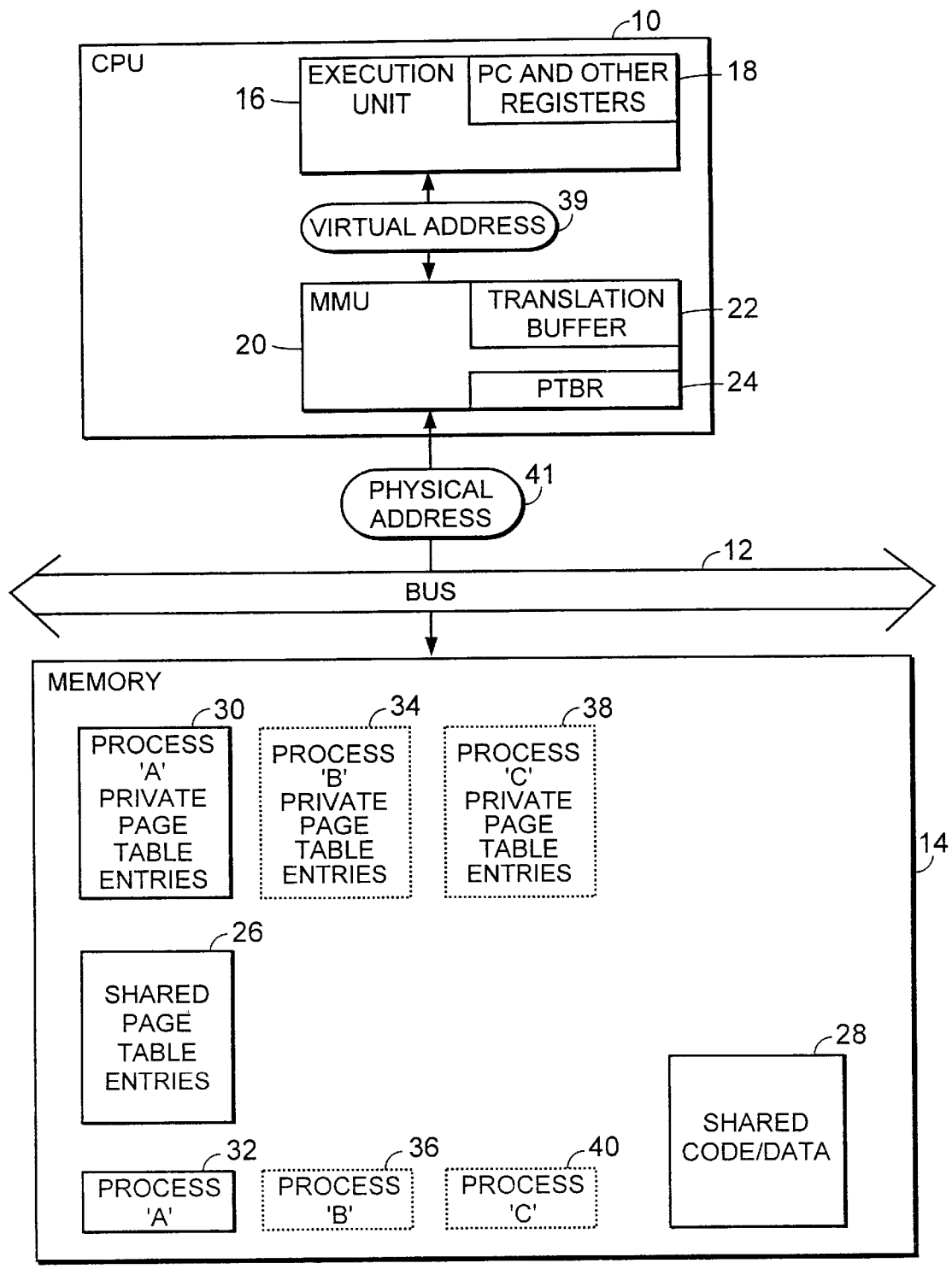
FIG. 1 is a block diagram showing an example embodiment of a virtual memory system.

Now with reference to FIG. 1, an example embodiment of a virtual memory system is described. FIG. 1 shows a computer system including an example memory management system and virtual memory system. A central processing unit (CPU) 10 is shown coupled with a bus 12, which in turn is coupled with a memory 14. The CPU 10 is shown including a execution unit 16 having a program counter (PC) and other registers 18, coupled with a memory management unit 20. The memory management unit 20 is shown including a translation buffer 22 as well as a page table base register (PTBR) 24. The execution unit 16 is coupled with the memory management unit 20.

In the example embodiment of FIG. 1, a process is the basic entity scheduled and executed on the CPU 10. Useful programs may be run by a user within a given process. Each process consists of an address space and process context information. The process context information defines the state of execution of a given process, with respect to certain predefined register and variable values, for example including the values of the PC and other registers 18 and the PTBR 24.

When a process is to be executed, the process context for that process is first made current, for example by writing the values of the PC and other registers 18 and the PTBR 24. The specific process being executed is referred to as the current process. When the current process is changed, this is referred to as a context switch. The current process context defines the mapping of the virtual address space to physical memory by indicating the page table entries to be used for virtual address translation by the memory management unit 20. This indication to the memory management unit is made by loading an address indicating process private page table entries of a current process into the PTBR 24, for example when a context switch is made.

The memory 14 in FIG. 1 is shown including process private code and data for several processes, as well as shared code and data. The memory 14 is further shown including page table entries mapping the virtual addresses of the process private code and data, as well as the shared code and data, to physical memory.

Specifically in FIG. 1, the memory 14 is shown including process private page table entries 30, mapping the process private code and data within the process 'A' 32, as well as shared page table entries 26 mapping the shared code and data 28. In the example of FIG. 1, process 'A' 32 is currently executing, and the code and data within process 'A' 32, as well as the shared code and data 28 are mapped by the current address space as defined by the current process context. Shared code and data 28 for example includes operating system services, routines, functions and data available to any currently executing process. Non-current processes 'B' 36 and 'C' 40 are also shown within the memory 14. Further in memory 14 are shown process B private page table entries 34 and process C private page table entries 38, for mapping process private code and data within the processes B 36 and C 40 respectively.

During operation of the elements shown in FIG. 1, CPU 10 uses physical addresses 41 to read the contents of memory locations within the memory 14. For example, when process 'A' 32 is executing, the PC holds the virtual address of an instruction to be executed. As the CPU executes instructions from process A 32 pointed to by the PC, the memory management unit 20 translates virtual addresses 39 within those instructions into physical addresses 41. The memory management unit 20 uses the contents of the page table base register 24 to access the process 'A' private page table entries 30 and the shared page table entries 26 in order to obtain the physical addresses 41 of code or data in process A 32 itself or of the shared code and data 28.

Further during operation of the elements shown in FIG. 1, as the memory management unit 20 translates the virtual addresses 39 into physical addresses 41, a predetermined number of these translations are stored within the translation buffer 22. Those translations stored within the translation buffer 22 may be accessed more quickly than translations obtained by accessing the process A private page table entries 30 or shared page table entries 26. When a translation stored within the translation buffer 22 is determined to be no longer valid, for example as result of a context switch, that translation must be invalidated so that it is no longer used by the memory management unit 22.

Thus it is seen in the example of FIG. 1 that virtual addresses 39 are translated by the memory management unit 20 into physical addresses 41. Code and data within process A 32 and the shared code and data 28 are accessible in the current virtual address space. As operation of the system continues, and the current process is switched through a context switch, one of either process B 36 or process C 40 will become current. When process B 36, for example, becomes current, the location of page table entries within process B private page table entries 34 will be indicated by the PTBR 24. Subsequently, code or data within process B 36 may be accessed by assertion of virtual addresses 39 to the memory management unit 20. Code and data within process B 36 and the shared code and data 28 are then both accessible. It is thus apparent that at any single given time, the code or data for a currently executing process as well as the shared code and data 28 are accessible through the virtual address space.

Figure 2:
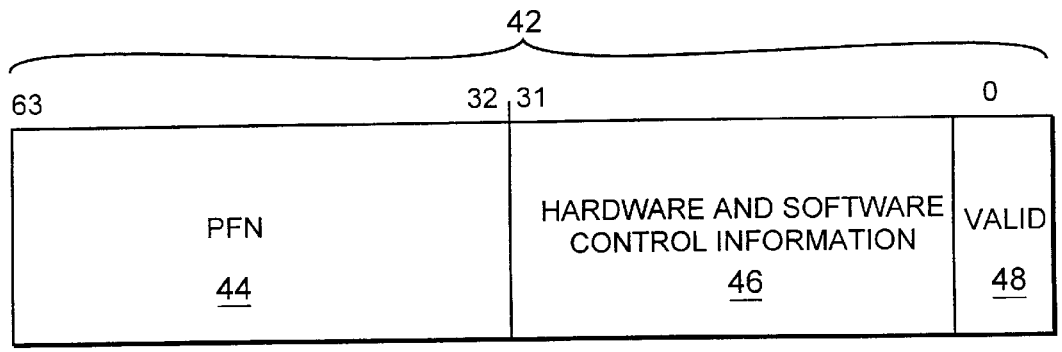
FIG. 2 is a block diagram showing the format of an example embodiment of a page table entry.

Now with regard to FIG. 2 an example embodiment of a page table entry is described. The process private page table entries 30, 34, and 38 as shown in FIG. 1 for example consist of one or more page table entries having the format as shown in FIG. 2. Similarly the shared page table entries 26 as shown in FIG. 1 are also for example of the format shown in FIG. 2.

The example page table entry shown in FIG. 2 includes a page frame number (PFN) 44, hardware and software control information 46, and a valid bit 48. The PFN 44 includes some pre-determined number of bits of the physical address of the page of physical memory mapped by that page table entry 42. The predetermined number of bits of the physical address are for example sufficient to indicate a page of physical memory. The PFN 44 is thus a physical address specifying a page of physical memory. In this way each page table entry maps a page of virtual addresses to a physical page of memory. The hardware and software control information 46 includes such information as protection codes defining a level of access required for a process to reference the page of physical memory mapped by the page table entry 42. The valid bit 48 indicates the validity of, among other things, the page frame number 44. For example, if the valid bit is 1, then the page frame number 44 provides a valid mapping of a virtual page to a physical page that may be used by the memory management unit 20 as shown in FIG. 1.

Figure 3:
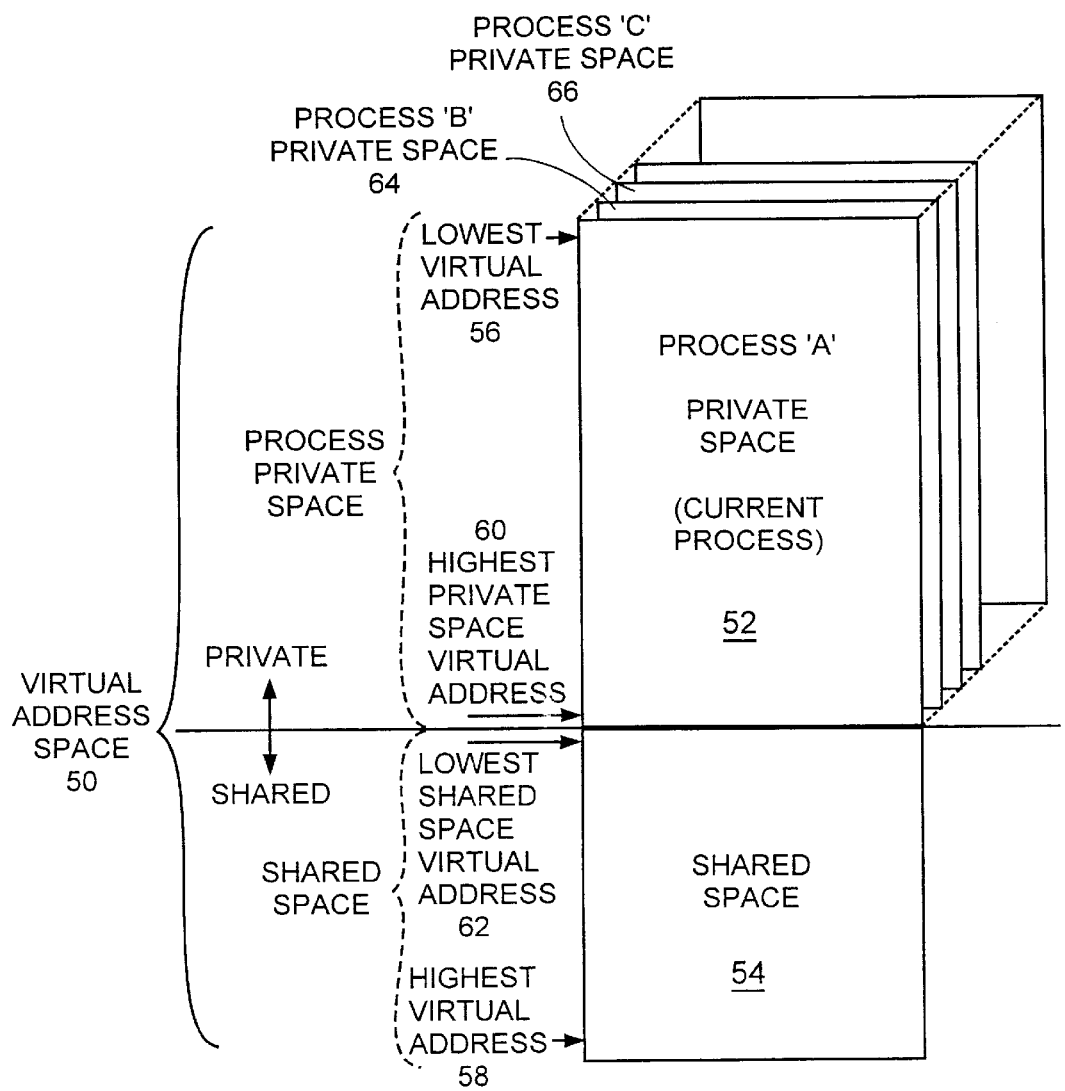
FIG. 3 is a block diagram showing an example embodiment of a virtual address space divided into process private and shared space.

Now with regard to FIG. 3 an example embodiment of a virtual address space divided into process private and shared space is described. In FIG. 3 there is shown a virtual address space 50 divided into a process private space 52, for example mapping code and data within process A 32 of FIG. 1, and further including a shared space 54 for example mapping the shared code and data 28 in FIG. 1. The virtual address space 50 is shown extending from a lowest virtual address 56 to a highest virtual address 58. The process private space is shown extending from the lowest virtual address 56 up to a highest private space virtual address 60. The shared space 54 is shown extending between a lowest shared space virtual address 62 and the highest of virtual address 58.

Further shown in FIG. 3 is the process B private space 64 and process C private space 66. Since process B and process C are not the current process (process A is the current process) the process private virtual addresses in the process private space 52 do not currently map code and data from within process B or process C. This results because the process private portion of a non-current process's virtual address space is not resident in the currently active virtual address space. Accordingly any virtual address translated by the memory management unit 20 as shown in FIG. 1, that lies between the lowest virtual address 56 and the highest process private space virtual address 60, will be translated by the process A private page table entries 30. Upon assertion of a virtual address between the lowest shared space virtual address 62 and the highest virtual address 58, the memory management unit 20 maps that virtual address to a physical address of shared code and data 28.

Continuing with regard to the elements shown in FIG. 3, when a context switch occurs, and for example process-B 36 becomes the current process, then a new process context is loaded into the CPU 10. The new process context includes loading an address into the PTBR 24 indicating one or more of the process B private page table entries 34. Accordingly, after the context switch, process private virtual addresses between the lowest virtual address 56 and the highest process private virtual address 60 are mapped to the code and data for process B. However, after the context is switched so that process B is the current process, virtual addresses between the lowest shared space of virtual address 62 and the highest virtual address 58 continue to be mapped to the shared code and data 28. Thus it is shown that shared code and data continues to be mapped by the virtual address space independent of the currently executing process.

Figure 4:
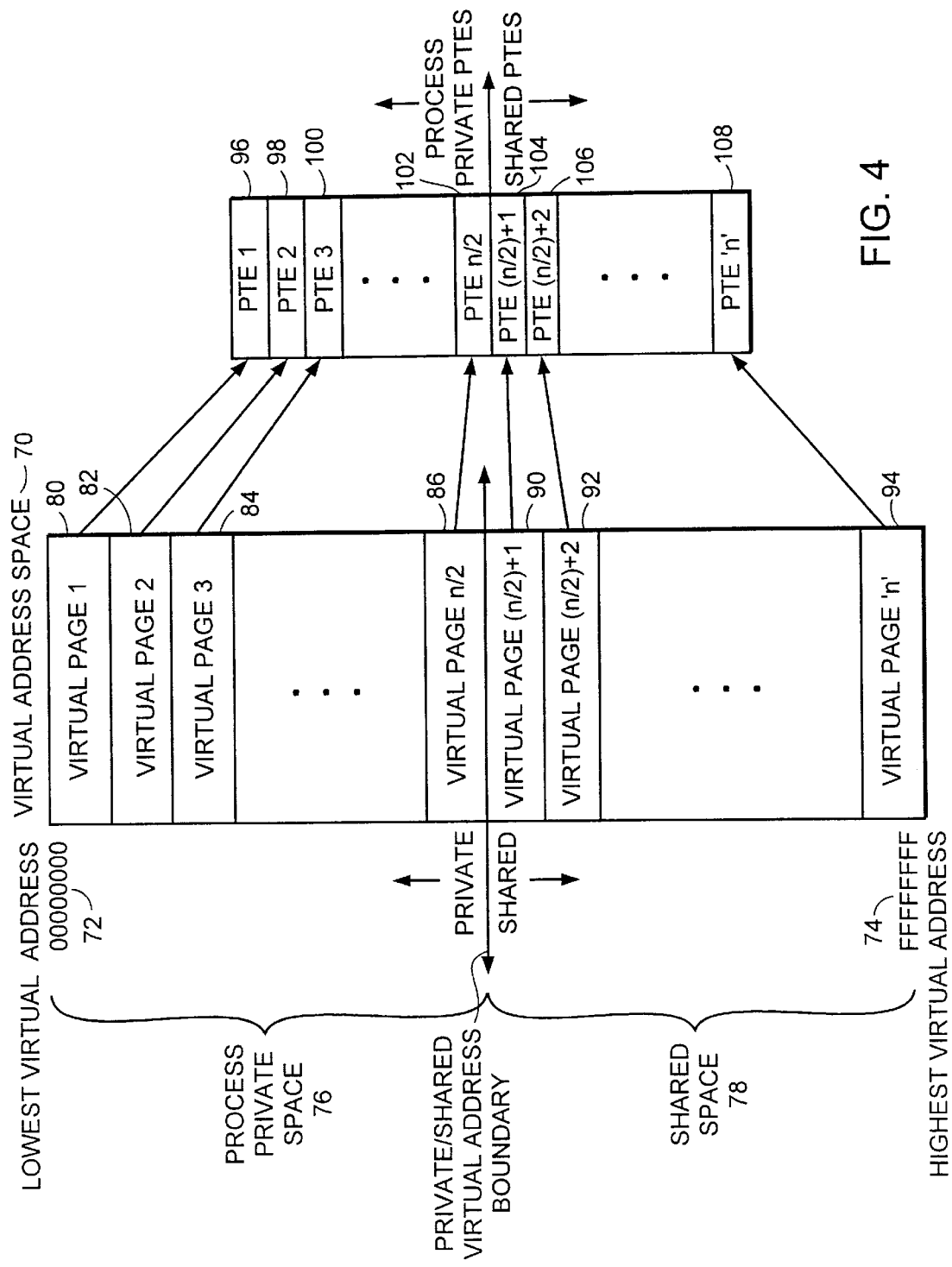
FIG. 4 is a block diagram showing an example embodiment of a virtual memory system having an even split allocation of process private space and shared space.

Now with regard to FIG. 4 is described an example embodiment of a virtual memory system providing an even split allocation of process private space and shared space. FIG. 4 shows a virtual address space 70 including a process private space 76 as well as a shared space 78. For purposes of example, the virtual address space 70 maps 'n' pages of virtual addresses. The virtual address space 70 accordingly includes virtual pages 1 through 'n', for example virtual page 1 80, virtual page 2 82, virtual page 3 84, virtual page n/2 86, virtual page (n/2)+1 90, (n/2)+2 92, up to virtual page 'n' 94. The virtual address space 70 extends from a lowest virtual address 72 up to a highest virtual address 74. The lowest virtual address 72 is shown for example as a 32 bit address, equal to 00000000 (hexadecimal). The highest virtual address 74 is shown for example also as a 32 bit address, equal to FFFFFFFF (hexadecimal).

During operation of the elements shown in FIG. 4, when a virtual address within virtual page 1 80 is translated by the memory management unit 20, that translation is based on the mapping information contained in PTE 1 96. Similarly, when a virtual address within virtual page 2 82 is translated by the memory management unit 20, that address is translated based on the mapping information in PTE 2 98. Similarly translations are made for other virtual pages within the virtual address space 70, including virtual page 3 84 by mapping information in PTE 3 100, virtual page n/2 86 by the mapping information in PTE n/2 102 and so on. Thus it is shown that PTE 1 96 through PTE n/2 102 are used to map virtual addresses within the process private space 76. These page table entries are referred to as process private PTES.

PTE (n/2)+1 104 through PTE 'n' 108 are used to map the virtual addresses in the shared space 78. These page table entries are referred to as shared page table entries. In the example of FIG. 4, an even split allocation is made between the process private space 76 and the shared space 78. Accordingly in the example of FIG. 4 the number of virtual pages in the process private space 76 is equal to the number of virtual pages in the shared space 78. Similarly, the number of process private page table entries in FIG. 4 is equal to the number of shared page table entries.

Figure 5:
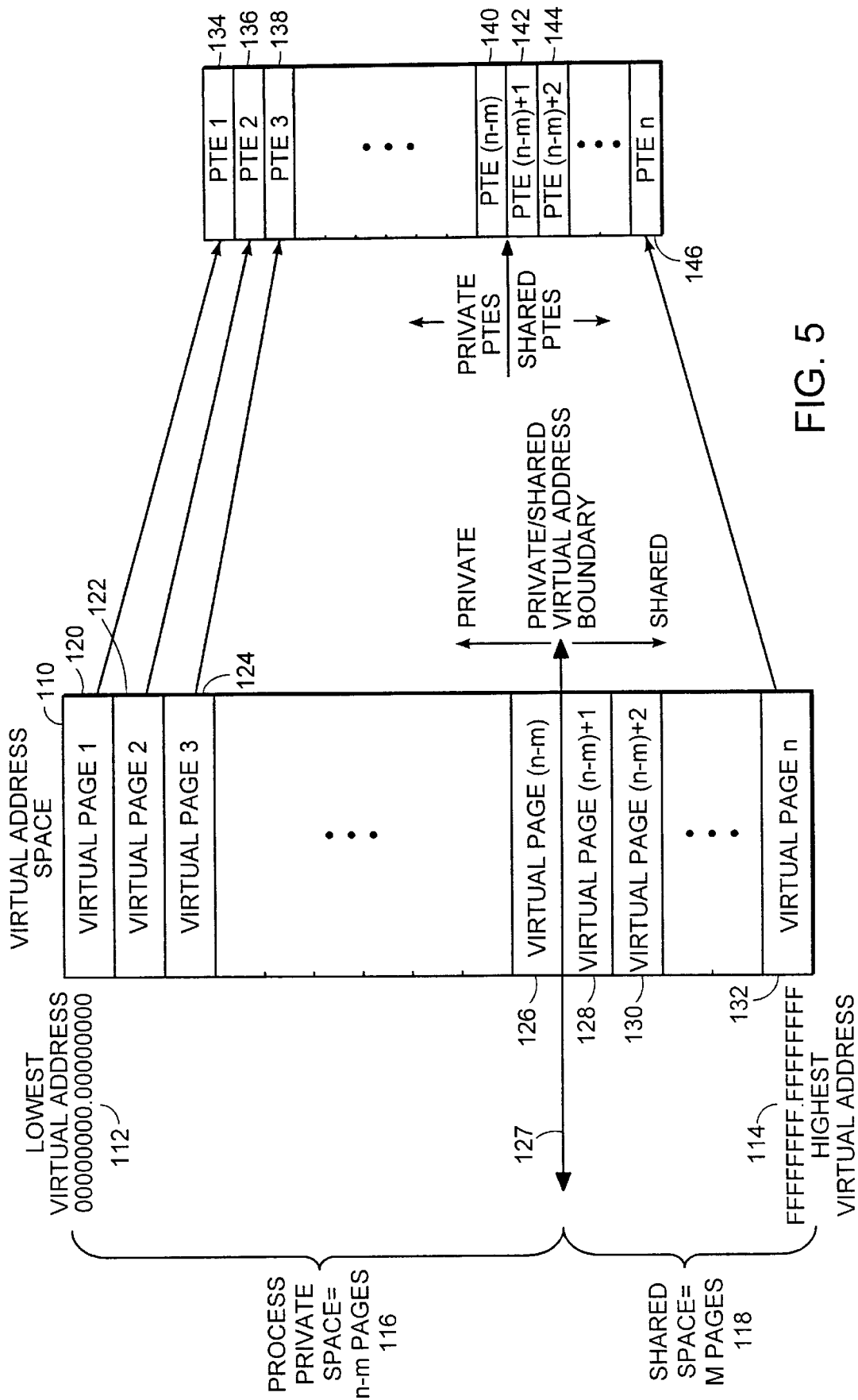
FIG. 5 is a block diagram showing an example embodiment of a virtual memory system having an uneven split allocation of process private space and shared space.

Now with regard to FIG. 5 is described an example embodiment of a virtual memory system providing an uneven split allocation of process private space and shared space. For purposes of example the virtual address space 110 is shown mapping 'n' pages of virtual addresses. A shared space 118 in FIG. 5 is shown including 'm' virtual pages. A process private space 116 in FIG. 5 is shown including 'n'–'m' virtual pages. Accordingly the virtual address space 110 in FIG. 5 is shown including virtual pages 1 through 'n', for example virtual page 1 120, virtual page 2 122, virtual page 3 124, virtual page (n–m) 126, virtual page (n–m)+1 128, virtual page (n–m)+2 130, up through virtual page n 132. The virtual address space 110 in FIG. 5 is shown to extend from a lowest virtual address 112 to a highest virtual address 114. In expressing 64-bit addresses in hexadecimal format, a '.' is inserted between the eight most significant digits and the eight least significant digits as a convention to ease readability. For purposes of example the lowest virtual address 112 is shown as a 64-bit address equal to 00000000.00000000 (hexadecimal). The highest virtual address 114 is shown as a 64-bit address equal to FFFFFFFF.FFFFFFFF (hexadecimal). The boundary between the process private space 116 and the shared space 118 in FIG. 5 is shown by private/shared virtual address boundary 127.

During operation of the elements shown in FIG. 5, virtual addresses within virtual page 1 120 are translated using the contents of PTE 1 134, virtual addresses within virtual page 2 122 are translated using the contents of PTE 2 136, virtual addresses within virtual page 3 124 are translated using the contents of PTE 3 138, and virtual addresses within virtual page n–m 126 are translated using the contents of PTE n–m 140. In this way all process private space virtual addresses are mapped by page table entries 1 through n–m, where n is the total number of virtual pages and m is the number of pages in the shared space 118. Similarly, virtual addresses between (and including) the beginning of virtual page (n–m)+1 128 up to those within virtual page n 132 are mapped by the page table entries (n–m)+1 142 through page table entry n 146. Accordingly, the page table entries 1 through n–m are considered private page table entries, while the page table entries (n–m)+1 through n are considered shared page table entries.

Figure 6:
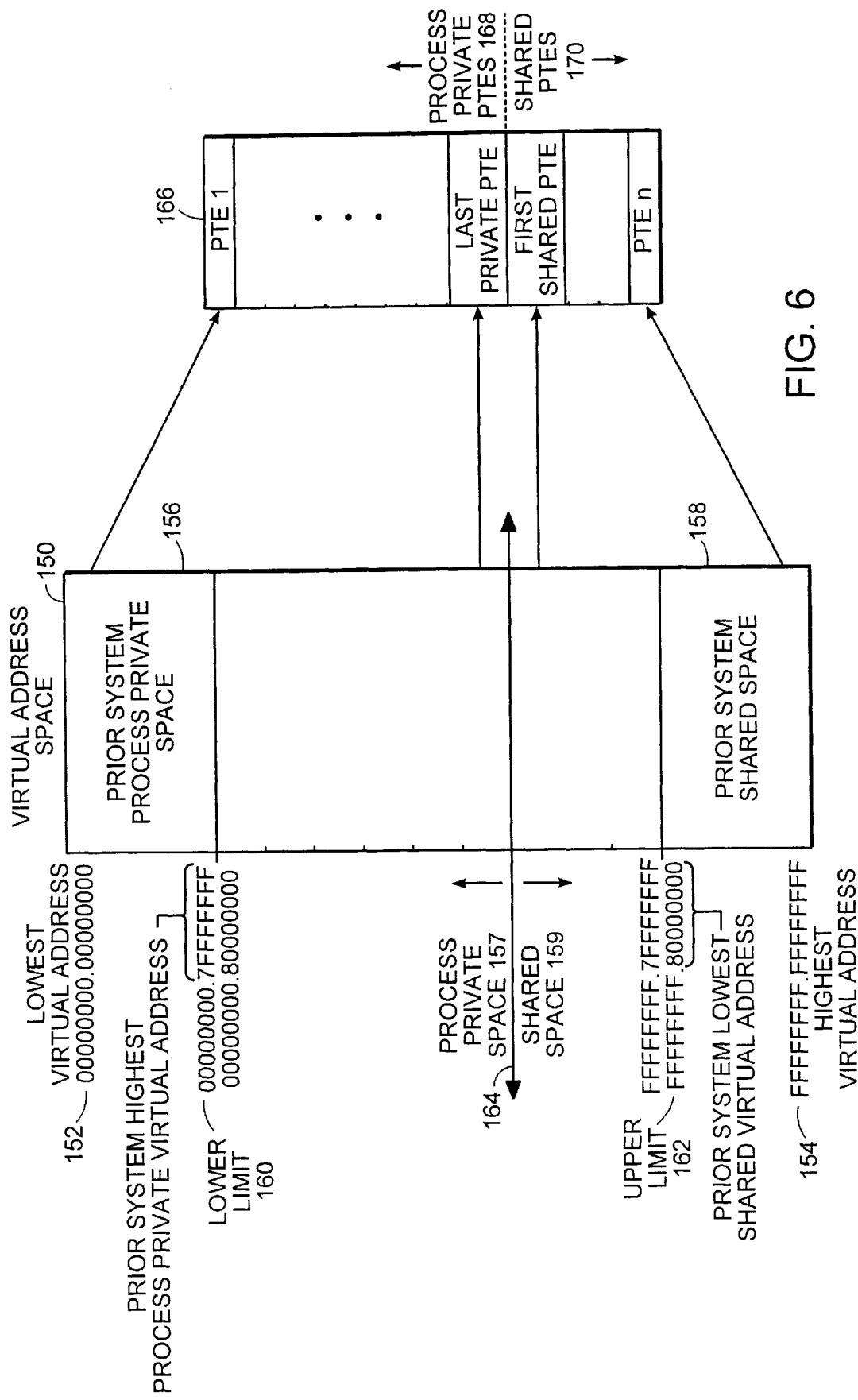
FIG. 6 is a block diagram showing an example embodiment of a virtual memory system having multi-system compatibility.

Now with reference to FIG. 6 an example embodiment of a virtual memory system having multi-system compatibility is described. The embodiment of FIG. 6 provides uneven split virtual address allocation with even split compatibility. In FIG. 6 there is shown a virtual address space 150 including a process private space 157 of a size greater than or equal to a different system process private space 156, as well as a shared space 159 of size greater than or equal to a different system shared space 158. In an example embodiment, the different system is a prior system having even split virtual address allocation and a 32 bit virtual address size, for example as shown in FIG. 4.

The virtual address space 150 is shown extending from a lowest virtual address 152 through a highest virtual address 154. The lowest virtual address 152 is shown for example as a 64-bit address equal to 00000000.00000000 (hex). The highest virtual address 154 is shown for example as a 64-bit address equal to FFFFFFFF.FFFFFFFF (hex). Further in FIG. 6 there is shown a lower limit 160 equal to a 64-bit value in which the lower 32 bits have a value equal to a highest process private virtual address of a different system, for example 00000000.7 FFFFFFF (hex). Further shown in FIG. 6 is an upper limit 162 having a value equal to FFFFFFFF. 80000000 (hex). The upper limit 162 includes as its lower 32 bits the lowest shared virtual address of the different system.

The lower limit 160 is shown having the highest bit value (0) of the highest process private virtual address of the different system extended into its upper 32 bits. Similarly the upper limit 162 is shown having the highest bit value (1) of the prior system lowest shared virtual address extended into its upper 32 bits. A private/shared virtual address boundary 164 is shown lying between the lower limit 160 and the upper limit 162. Similarly process private PTEs 168 are shown mapping those virtual addresses lying below the private/shared virtual address boundary 164. Also shared PTEs 170 are shown mapping those virtual addresses lying above (and including) the private/shared virtual address boundary 164. The process private PTEs 168 and shared PTEs 170 are shown within a page table 166. The page table 166 for example is itself mapped into the virtual address space 150, beginning at a predetermined base virtual address.

As used herein the term "sign-extending" as applied to a virtual address refers generally to the operation of extending the value of a particular bit into those bits located above that bit. The location of the particular bit varies with the specific instance of sign extension being described.

In the example embodiment of FIG. 6, the architecture of the CPU as shown in FIG. 1 as element 10 defines longword (32 bit) load operations such that values being loaded, including pointers or addresses, are "sign-extended" from bit 31 as they are loaded into registers of the CPU 10, for example the registers 18. Such a longword load operation is present in existing CPU architectures. Further in the example embodiment, the size of the PC and other registers 18 is 64 bits. When a 32 bit pointer or address is sign extended during a longword load operation, the value in bit 31 of the pointer or address is extended into bits 32 through 63 of the destination register (where bits are numbered beginning with bit 0). For example, when a 32 bit address equal to F0000000 (hex) is loaded into the registers 18 of FIG. 1 using a longword load operation, the resultant 64 bit register value is FFFFFFFF.F0000000 (hex). Similarly, when a 32 bit address equal to 7 FFFFFFF (hex) is loaded into the registers 18 of FIG. 1 using a longword load operation, the resultant 64 bit register value is 00000000.7 FFFFFFF (hex).

During the operation of the example embodiment of the elements of FIG. 6 and FIG. 1, programs designed to operate on a different system, where the different system includes a 32 bit, even split virtual address space, continue to operate. In the example embodiment, the even split allocation of the different system includes a private space in the lower half of its virtual address space, and a shared space in the upper half of its virtual address space. Those 32 bit virtual addresses in programs designed to operate on the different system are sign extended through longword load operations loading them into registers, such that they continue to point to locations within the prior system process private space 156 when they have a bit 31 value of 0, and such that they continue to point to locations within the prior system shared space 158 when they have a bit 31 value of 1. In this way, to a program having only 32 bit pointers, the prior system private and shared spaces appear to be contiguous, exactly as they appeared on the prior (different) system.

While the example embodiment of FIG. 6 describes a system in which process private space is located in the lower addresses of the virtual address space, and shared space in the higher addresses, an alternative embodiment of the invention is applied to systems in which these locations are reversed. In this alternative embodiment, the addresses below the private/shared virtual address boundary 164 are shared space, while the addresses above the private/shared virtual address boundary 164 are process private. Similarly in this alternative embodiment the lower 32 bits of the lower limit 160 contain the prior system highest shared virtual address, and the lower 32 bits of the upper limit 162 contain the prior system lowest process private virtual address. Accordingly in this alternative embodiment the element 156 indicates the prior system shared space, and the element 158 indicates the prior system process private space.

Figure 7:
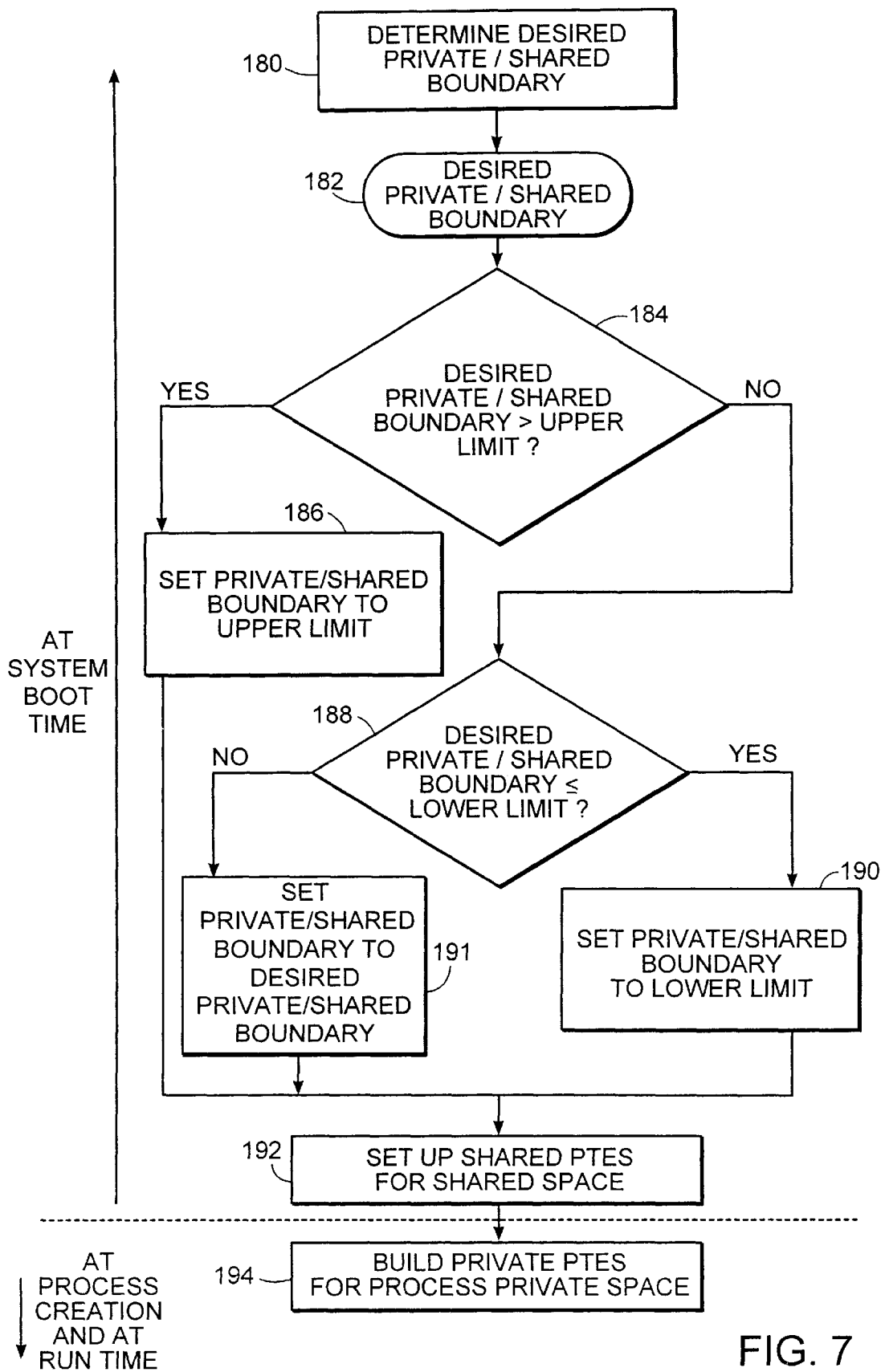
FIG. 7 is a flow chart showing an example embodiment of steps performed to set up a virtual memory system having multi-system compatibility.

Now with reference to FIG. 7 there is described an example embodiment of steps performed to set up a virtual memory system having multi-system compatibility, for example as shown in FIG. 6. FIG. 7 shows steps performed to determine the private/shared virtual address boundary 164 as shown in FIG. 6. The steps of FIG. 7 are performed for example by a software process running at system configuration time in response to inputs from a system administrator.

At step 180 a desired ratio of process private space versus shared space is input. For example this ratio may be input from a system administrator and reflect the work load balance of the computer system in which the virtual memory system operates. Further at step 180, a desired share space size is calculated responsive to the desired ratio of process private space to shared space and the total size of the virtual address space provided by the virtual memory system. And finally in step 180, a desired private/shared virtual address boundary is calculated responsive to the desired shared space size and the total size of the virtual address space. For example, the desired private/shared virtual address boundary is calculated by subtracting the desired shared space size from the total virtual address size.

The output of step 180 is a desired private/shared virtual address boundary 182. At decision block 184, the desired private/shared virtual address boundary 182 is compared with an upper limit, for example the upper limit 162 as shown in FIG. 6. If at step 184 it is determined that the desired private/shared virtual address boundary is greater than the upper limit, then step 184 is followed by step 186. Otherwise step 184 is followed by step 188. At step 186, the private/shared address boundary is set to the upper limit. Step 186 is followed by step 192. At step 188 the desired private/shared virtual address boundary is compared with a lower limit, for example lower limit 160 as shown in FIG. 6. If the desired private/shared virtual address boundary is less than or equal to the lower limit, then step 188 is followed by 190. Otherwise step 188 is followed by step 191.

At step 190 the private/shared virtual address boundary is set to the lower limit plus one. Step 190 is followed by step 192. At step 191 the private/shared virtual address boundary is set to the desired private/shared virtual address boundary. Step 191 is followed by step 192.

At step 192 shared page table entries are set up to map the shared code and data in shared space. Step 192 is followed by step 194. At step 194 private page table entries are set up to map the code and data within a process to process private space.

In the example embodiment of FIG. 7, steps 180, 182, 184, 186, 188, 190, 191 and 192 are performed by a software process running when the computer system is initially configured and booted. Step 194 occurs at process creation and during run time of each particular process.

Figure 8:
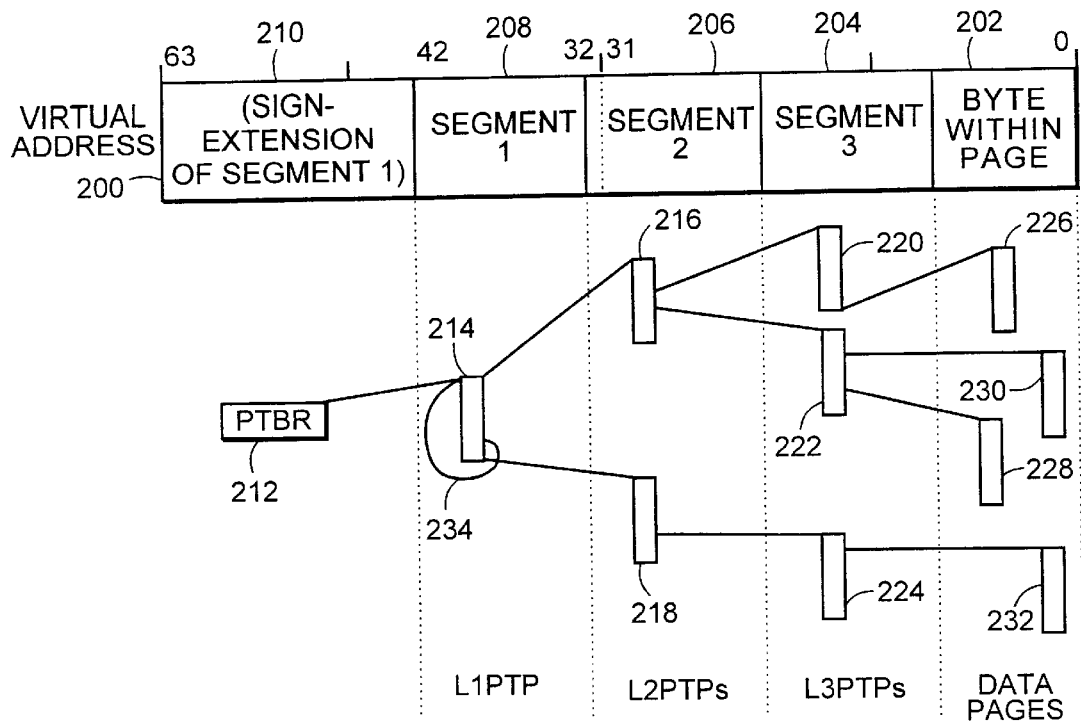
FIG. 8 is a block diagram showing an example embodiment of a page table structure and virtual address format.

Now with reference to FIG. 8, there is described an example embodiment of a page table structure and virtual address. FIG. 8 shows a virtual address 200 including a byte within page field 202, a segment 3 field 204, a segment 2 field 206, a segment 1 field 208, and a "sign extension" of segment 1 210. The bits in the sign extension of segment 1 210 all contain the value of the most significant bit (for example bit 42) of segment 1 208. FIG. 8 further shows a page table base register 212 (PTBR also shown in FIG. 1 as PTBR 24), a level 1 page table page 214, two level 2 page table pages 216 and 218, three level 3 page table pages 220, 222, and 224, and four data pages 226, 228, 230, and 232. The number of level 2 page table pages, level 3 page table pages and data pages in FIG. 8 is given for purposes of example. Other level 2 page table pages, level 3 page table pages and data pages in the present system are omitted from FIG. 8 for purposes of clarity. Further in FIG. 8 there is shown a self-mapper 234 located within the level one page table page 214 and pointing also to the level one page table page 214.

In the example embodiment of FIG. 8, the PTBR 212 contains a pointer (for example a PFN) to a highest level of the current process's page table structure. At that highest level of a given process's page table structure, there is shown for example a single page of page table entries referred to as the level one page table page as shown by element 214 in FIG. 8. The level one page table page 214 includes a number of level one page table entries. Each level one page table entry maps a page table page, at the next lower level in the page table structure, for example one of the level two page table pages as shown by elements 216 and 218 in FIG. 8. Similarly each of the level two page table pages, 216 and 218, includes a number of level two page table entries. Each level two page table entry maps a page table page at the next lower level in the translation hierarchy, for example one of the level three page table pages shown as elements 220, 222, and 224 in FIG. 8. Further, each of the level three page table pages includes a number of level three page table entries. Each of the level three page table entries indicates a data page, for example one of data pages shown as elements 226, 228, 230 and 232. The data pages indicated by the level three page table entries are the pages of physical memory which ultimately contain the code or data mapped to the virtual address 200.

During operation of the elements shown in FIG. 8, the memory management unit 20 translates the virtual address 200 into a physical address based on the contents of the fields within the virtual address 200. The segment one field 208 is an index into the level one page table page, selecting a particular level one page table entry, which indicates a specific level two page table page for the next stage of translation. The segment two field 206 then is used to index into the selected level two page table page in order to select a level two page table entry, which indicates a specific level three page table page for the next stage of translation. The segment three field 204 is then used to index into that level three page table page to select a level three page table entry, which in turn indicates a specific page of physical memory containing code or data. Next the byte within page field 202 of the virtual address 200 is used to select a specific byte address within the indicated physical memory page. The page table entry within the level three page table page is thus the page table entry ultimately mapping the virtual address to a page of physical memory.

For example consider the below virtual address in which the bit fields yield the following values:

virtual address–00000000.00800004

Segment one bit field—0

Segment two bit field—1

Segment three bit field—0

Byte within page—4

Further during operation of the elements shown in FIG. 8, the self-mapper 234 is used to map the page table structure itself into the virtual address space. The self-mapper 234 is a predetermined one of the page table entries within the level one page table page 214, configured to point to the beginning of the level one page table page 214. When a virtual address is translated that includes a segment 1 value indexing the self-mapper 234, the translation logic or code accesses the level one page table page 214 for a second iteration in the translation, as if the level one page table page 214 were a next lower level page table page, for example one of the level two page table pages. This configuration of the self-mapper 234 creates a a portion of the total virtual address space, referred to as "page table space", that is exactly large enough to contain all page table entries necessary to map the total virtual address space. This configuration of the self-mapper also causes the page table entries that map the process private portion of the virtual address space are themselves process private, and the page table entries that map the shared portion of the virtual address space are themselves shared. Accordingly, the process private page table entries within page table space are context switched between processes along with the process private space they map when operating system swaps context from one process to another.

In other example embodiments, the page size and/or number of levels in the page table hierarchy may for example be increased or decreased, thus mapping greater or lesser amounts of virtual space. For example a full 64-bit virtual address may be used to provide a larger virtual address space. In the example implementation of FIG. 8, an 8KB page size and three levels of page table allow the example system to map 8 TB of virtual memory for a single process. To map the entire 8 TB address space available to a single process, the example embodiment uses 8 GB of PTEs, each PTE having for example a length equal to 8 bytes.

Accessing a Page Table Entry Mapping a Predetermined Physical Page of Memory

Figure 9:
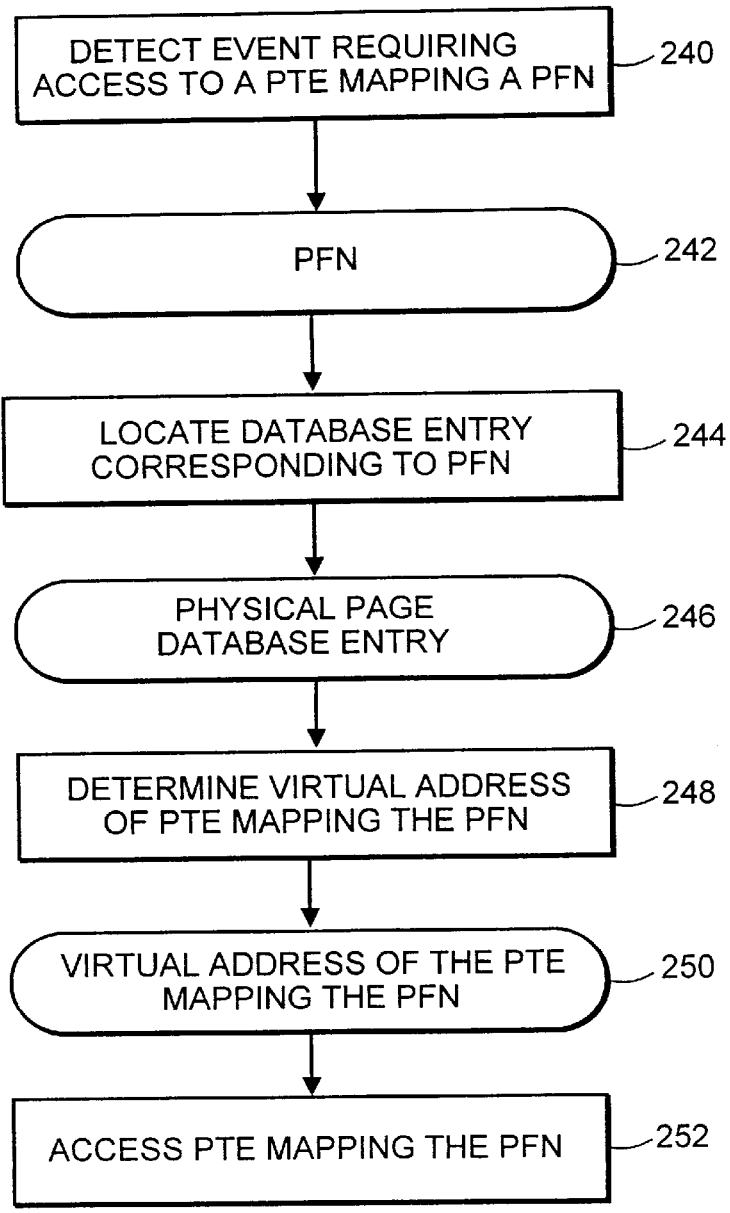
FIG. 9 is a flow chart showing an example embodiment of steps performed to access a page table entry mapping a predetermined physical page.

Now with reference to FIG. 9, there is described an example embodiment of steps performed to access a page table entry mapping a pre-determined physical page. The steps of FIG. 9 are for example performed by a software process executing on the computer system shown in FIG. 1. At step 240 an event requiring access to a page table entry mapping a specific page of physical memory is detected. The specific physical page is referred to by its PFN, or "page frame number", which is the physical address of that page of physical memory.

The output of step 240 is a PFN 242 identifying the page of physical memory mapped by the PTE that is to be accessed. The PFN 242 is passed to step 244. At step 244 the system locates an entry within a physical page data base. In the example embodiment, a physical page data base is maintained by the operating system. The physical page data base includes a number of physical page data base entries. Each one of the physical page data base entries includes information regarding an associated page of physical memory identified by a particular PFN. Searching for a specific physical page data base entry within the physical page data base may for example be accomplished using conventional searching techniques using a given PFN. At step 244 the system locates a physical page data base entry 246 corresponding with the PFN 242. The physical page data base entry 246 is passed to step 248.

At step 248, the system determines a virtual address of a page table entry mapping the page of physical memory identified by PFN 242 to a virtual address. The output of step 248 is the virtual address 250 of the mapping PTE. The virtual address 250 is passed to step 252. At step 252 the system accesses that PTE mapping the physical page identified by PFN 242 using the virtual address 250.

Figure 10:
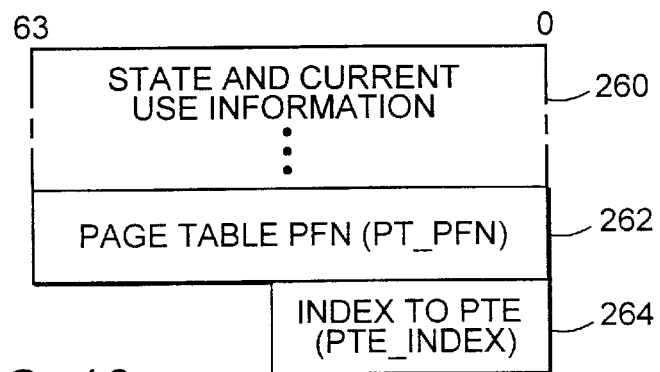
FIG. 10 is a block diagram showing a first example embodiment of a physical page data base entry.

Now with reference to FIG. 10 there is described a first example embodiment of an entry within a physical page data base. The physical page data base entry shown in FIG. 10 contains information regarding a particular associated page of physical memory. A specific physical page data base entry as shown in FIG. 10 may for example be located within the physical page data base through conventional techniques using the PFN identifying the page of physical memory associated with that physical page data base entry.

The physical page data base entry in FIG. 10 is shown including PFN state and current use information 260. The physical page data base entry of FIG. 10 is further shown including a page table PFN (PT_PFN) field 262. The physical page data base entry of FIG. 10 is also shown including a PTE index field (PTE_INDEX) 264.

During operation of the elements shown in FIG. 10, a given PFN identifies for purposes of example a page of physical memory storing the contents of a virtual page of some process. Accordingly there exists a page table entry that maps a virtual page to that page of physical memory identified by the given PFN. The fields within the physical page data base entry associated with that PFN point back to that page table entry. These fields are collectively referred to as the "PTE backlink" or "backlink" of the physical page data base entry.

The backlink for the example physical page data base entry as shown in FIG. 10, consists of two related pieces of information. The first piece of information is stored in the PT_PFN field 262. The PT_PFN field 262 contains a PFN identifying a page table page in physical memory containing a page table entry that currently maps a virtual page to the page of physical memory indicated by the PFN associated with that physical page data base entry, for example PFN X. The second piece of backlink information is an index within that page table page of the specific page table entry mapping PFN X. That index is stored within the PTE_INDEX field 264 within the physical page data base entry shown in FIG. 10. In the case where no page table entry currently maps a virtual page to the page of physical memory indicated by the PFN associated with that physical page data base entry, then the PTE_INDEX field 264 and the PT_PFN field 262 contain predetermined values indicating this condition, for example, zero (0).

Figure 11:
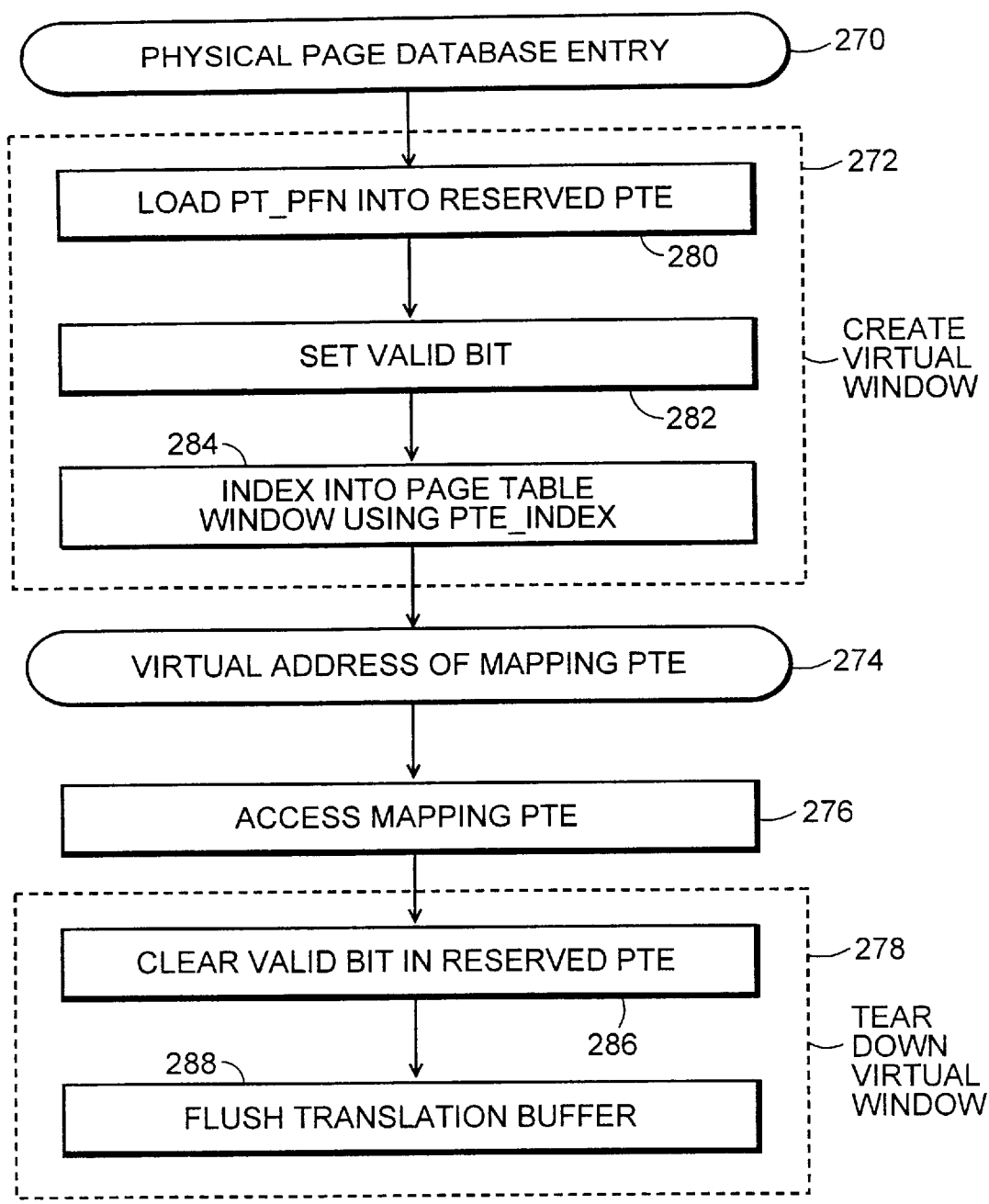
FIG. 11 is a flow chart showing a first example embodiment of steps performed to obtain a virtual address of a page table entry currently mapping a predetermined physical page.

FIG. 11 shows an example embodiment of steps performed by a process to access a PTE mapping a particular page of physical memory identified by a given PFN. The steps of FIG. 11 are for example performed by a software process executing on the computer system shown in FIG. 1.

The example embodiment of FIG. 11 inputs a physical page data base entry 270 associated with a predetermined PFN identifying a page of physical memory for which a mapping PTE is to be accessed. The physical page data base entry 270 is for example the first example physical page data base entry embodiment as shown in FIG. 10. The physical page data base entry 270 is passed to step 272, in which a virtual window is created. Step 272 is performed only when the PTE_INDEX field 264 and the PT_PFN field 262 do not contain predetermined values indicating that no page table entry currently maps a virtual page to the page of physical-memory indicated by the PFN associated with that physical page data base entry 270.

Step 272 includes for example a first sub-step 280 of loading the contents of the PT_PFN field from within the physical page data base entry 270 into a reserved page table entry. The reserved page table entry (PTE) is for example a predetermined one of the shared page table entries shown as element 170 in FIG. 6.

In sub-step 282 the system sets a valid bit within the reserved PTE. At sub-step 284 the system forms the virtual address of the PTE mapping the PFN associated with physical page data base entry 270 by indexing into a virtual window consisting of a page table page mapped by the reserved PTE, using the contents of the PTE_INDEX field within the physical page data base entry 270. This indexing is for example performed by multiplying the value of PTE_INDEX by the size of a PTE, and adding the result to the virtual address of the page of virtual memory mapped by the reserved PTE. The result of this indexing is the virtual address 274. The virtual address 274 is then used to access the desired mapping PTE at step 276.

Following step 276 at 278, the system tears down the virtual window created in step 272. Step 278 includes a first sub-step 286 of clearing the valid bit in the reserved PTE. Following sub-step 286 at sub-step 288 the system flushes the translation buffer 22 of any cached translations of virtual addresses within the virtual page mapped by the reserved PTE.

Figure 12:
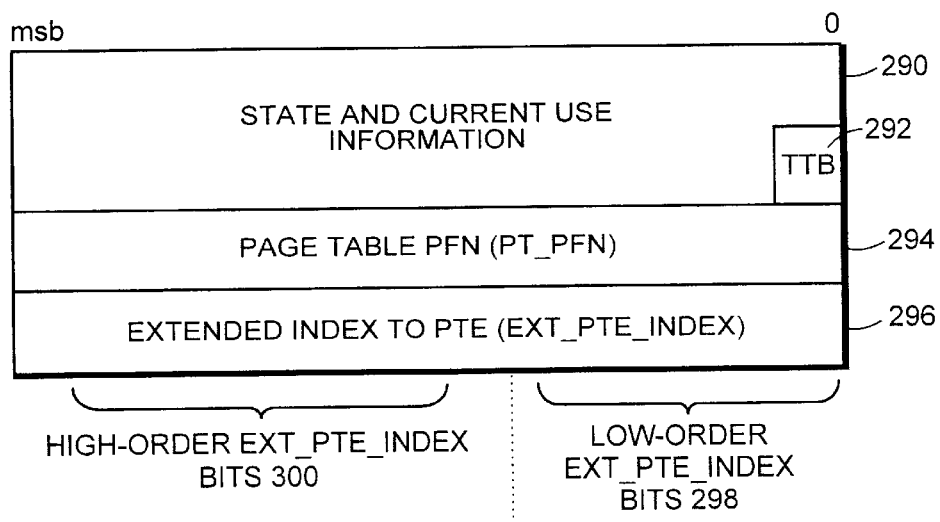
FIG. 12 is a block diagram showing a second example embodiment of a physical page data base entry.

Now with reference to FIG. 12 there is described a second example embodiment of a physical page data base entry. The physical page data base entry shown in FIG. 12 includes PFN state and current use information 290. The remaining fields within the physical page data base entry of FIG. 12 are the backlink information for the entry. In the example physical page data base entry shown in FIG. 12, the index portion of the backlink information has been enlarged in the EXT_PTE_INDEX field 296 to hold an index not from the beginning of a page table page containing the desired mapping page table entry, but an index from the beginning of the entire page table structure that altogether maps the entire visible virtual address space for a given process. In the example embodiment, EXT_PTE_INDEX contains an index into a linear array of page table entries, for example the page table 166 as shown in FIG. 6. To access a specific page table page, EXT_PTE_INDEX is multiplied by the size of a PTE, for example 8 bytes, and added to a base virtual address mapping the beginning of the page table 166. The result is a virtual address of the desired mapping PTE.

The physical page data base entry of FIG. 12 specifically includes a top of tree bit 292, a page table PFN (PT_PFN) field 294, and an extended index to PTE (EXT_PTE_INDEX) field 296. The EXT_PTE_INDEX field 296, includes a first sub-field referred to as the high order EXT_PTE_INDEX bits 300, and a second subfield referred to as the low order EXT_PTE_INDEX bits 298. The low order EXT_PTE_INDEX bits 298 are equivalent to the PTE_INDEX field 264 as described in FIG. 10.

Figure 13:
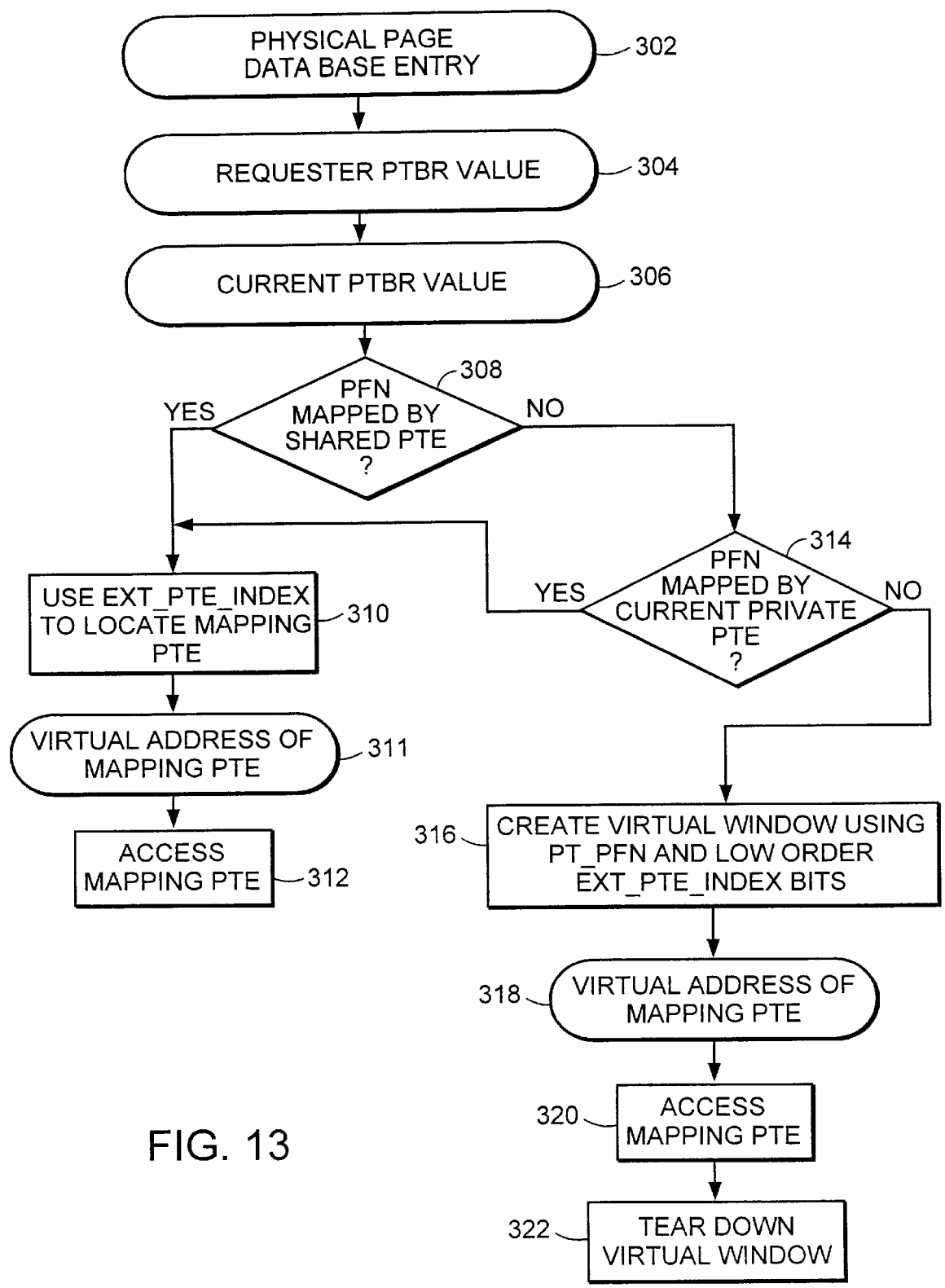
FIG. 13 is a flow chart showing a second example embodiment of steps performed to obtain a virtual address of a page table entry currently mapping a predetermined physical page.

Now with reference to FIG. 13 there is described a second example embodiment of steps performed to obtain a virtual address of a page table entry mapping a predetermined physical page, using the second embodiment physical page data base entry as shown in FIG. 12. The steps of FIG. 13 have three inputs, specifically a physical page data base entry 302, a requester PTBR value 304, and the current PTBR value 306.

At step 308 in FIG. 13, the system determines whether the predetermined page of physical memory indicated by the given PFN is mapped by a shared page table entry (PTE). In a first example embodiment of step 308, the determination is made by testing a private/shared bit (not shown) within the physical page data base entry associated with the PFN of the predetermined physical page of memory. A first predetermined private/shared bit value indicates that the mapping PTE is within shared space, and a second value indicates the PTE is within process private space. The private/shared bit is maintained by operating system software responsible for allocating and mapping PTEs to pages of physical memory. In a second example embodiment of step 308, the determination of whether the PFN is mapped by a shared PTE is accomplished by determining if the virtual address of the mapping PTE would be in private or shared space by using the EXT_PTE_INDEX value to calculate where the mapping PTE lies within the virtual address space. For example, the virtual address of the mapping PTE is compared with the private/shared virtual address boundary to determine whether the mapping PTE is mapped to process private or shared space. In the example embodiment, those PTEs mapped into shared space are shared PTEs and those PTEs mapped into process private space are process private PTEs.

If it is determined at step 308 that the PFN is mapped by a shared PTE, step 308 is followed by step 310. Otherwise, step 308 is followed by step 314. In step 310, the system uses the contents of the EXT_PTE_INDEX field 296 within the physical page data base entry and the base virtual address of the page table 166 to locate the shared page table entry for that PFN. As shown in FIG. 12, the EXT_PTE_INDEX portion of the backlink includes both a high order subportion (high order bits 300) and low order subportion (low order bits 298). During operation, for shared pages, at step 310, the PT_PFN portion of the backlink is ignored. The entire EXT_PTE_INDEX value is used at step 310 as an index from the base address of the currently active page table structure (for example page table 166), thus yielding the virtual address at which the desired mapping PTE may be accessed. A resulting virtual address 311 of the mapping PTE is used by the system in step 312 to access the mapping PTE.

At step 314, the system determines whether the PFN is mapped by a process private PTE that is within the current virtual address space. If it is determined at step 314 that the PFN is mapped by a current private PTE, step 314 is followed by step 310. For process private pages belonging to a process whose context is currently active, the same steps (310, 311 and 312) as used for a shared PTE are applied to yield a virtual address of the mapping PTE. Otherwise, step 314 is followed by step 316.

For process private pages belonging to a process whose context is not currently active, the system uses the backlink information to create a virtual window. At step 316, the system creates a virtual window using the contents of the PT_PFN field 294 within the physical page data base entry and the low order bits of the EXT_PTE_INDEX 298, as described in conjunction with PT_PFN field 262 and the PTE_INDEX field 264 of the first example physical page data base entry shown in FIG. 10. The PT_PFN portion 294 of the backlink is copied to the reserved PTE, and only the low order EXT_PTE_INDEX bits 298 are used to index the PTE within the virtual page mapped by the reserved PTE. The high order EXT_PTE_INDEX bits 300 are not used. The output of step 316 is the virtual address of the mapping PTE 318, specifically the virtual address mapped by the reserved PTE and incremented by the number of PTEs indicated by the low order EXT_PTE_INDEX bits 298. The virtual address 318 is used at step 320 by the system to access the mapping PTE. Following step 320, the present system tears down the virtual window by clearing the valid bit in the reserve PTE.

In an alternative exemplary embodiment, in which common code or logic is used to implement the step of accessing the mapping PTE at steps 312 and 320, the system need only dismantle the virtual window mapping the page table page when the virtual window has actually been established. This is recognized by examination of the valid bit within the reserve PTE. If the valid bit is set, then it must be cleared when the virtual window is torn down. If it is clear then the virtual window has not been used, and therefore need not be torn down. Avoiding tearing down the virtual window prevents unnecessary translation buffer operations, such as invalidation of virtual addresses stored in the translation buffer 22.

The performance gained with the second embodiment physical page data base entry occurs for any case where the PT_PFN portion of the backlink is not utilized. What is gained is that the system avoids having to explicitly map the page table page PFN (PT_PFN) using the reserved PTE, and the system also avoids having to dismantle the mapping later.

Figure 14:
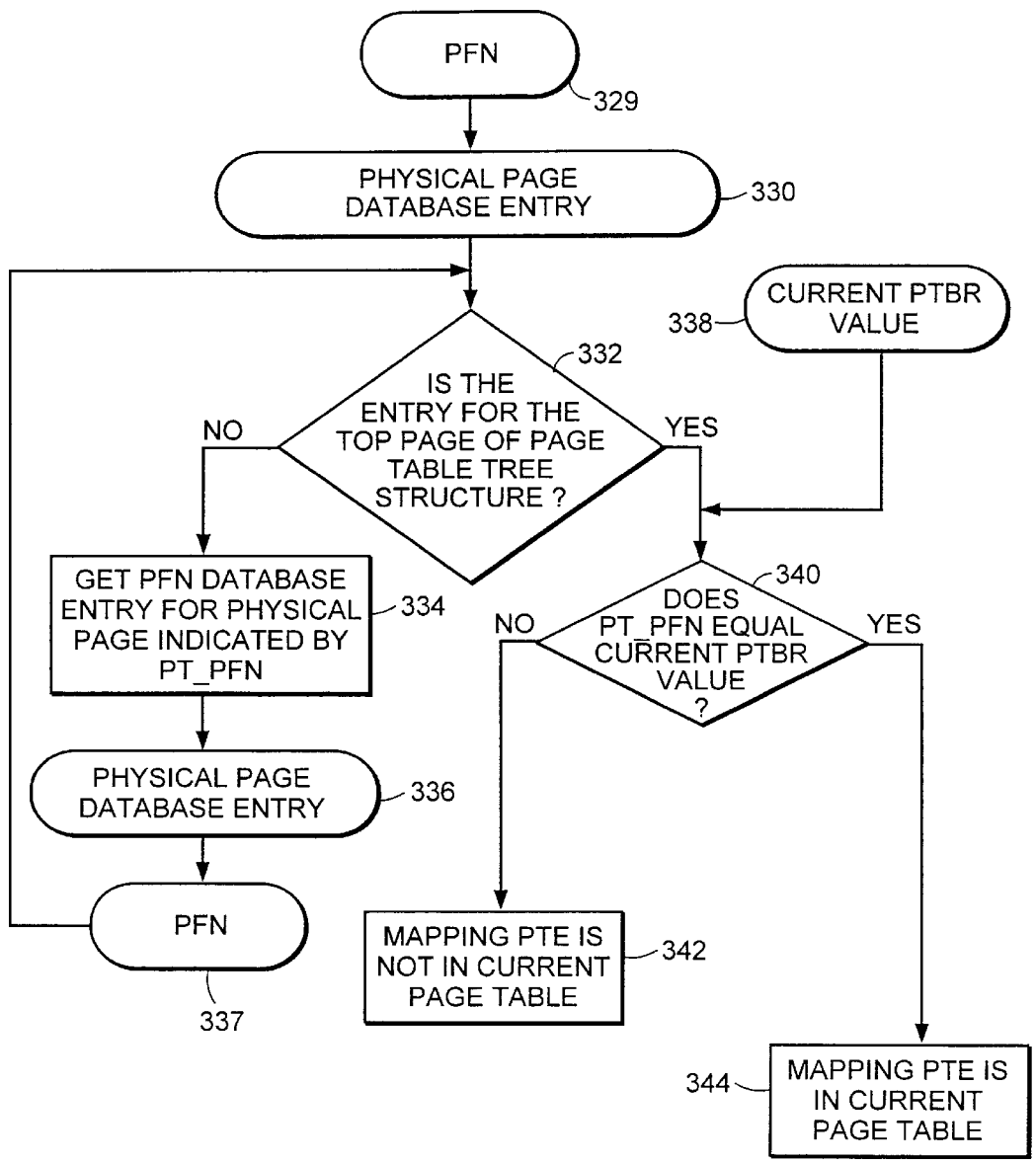
FIG. 14 is a block diagram showing an example embodiment of steps performed to determine if a predetermined physical page is mapped by a current page table entry.

Now with reference to FIG. 14 there is described an example embodiment of steps performed to determine whether a predetermined physical page is mapped by a current page table entry. The steps described in FIG. 14 are for example performed within step 314 shown in FIG. 13. The requester PTBR value 304 is used to determine if the process that requested access to a process private PTE mapping a predetermined page of physical memory is currently active. For example such a requesting process may be the initiator of an asynchronous I/O request. In an example embodiment, the requestor PTBR value 304 is the requesting process's page table base register (PTBR) value. This PTBR value is loaded into the PTBR register whenever that process is made current. This parameter enables the system to compare the requester PTBR value 304 to the current contents of the PTBR 306. If there is a match then the requesting process is current on the CPU. Otherwise the requesting process is not current. Where it is determined that the requesting process is current, then any process private PTE mapping the page of physical memory indicated by the PFN associated with the physical page data base entry 330 is within the current virtual address space, and no virtual window need be established to access that mapping PTE.

Continuing with reference to FIG. 14, a physical page data base entry 330 and a predetermined PFN 329 are input into step 332. The predetermined PFN 329 is for example the predetermined PFN 242 as shown in FIG. 9. Further, the physical page data base entry 330 is that entry in the physical page data base associated with the page of physical memory indicated by the PFN 329. At step 332, it is determined whether the physical page data base entry 330 is associated with the top page 214 of a page table tree structure as shown in FIG. 8. This determination is for example made by examination of a "top of tree" bit in the physical page data base entry. A predetermined value of the top of tree bit indicates that the physical page data base entry 330 is associated with the top page 214 of the page table structure as shown in FIG. 8.

In an alternative embodiment, the determination of whether the physical page data base entry 330 is associated with the top page of a page table tree structure may be made by comparing the PT_PFN value in the entry with the PFN 329. If the two values are equal, then the physical page data base entry 330 is associated with the top page 214 of a page table tree structure as shown in FIG. 8.

If the physical page data base entry 330 indicates that the physical page data base entry 330 is associated with the top page of a page table tree structure, step 332 is followed by step 340. Otherwise step 332 is followed by step 334.

At step 334 the system obtains and outputs the value of the PT_PFN field from physical page data base entry 330, which is output as PFN 337. Further at step 334 the system obtains the physical page data base entry 336 for the physical page indicated by the PT_PFN field within the physical page data base entry 330. Step 334 outputs that physical page data base entry as output 336. The physical page data base entry 336 and PFN 337 are then input into step 332, and step 332 is repeated.

At step 340 the current PTBR value 338 is compared with the PT_PFN value within the physical page data base entry last input to step 332. If the two values are equal, step 340 is followed by step 344. Otherwise step 340 is followed by step 342.

In an alternative embodiment, the comparison at step 340 is made between the PTBR value 338 and the PFN value last input to step 332. The alternative embodiment gives equivalent results, because due to self mapping of the page table structure, the physical page data base entry associated with the top page of the page table structure has a PT_PFN value equal to the PFN of the top page of the page table structure.

At step 344, the present system has determined that the PTE mapping the physical page indicated by the PFN associated with the physical page data base entry 330 is within the current page table. At step 342, the present system has determined that the PTE mapping the physical page indicated by the PFN associated with the physical page data base entry 330 is not within the current page table.

Figure 15:
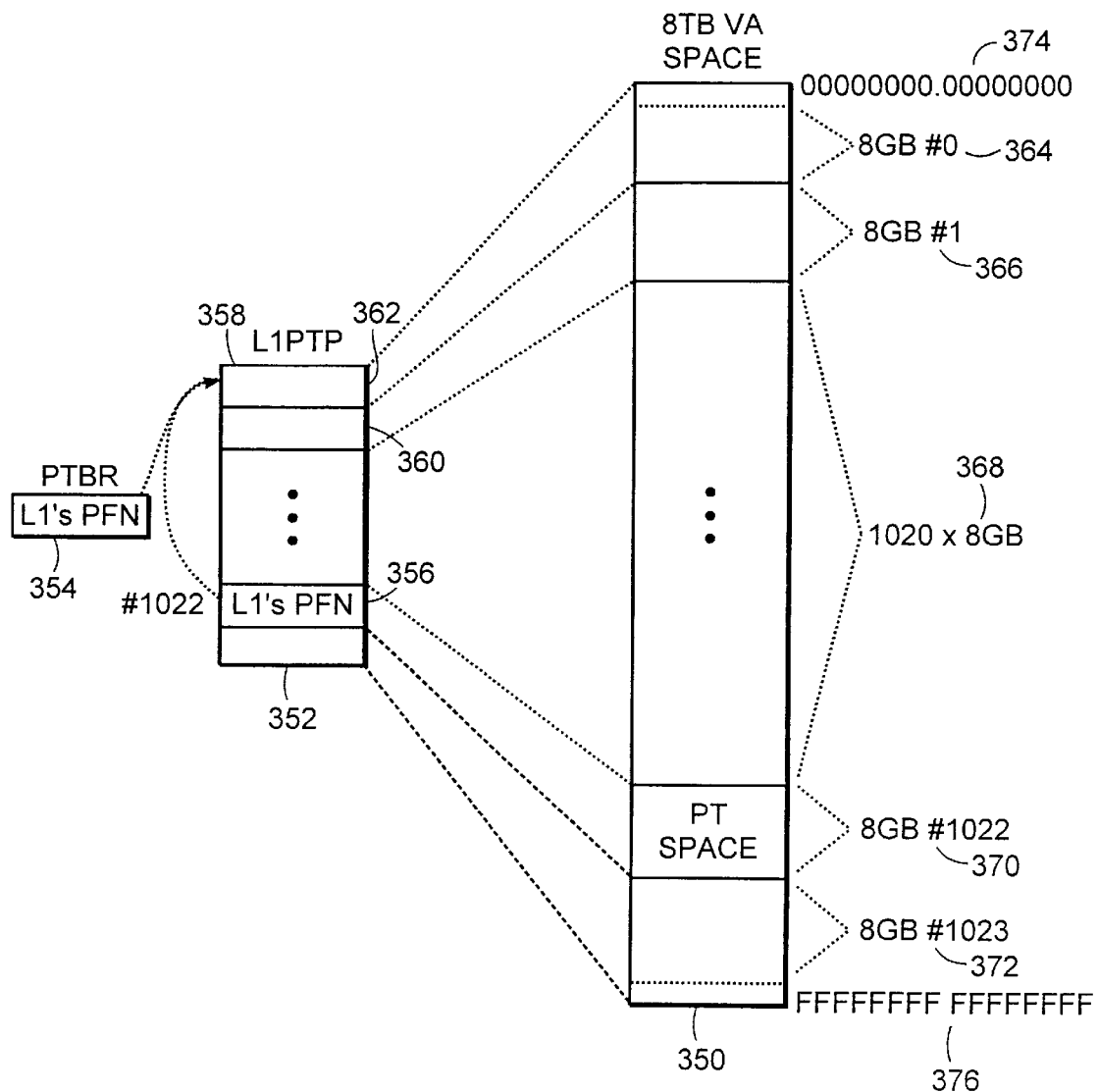
FIG. 15 is a block diagram showing an example embodiment of a self-mapped page table.

FIG. 15 shows an example embodiment of a self-mapped page table 358. The self-mapped page table 358 is for example the highest level page in a hierarchical tree structure of page table pages as shown in FIG. 8. In the example embodiment page table 358 in FIG. 15 corresponds with the level one page table page 214 as shown in FIG. 8. For purposes of clarity, the level 2 page table pages and level 3 page table pages are not shown in FIG. 15. In an alternative embodiment, the page table 358 is a linear array of page table entries.

The page frame number of the self-mapped page table 358 in the example embodiment of FIG. 15 is shown contained within the page table base register (PTBR) 354. Thus the contents of the PTBR 354 indicates the base of the self-mapped page table 358. The self-mapped page table 358 is shown including a number of page table entries, shown for example as page table entry 362, page table entry 360, page table entry 356, and page table entry 352. In the example embodiment shown in FIG. 15, the page table 358 is one page in length, where a page is eight kilobytes, and the size of each page table entry is eight bytes. Accordingly there are 1,024 total page table entries in the self-mapped page table 358, numbered from zero through 1023.

Further shown in FIG. 15 is a virtual address space 350. The virtual address space 350 is for example shown to include virtual addresses between a lowest virtual address 374, shown for example as 00000000.00000000 (hex), and a highest virtual address 376, shown for example as FFFFFFFF.FFFFFFFF(hex). The virtual address space 350 is shown for example divided into 1,024 virtual segments, each virtual segment being equal to eight gigabytes (8 GBs) in length. The virtual segments are shown as segment 0 364, segment 1 366, followed by 1,020 virtual segments 368, segment 1022 370, and segment 1023 372. Thus the virtual address space 350 is potentially eight terabytes (8 TB) in size.

Each segment in the virtual address space 350 is mapped by one of the page table entries found in the self-mapped page table 358. For example, page table entry 362 maps virtual segment 0 364, page table entry 360 maps virtual segment 1 366, etc. Page table entry 356, the 1022 nd PTE in the self-mapped page table 358, is the "self-mapper" PTE. Page table entry 356 maps the 1022nd virtual segment 370 of the virtual address space 350. Accordingly during operation of the elements shown in FIG. 15, references made to the 1022nd virtual segment 370 in the virtual address space 350 result in accesses to page table space. Page table space therefore includes those virtual addresses used to access the self-mapped page table 358, and all level 2 and level 3 page table pages in the example embodiment as shown in FIG. 8.

During operation of the elements shown in FIG. 15, the virtual address space 350 consists of a collection of identically sized, contiguous address range segments, each one mapped by a correspondingly positioned PTE in the page table 358. The base address for page table space in FIG. 15 incorporates the index of the chosen self-mapper L1 PTE (3FE(16)) as follows (see FIG. 8):

| | |
|---|---|
| Segment 1 bitfield = 3FE | VA = FFFFFFFC.00000000 |
| Segment 2 bitfield = 0 | (aka "PT_Base") |
| Segment 3 bitfield - 0 | |
| Byte within page - 0 | |

Private/Shared Boundary Dividing a Self-Mapped Page Table Space

Figure 16:
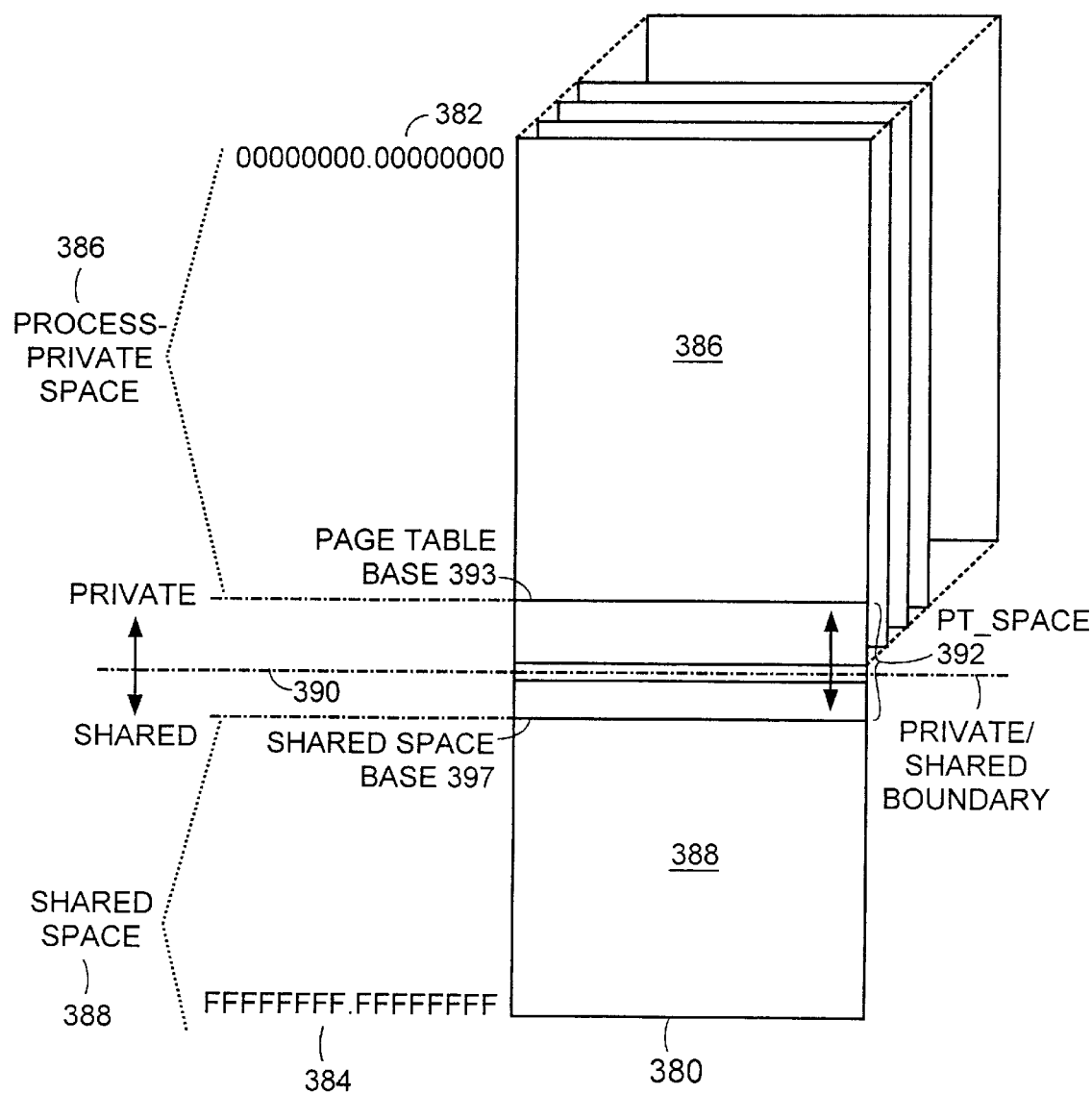
FIG. 16 is a block diagram showing an example embodiment of a virtual memory system having a private/shared boundary dividing a self-mapped page table space, and where the page table space itself separates process private space and shared space.

FIG. 16 shows an example embodiment of a virtual address space including a page table space separating a process private space from a shared space. FIG. 16 further shows a private/shared virtual address boundary dividing process private page table entries and shared page table entries, for example contained in a self-mapped page table.

In FIG. 16 a virtual address space 380 is shown including a process private space 386, a shared space 388, and a page table space 392. The virtual address space 380 is shown extending between a lowest virtual address 382 shown for example as 00000000.00000000 (hex) to a highest virtual address 384 shown for example as FFFFFFFF.FFFFFFFF (hex). The process private space 386 is shown for example within the virtual addresses below the page table space 392. The shared space 388 is shown for example within the virtual addresses above the page table space 392.

A private/shared boundary 390 is shown in FIG. 16 dividing the page table space 392. The private/shared boundary 390 lies at the higher addressed end of the level 1 page table page 352. All page table entries located in addresses below the private/shared boundary 390 are process private page table entries. All page table entries located in addresses greater than or equal to the private/shared boundary 390 are shared page table entries. The level I page table entries that exist between the self-mapper page table entry 356 and the private/shared boundary 390 are process private copies of level 1 page table entry values that map the set of shared page table entries that are located in addresses greater than or equal to the private/shared boundary 390.

In summary, the page table entries located in addresses below the private/shared boundary 390 map the process private space 386, the virtual space in which those page table entries themselves reside, and include the highest level page table entries that map all lower level page table entries that map shared space 388. Accordingly, all page table entries within the page table space 392 that are located in virtual addresses greater than or equal to the private/shared boundary 390 are those lower level page table entries that map shared space 388. Those lower level page table entries that map shared space 388 also map the virtual space within page table space in which those lower level page table entries themselves reside. Page table entries at locations greater than or equal to the private/shared boundary 390 are shared, and are accessible to any current process. Page table entries below the private/shared boundary 390, including those page table entries in the highest level page of the page table structure, are process private, and accordingly are associated with a specific process. only when that specific process is current are the process private page table entries associated with that process accessible.

The page table entry within the page table space 392 having the lowest virtual address is located at a boundary referred to as page table base 393. The address of the first page within the shared space 388 following the page table space 392 is referred to as shared space base 397.

Figure 17:
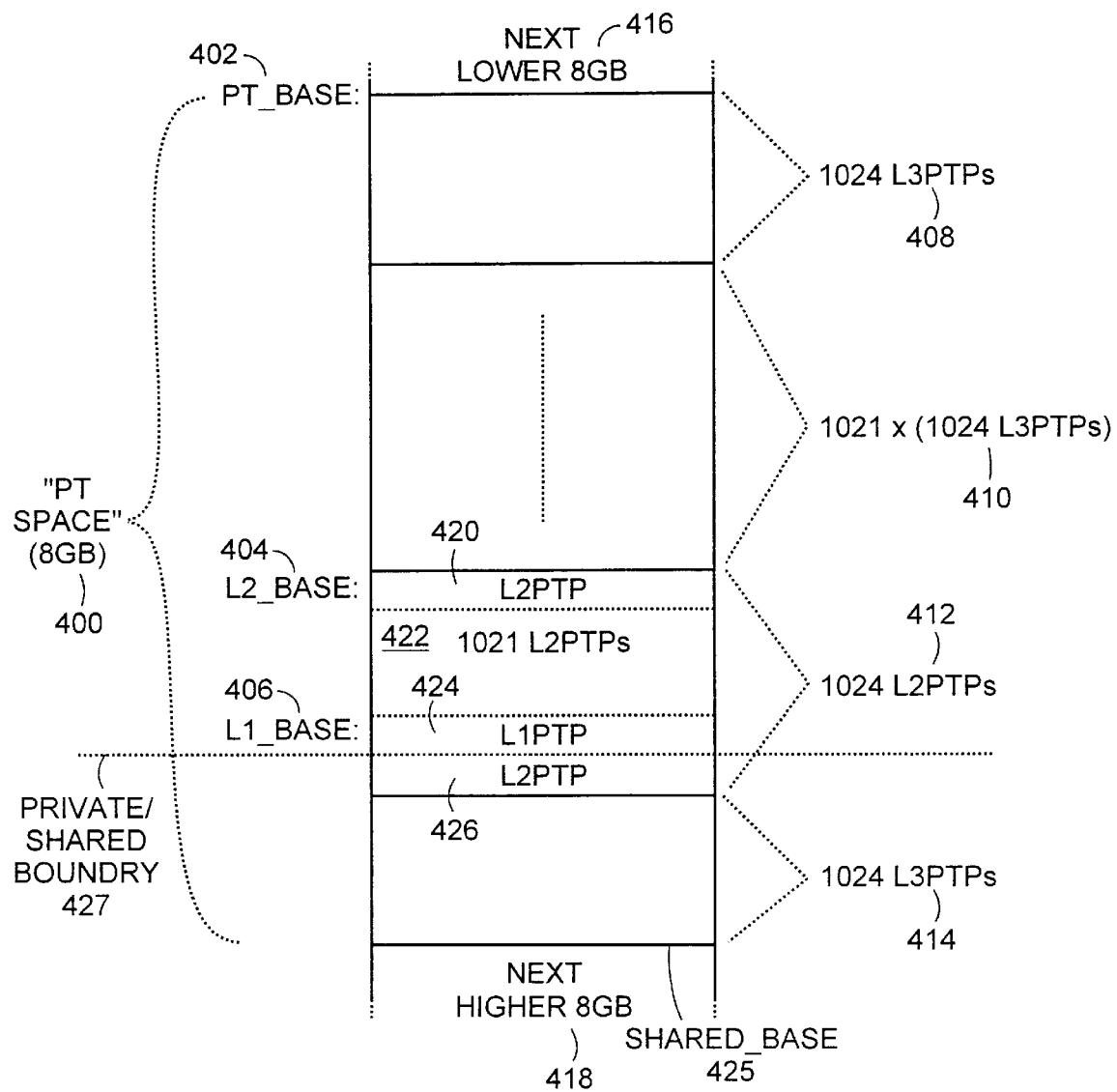
FIG. 17 is a block diagram showing an example embodiment of a page table space.

FIG. 17 shows an example embodiment of a self-mapped page table space as shown for example in element 392 of FIG. 16 or within element 370 in FIG. 15. FIG. 17 shows an 8GB page table space 400 beginning at a page table base virtual address 402. The page table format of the page table space shown in FIG. 17 is for example defined by the tree structure described in FIG. 8. Accordingly within the page table space 400 there is shown a first set of 1024 level 3 page table pages 408, followed by 1021 sets of 1024 level 3 page table pages 410. Following the level 3 page table pages 410 and beginning at an address level 2 base (L2_Base) 404 there is shown a level 2 page table page 420, followed by 1021 level 2 page table pages 422. Following the 1021 level 2 page table pages 422, there is at the address level 1 base (L1_Base) 406 a level 1 page table page 424. The level 1 page table page 424 is also shown as level 1 page table page 358 in FIG. 15 and level 1 page table page 214 in FIG. 8. The address of the level 2 page table page 426 following the level 1 page table page 424 is the private/shared virtual address boundary 427 for the example virtual address space shown in FIG. 17.

Further with reference to the elements shown in FIG. 17, the level 1 page table page 424 contains the self-mapper PTE. The relative position of the self-mapper PTE within the level 1 page table page 424 determines the virtual addresses of page table base (PT_Base) 402, the level 2 base address (L2_Base) 404, and the level 1 base address (L1_Base) 406. Following the level 2 page table page 426 there is shown 1024 level 3 page table pages 414. After the 1024 level 3 page table pages 414, the address of next higher 8GBs is the base address (Shared_Base) 425 of the shared space 388 for the virtual address space shown in FIG. 16, also shown as beginning at 418 in FIG. 17. Further, the level 2 page table page 426, level 1 page table page 424, 1,021 level 2 page table pages 422, and level 2 page table page 420 are all shown within a set of 1024 level 2 page table pages 412.

FIG. 17 shows the positional effect of choosing a particular high level PTE to self-map the page tables within PT space. For example the embodiment of FIG. 15 includes a self-mapper page table entry in page table entry number 1022. The location of the self-mapper in the example embodiment of FIG. 15 not only locates page table space as a whole in the 1022nd 8GB segment in virtual memory, it also determines that:

The 1022nd grouping of lowest level page table entries (for example L3PTPs) within page table space 400 is the collection of next higher level page table pages (for example 1024 L2PTPs 412) that map the other groupings of L3 PTPs (408, 410 and 414), beginning at L2_Base 404:

| | |
|---|---|
| Segment 1 bitfield = 3FE | VA - FFFFFFFD.FF000000 |
| Segment 2 bitfield = 3FE | (aka "L2_Base") |
| Segment 3 bitfield = 0 | |
| Byte within page = 0 | |

Within that block of L2PTPs 412, the 1022nd L3PTP is actually the next higher level page table page that maps the L2PTPs, for example, the L1PTP. The L1PTP begins at L1_Base 406:

| | |
|---|---|
| Segment 1 bitfield = 3FE | VA = FFFFFFFD.FF7FC000 |
| Segment 2 bitfield = 3FE | (aka "L1_Base") |
| Segment 3 bitfield = 3FE | |
| Byte within page = 0 | |

Within the L1PTP 424, the 1022nd page table entry is the one used for self-mapping these page tables, specifically shown as the "self-mapper" page table entry 356 in FIG. 15. In the example embodiment the virtual address of the self-mapper L1PTE 200 is for example:

| | |
|---|---|
| Segment 1 bitfield = 3FE | VA = FFFFFFFD.FF7FDFF0 |
| Segment 2 bitfield = 3FE | |
| Segment 3 bitfield = 3FE | |
| Byte within page = 3FE × 8 | |

The above described positional relationships within page table space are preserved in alternative example embodiments in which a different top high level page table entry is chosen to be the self-mapper.

During operation of the example self-mapped page table space of FIG. 15 and FIG. 17 exactly as much virtual memory as is necessary is reserved for mapping the page table entries, regardless of page size or page table depth in a specific implementation. For example, consider the segment number bitfields (208, 206, 204) of a given virtual address having the format shown in FIG. 8. Concatenated together, these bitfields comprise a virtual page number (VPN) portion of that given virtual page. During operation of the elements shown in FIG. 17, the VPN may therefore be used as an index into page table space (from PT_Base 402) to obtain a page table entry mapping that given virtual address. The total size of page table space needed to map all virtual pages is the number of virtual pages (208, 206, and 204 concatenated) times the size of a page table entry (for example 8 bytes). The total size of the virtual address space mapped by page table space is the number of possible virtual pages times the page size. Factoring out the number of virtual pages from the equation, the difference between the size of page table space and the size of the virtual address space is the page size divided by the page table entry size, which is for example exactly the size of the segment 1 bitfield 208 in the example format of the virtual address shown in FIG. 8. As a result, the space mapped by a single page table entry at the highest level page table page is of exactly sufficient size for mapping all page table entries needed to map a process's total virtual address space. Accordingly, no additional system tuning or coding is required to accommodate future extensions of the virtual address format shown in FIG. 8 to use bits in the locations above Segment 1 208. By definition of the self-map effect, exactly as much virtual address space as is required will be available, no more and no less.

Further during operation of the elements shown in FIG. 17, the present system conveniently and efficiently locates a page table entry for a given virtual address. This results from the fact that the address of any page table entry is an efficient function of the virtual address that the page table entry maps. To determine the virtual address of the page table entry mapping a given virtual address, the present system begins by clearing the byte within page bitfield 202 of the given virtual address, then shifts the remaining bits of the given virtual address such that the bitfield values of Segments 1, 2, and 3 (see FIG. 8) now reside in the correspondingly next lower bitfield positions. The present system then writes the vacated Segment 1 field 208 with the index of the self-mapper page table entry. The present system further sign-extends the result by extending the value of the most significant bit in the new Segment 1 field 208 into the higher bit locations through bit 63. The final result is the virtual address of the page table entry that maps the original given virtual address. Note that this method applies also for a given virtual address within page table space, including that of the self-mapper page table entry itself.

Figure 18:
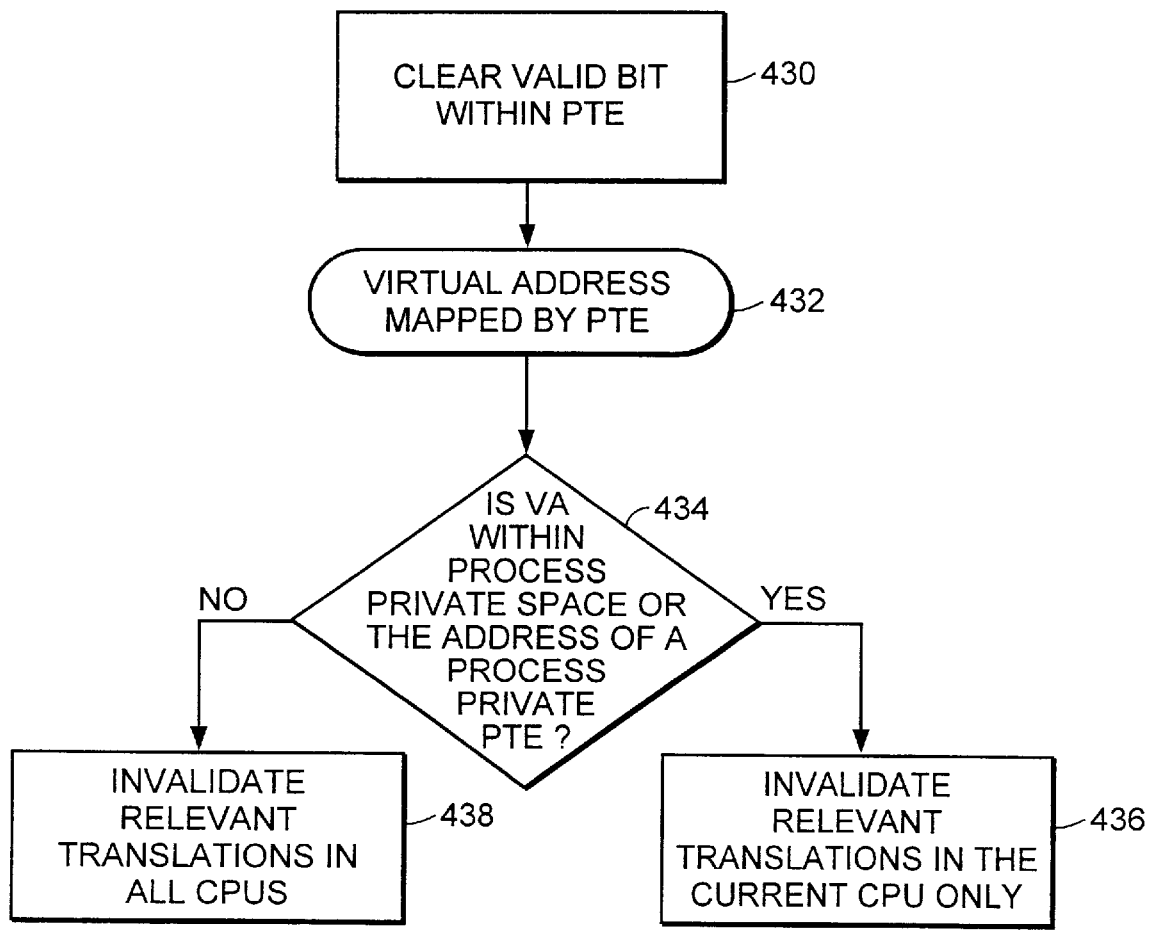
FIG. 18 is a flow chart showing steps in an example embodiment of a system for processing a translation buffer invalidation.

FIG. 18 shows steps performed in an example embodiment of a system for processing a translation buffer invalidation. At step 430 the present system detects a triggering event, for example clearing of a valid bit within a page table entry. At step 430 the present system determines the virtual address mapped by that page table entry. The output of step 430 is the virtual address 432 mapped by that page table entry. The virtual address 432 is passed into step 434.

At step 434, the present system determines whether the virtual address 432 is either within process private space, or is the virtual address of a page table entry which maps process private space. For example, at step 434, in the example embodiment of FIG. 16, the present system compares the virtual address 432 with the private/shared virtual address boundary 390. If the virtual address 432 is less than the private/shared virtual address boundary 390, then the virtual address 432 is either within process private space, or is the virtual address of a page table entry which maps process private space, and step 434 is followed by step 436. Otherwise the virtual address 432 is either within shared space, or is the virtual address of a page table entry which maps shared space, and step 434 is followed by step 438.

At step 436, relevant virtual address translations are invalidated locally. Specifically, translations of virtual addresses within the page of virtual addresses mapped by the page table entry are invalidated in (or "flushed" from) any translation buffer within the central processing unit (CPU) on which the operating system software is currently executing. That CPU is referred to herein for purposes of example as the "current" CPU.

At step 438, virtual address translations are invalidated globally. Specifically, any translations of virtual addresses within the page of virtual addresses mapped by the page table are invalidated in (or "flushed" from) from any translation buffer of each central processing unit (CPU) in the multiprocessor system.

Figure 19:
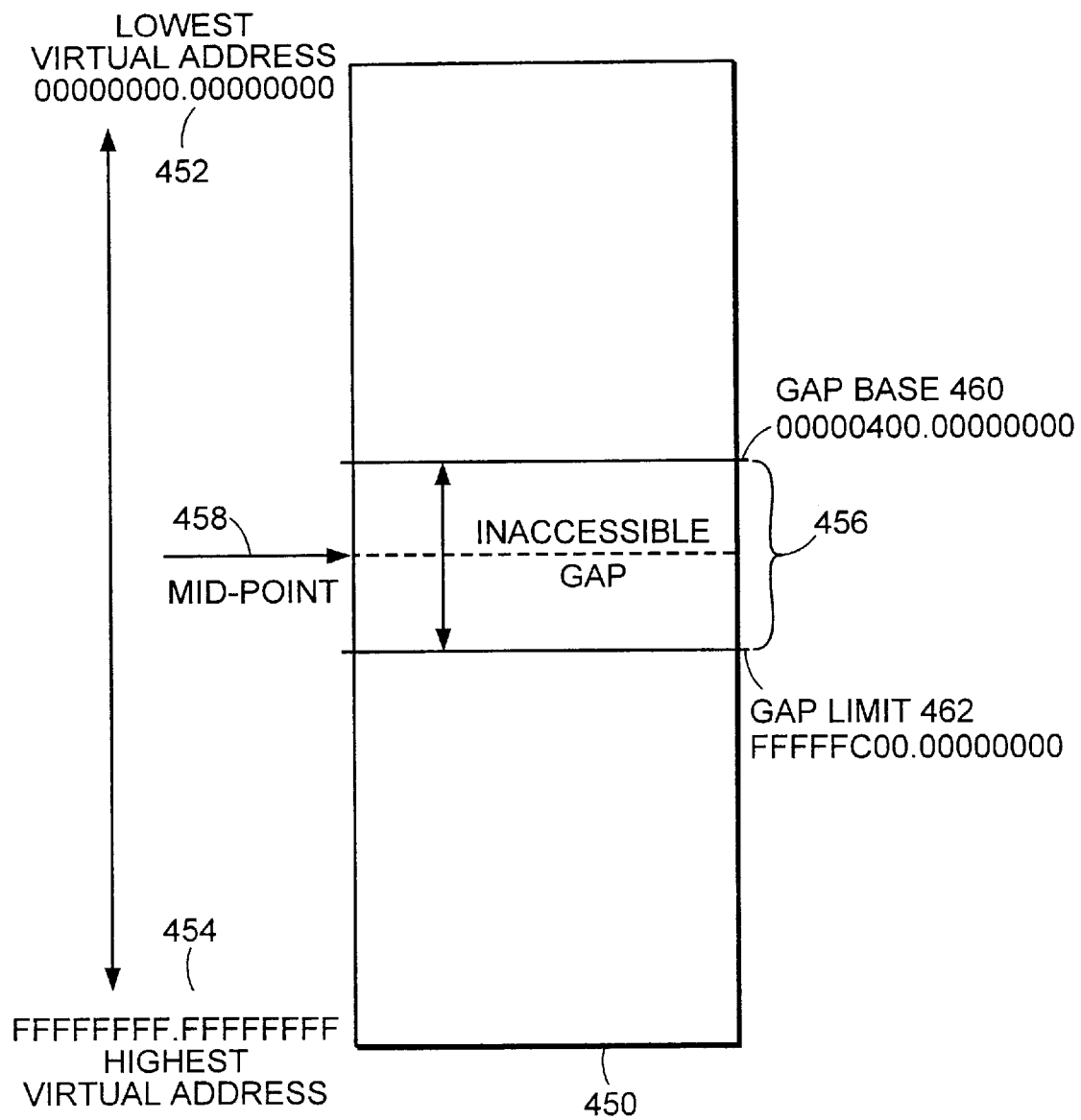
FIG. 19 is a block diagram showing an example embodiment of a virtual address space having an inaccessible gap.

Accommodation of an Inaccessible Gap in the Virtual Address Space Now with respect to FIG. 19 there is described an example embodiment of a virtual address space 450 including an inaccessible gap 456. The virtual address space 450 includes a range of virtual addresses between a lowest virtual address 452 shown for example as 00000000.00000000 (hex) and a highest virtual address 454 shown for example as FFFFFFFF.FFFFFFFF (hex). Further in FIG. 19 is shown a midpoint 458 equal to the half-way point between the lowest virtual address 452 and the highest virtual address 454. The inaccessible gap 456 is shown spanning the midpoint 458, such that one-half of the virtual addresses in the inaccessible gap 456 lie below the midpoint 458, and the other half of the virtual addresses within the inaccessible gap 456 are higher than the midpoint 458. In this way the example inaccessible gap 456 is equidistant from the lowest virtual address 452 and the highest virtual address 454. The inaccessible gap 456 is shown spanning a range of virtual addresses between a gap base 460, shown for example as 00000400.00000000 (hex), and a gap limit 462, shown for example as FFFFFC00.00000000 (hex).

During operation of the elements shown in FIG. 19, one or more operating system routines and/or functions, for example contained within the shared/code data 28 in FIG. 1, allocate and deallocate virtual memory within the virtual address space 450 to a requesting process. When the operating system allocates virtual addresses within the virtual address space 450, page table entries are added to a page table structure which maps the virtual address space 450 to physical memory. Page table entries are added to the page table structure by mapping physical memory to the virtual addresses at which the page table entries are accessed.

An example page table structure is shown in FIG. 8. In the example embodiment, page table entries cannot be added to the page table structure to map the virtual addresses within the inaccessible gap 456. Accordingly the operating system only allocates virtual memory outside of the inaccessible gap 456.

Figure 20:
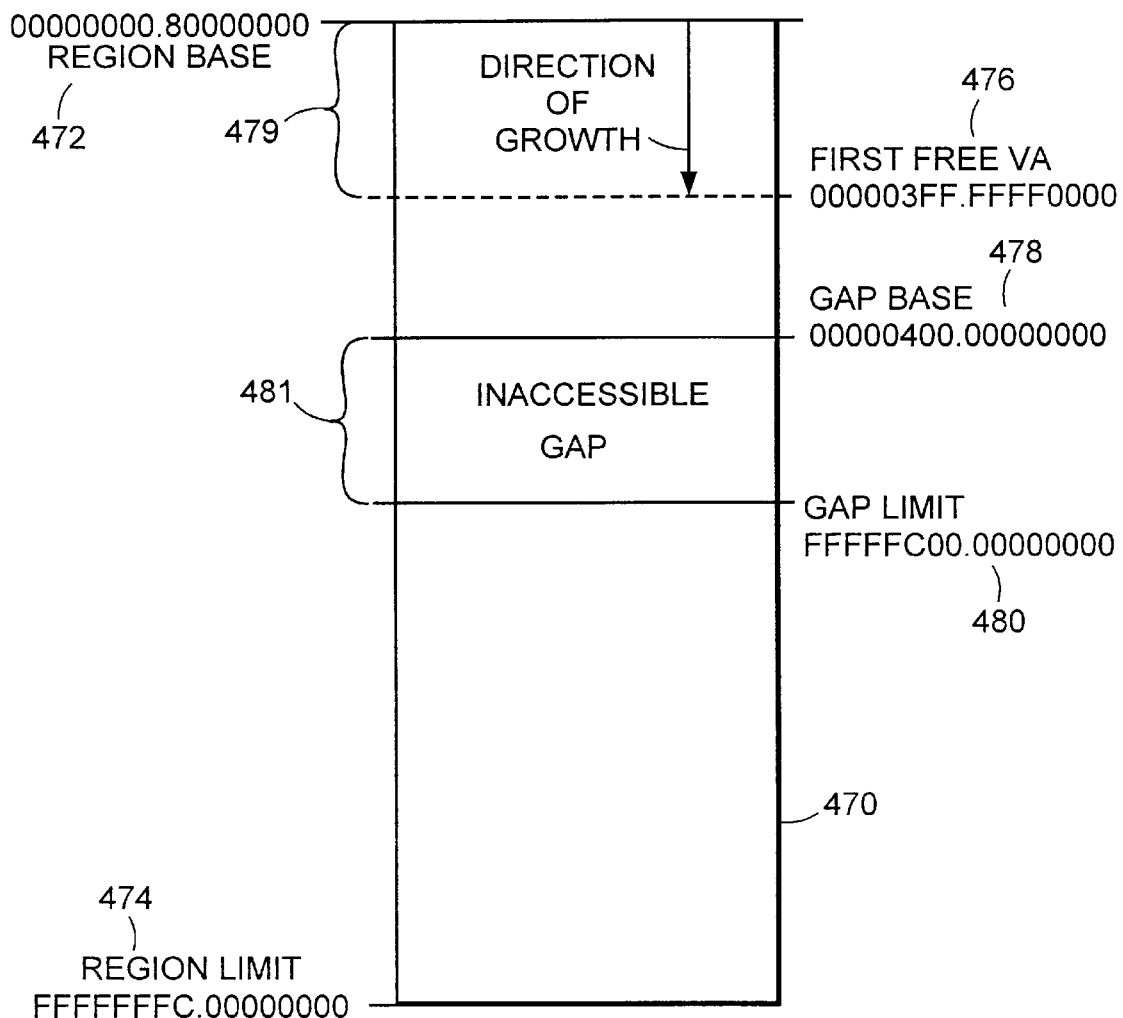
FIG. 20 is a block diagram showing an example embodiment of a virtual memory region.

FIG. 20 shows an example embodiment of a virtual memory region 470. During execution of a process on a computer system, the operating system may provide one or more virtual memory regions, such as virtual memory region 470, to the process. The process may subsequently request the operating system to allocate and deallocate virtual memory within one or more of those virtual memory regions for the process to use to store data. As is conventionally done, when virtual memory is allocated, page table entries are added to a page table structure. For example, when the operating system allocates a new range of virtual memory for which there is no physical memory mapped to the virtual addresses of page table entries necessary to map the new range of virtual addresses, such physical memory is mapped to the virtual addresses of those page table entries. Such mapping is for example performed by writing the PFNs of pages of physical memory to page table entries mapping the virtual addresses of those page table entries necessary to map the new range of virtual addresses. For example, to add a given page of page table entries to the page table structure, a PFN indicating an available page of physical memory is written to a page table entry mapping the virtual addresses of that given page of page table entries.

The page table entries added to the page table structure to map a newly allocated range of virtual addresses may subsequently be used themselves to map specific pages of physical memory to that newly allocated range of virtual addresses. For example, upon a subsequent reference to a virtual address within the newly allocated virtual memory range, a page fault may be generated and detected, and a PFN indicating an available page of physical memory written to a page table entry added to the page table structure to map that newly allocated virtual memory location.

The virtual memory region 470 spans a range of virtual memory addresses between a region base 472 and a region limit 474. The address of the region base is shown for example as 00000000.80000000 (hex), and the value of the region limit 474 is shown for example as FFFFFFFC.00000000 (hex). In the example embodiment of FIG. 20, the currently executing process has previously allocated a set of allocated virtual addresses 479 between the region base 472 and a first free virtual address 476. Thus for the set of allocated virtual addresses 479, the currently executing process has previously requested the operating system to provide page table entries in the page table structure that are capable of mapping the virtual addresses within the set of allocated virtual addresses 479 to physical memory.

A set of unallocated virtual addresses shown for example as between the first free virtual address 476 and the region limit 474, have not previously been allocated to the currently executing process. Accordingly no page table entries have been added to the page table structure which would be capable of mapping the virtual addresses above the first free virtual address 476 and up to the region limit 474.

Further in the example embodiment of FIG. 20, the virtual memory region 470 is shown to encompass an inaccessible gap 481 of virtual addresses between a gap base 478 and a gap limit 480. The virtual addresses within the inaccessible gap 481 are permanently inaccessible, because the embodiment of the underlying memory management system cannot add page table entries to the page table structure which would be capable of mapping virtual addresses within the inaccessible gap 481 to physical memory. The present system processes requests for allocation of virtual memory such that the inaccessible gap 481 is avoided, and the requester is provided with a starting address of a virtually contiguous range of allocated virtual memory which is not encompassing or within the inaccessible gap 481.

In an example embodiment, the virtual memory region 470 is described by an associated region descriptor. The region descriptor includes information regarding the state of the virtual memory region 470, for example the present values of the region base 472, first free virtual address 476, and region limit 474. In this way a region descriptor is maintained by the operating system for each virtual memory region, for example using a predetermined data structure of region descriptors. When an operation is performed on a given region, the region descriptor associated with that region may be used to determine the current state of that region.

Figure 21:
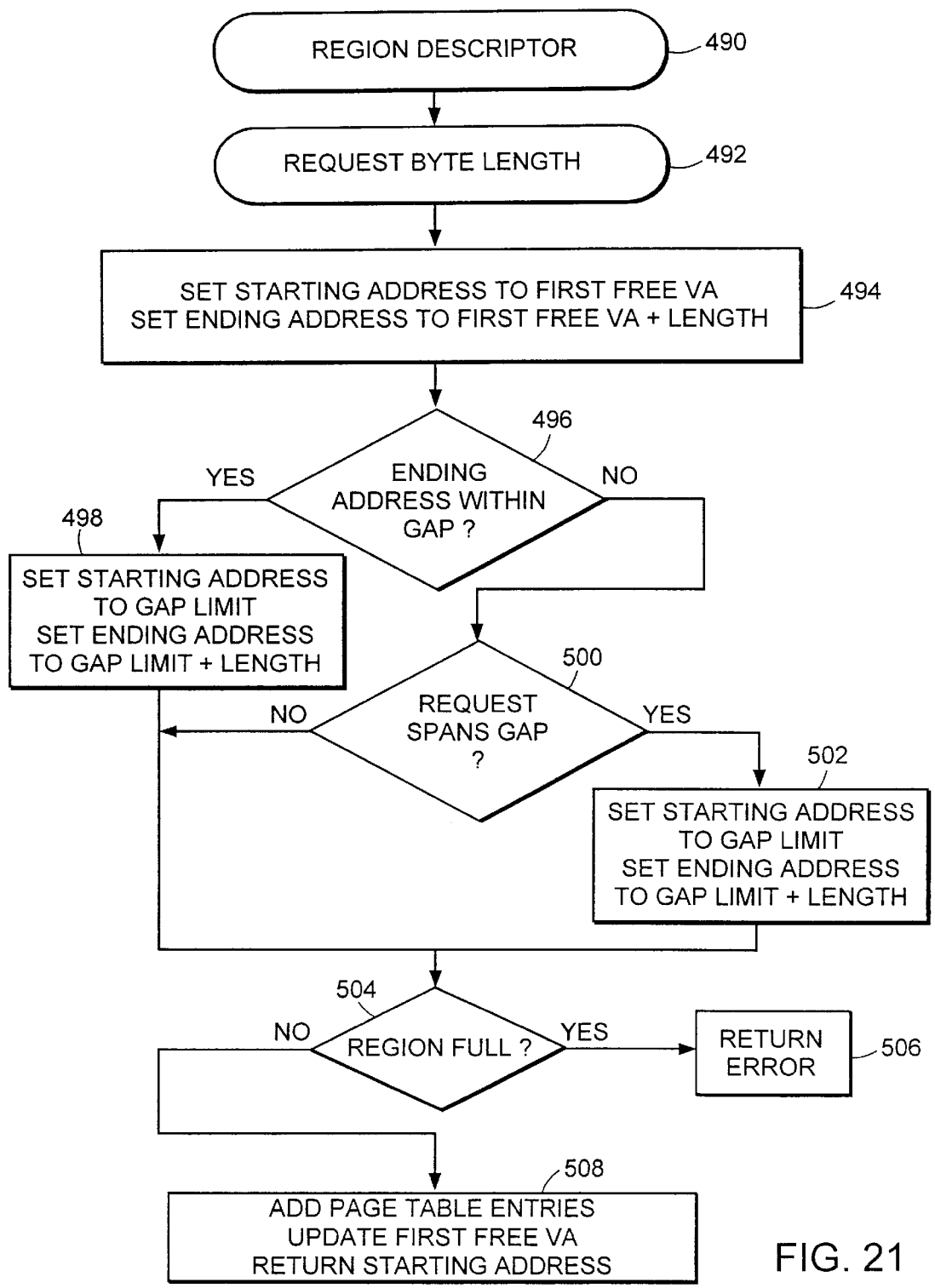
FIG. 21 is a flow chart showing steps performed by an example embodiment of a virtual memory allocation routine.

FIG. 21 shows steps performed by an example embodiment of a virtual memory allocation routine. A first input to the virtual memory allocation routine of FIG. 21 is a region descriptor 490. The region descriptor 490 includes information regarding the virtual memory region in which the currently executing process is requesting allocation of addition accessible virtual memory.

A second example input to the virtual memory allocation routine is shown as a request byte length 492. The request byte length 492 is a length in bytes of the virtual memory requested to be allocated by the currently executing process.

The region descriptor 490 and request byte length 492 are input to step 494. At step 494 the virtual memory allocation routine sets a starting address variable to a value of a first free virtual address pointer stored within the region descriptor 490. Further at step 494, the virtual memory allocation routine sets an ending address variable to the sum of the first free virtual address pointer plus the request byte length 492.

At step 496 the virtual memory allocation routine compares the ending address calculated at step 494 with a gap base an gap limit, corresponding to the gap base 478 and gap limit 480 shown in FIG. 20. The gap base and gap limit are for example system wide values available to all processes as well as the operating system, or are alternatively passed to the virtual memory allocation routine within the region descriptor 490. If the ending address calculated at step 494 is determined to be between the gap base and gap limit step 496 is followed by step 498. Otherwise step 496 is followed by step 500.

At step 498, the virtual memory allocation routine sets the starting address variable to the value of the gap limit, and sets the ending address variable to the sum of the gap limit plus the byte length. Step 498 is followed by step 504.

At step 500 the virtual memory allocation routine determines whether satisfying the request for additional accessible virtual memory beginning with the current first free virtual address value would span the inaccessible gap. The determination at step 500 is for example made by determining if the value of the starting address variable is below the gap base and whether the ending address is equal to or greater than the gap limit. The starting address and ending address used in the comparisons of step 500 were calculated at step 494.

If at step 500 the virtual memory allocation routine determines that the starting address is below the gap base and the ending address is equal to or above the gap limit, then the request spans the inaccessible gap, If it is determined at step 500 that the request spans the inaccessible gap, step 500 is followed by step 502. Otherwise step 500 is followed by step 504.

At step 502 the virtual memory allocation routine sets the starting address variable to the gap limit value and sets the ending address variable to the sum of the gap limit plus the request byte length 492. Step 502 is followed by step 504.

In an alternative embodiment, the decisions of step 496 and step 500 are combined into a single determination of whether the starting address variable value is less than the gap base and the ending address variable value is greater than the gap base. If this condition is true, then step 498 is performed. Step 502 is eliminated in this alternative embodiment.

At step 504 the virtual memory allocation routine determines whether the size of the virtual memory region associated with the region descriptor 490 is overflowed by satisfying the requested additional accessible virtual memory. For example, at step 504 the updated value of the ending address is compared with a region limit value provided in the region descriptor 490. If the ending address is greater than the region limit, then the region is considered full and step 504 is followed by step 506. At step 506 an error is returned to the currently executing process which made the request. Otherwise step 504 is followed by step 508.

At step 508 the virtual memory allocation routine updates the first free virtual address pointer in the region descriptor to point to the updated value of the ending address. Further at step 508 the virtual memory allocation routine returns the starting address (for example the value of the starting address variable) of the newly allocated virtual addresses to the requesting process. Also in step 508, page table entries are added to the page table structure which may be used to map physical memory to the virtual addresses beginning at the returned starting address and continuing on for a range of virtual addresses equal to the request byte length 492.

Figure 22:
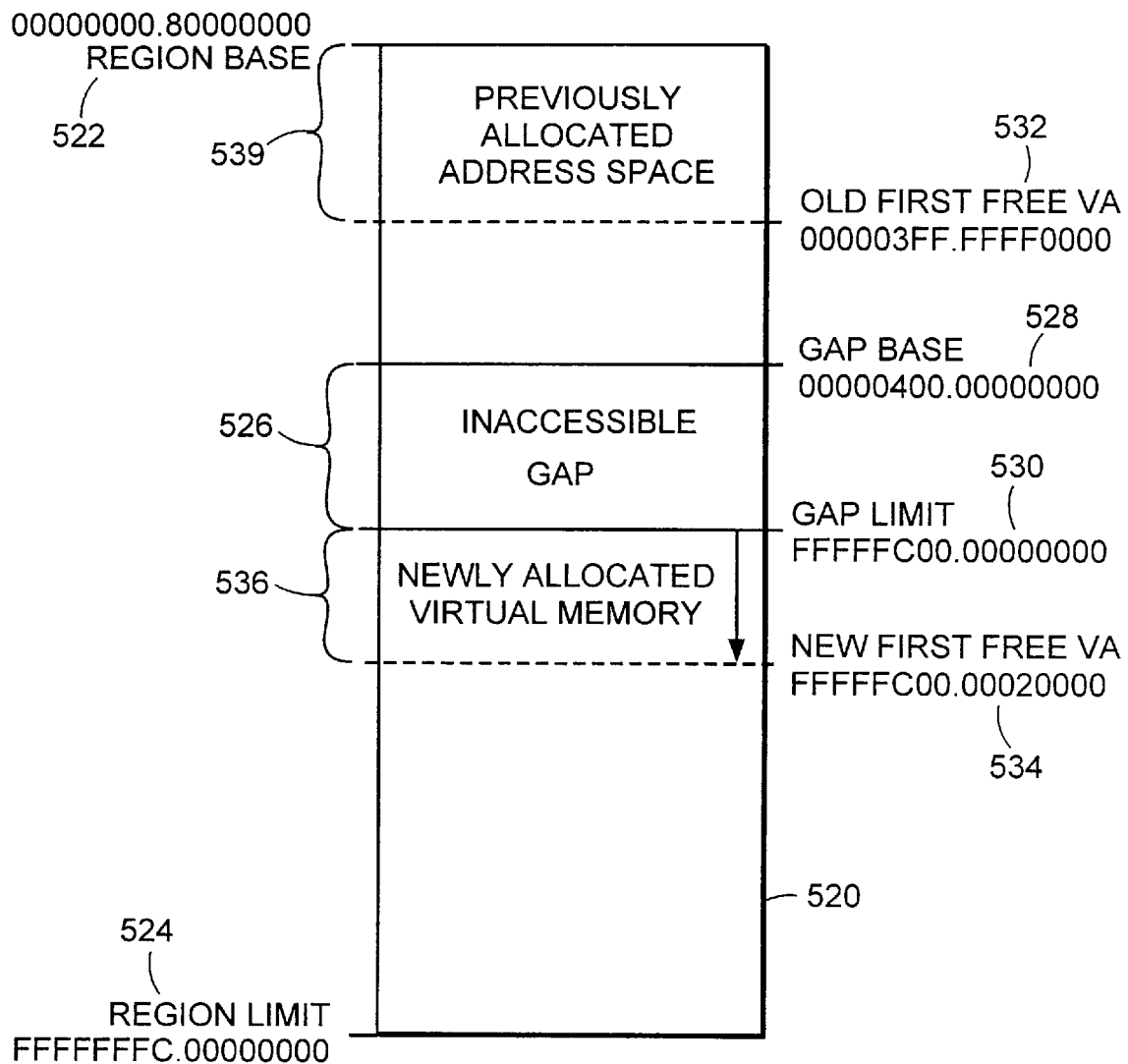
FIG. 22 is a block diagram showing virtual memory allocation performed by an example embodiment of a virtual memory allocation routine.

FIG. 22 shows an example of virtual memory allocation as performed by the example virtual memory allocation routine described in FIG. 21. A virtual memory region 520 is shown with a range of virtual addresses between a region base 522 and a region limit 524. A set of previously allocated virtual addresses 539 is shown extending between the region base 522 and an old first free virtual address 532. Further in the virtual memory region 520 is shown an inaccessible gap of virtual memory 526 ranging between a gap base 528 and a gap limit 530.

As a result of the virtual memory allocation routine described in FIG. 21, a new range of accessible virtual memory 536 has been allocated. In the example of FIG. 22, the virtual memory region 520 shows the results of an allocation request having a request byte length of 20000 (hex), and an initial associated virtual memory region 470 as shown in FIG. 20. The virtual memory allocation routine returned a starting address to the requester equal to FFFFFC00.00000000 (hex) upon its completion.

Further with reference to FIG. 22, the newly allocated virtual memory 536 begins at the gap limit 530 and extends to a new value of the first free virtual address 534. Accordingly, the virtual memory allocation routine as described in FIG. 21 has provided the currently executing process with a range of virtual addresses 536. The page table entries were added to the page table structure that may be used to map physical memory to the virtual addresses within the newly allocated virtual memory 536.

Figure 23:
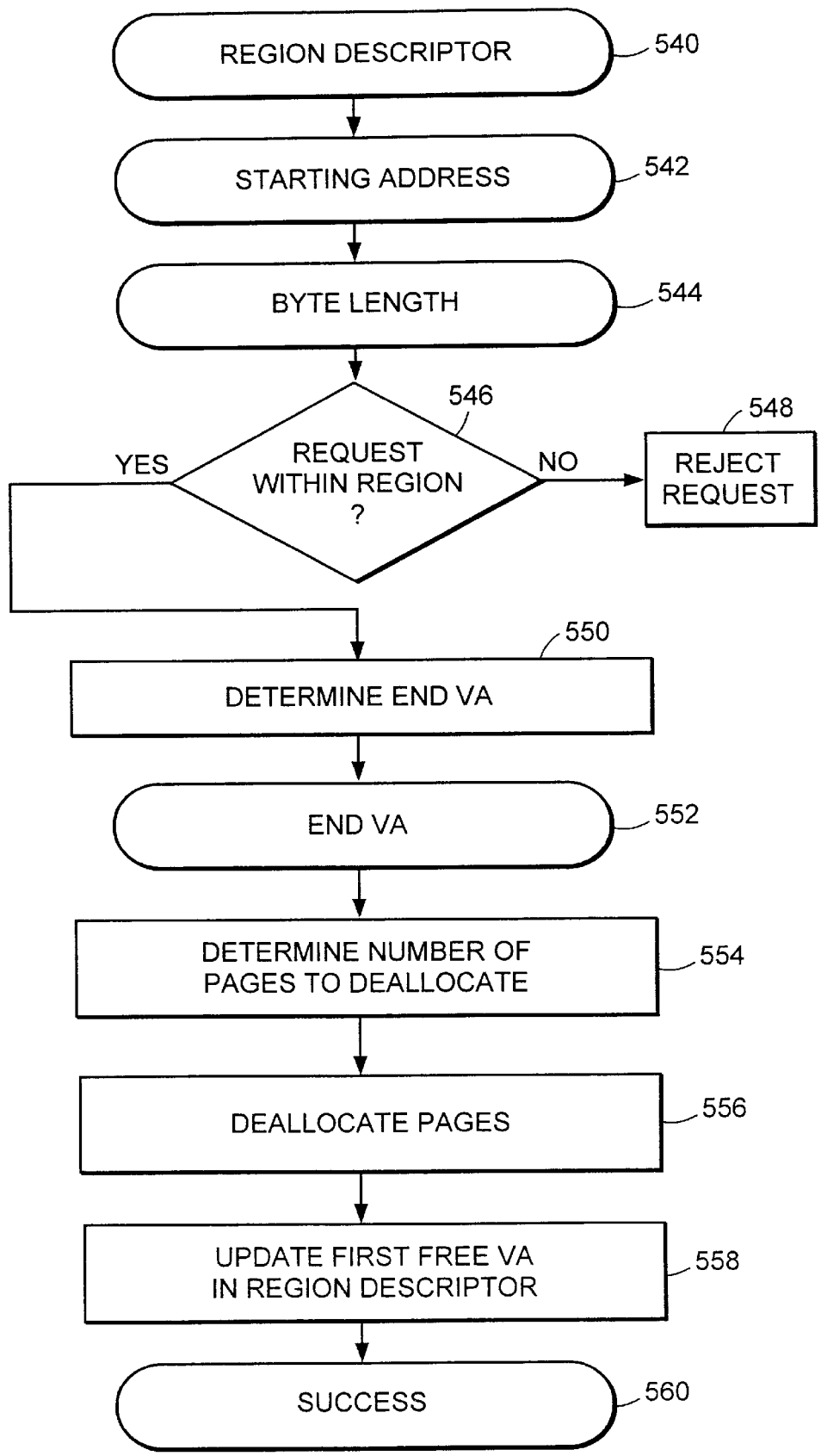
FIG. 23 is a flow chart showing steps performed by an example embodiment of a virtual memory deallocation routine.

FIG. 23 shows an example embodiment of steps performed by an example embodiment of a virtual memory de-allocation routine. Three inputs are shown in FIG. 23, for example a region descriptor 540, a starting address 542, and a byte length 544. The inputs are passed to step 546. At step 546 the example virtual memory deallocation routine determines whether the deallocation request indicated by the inputs lies within the virtual memory region described by the region descriptor 540. If the request does not lie completely with the region described by the region descriptor 540, then step 546 is followed by step 548. At step 548, the virtual memory deallocation routine rejects the deallocation request. Otherwise step 546 is followed by step 550.

At step 550, the virtual memory deallocation routine determines a value for an end virtual address variable. For example, the virtual memory deallocation routine determines the end virtual address variable value at step 550 by adding the byte length input 544 to the starting address 542 and subtracting the size of one page of memory. The end virtual address determined at 550 is then "sign-extended" into the upper address bits of the virtual address. A virtual address is said to be "sign-extended" at step 550 when it is modified such that bits n through (m−1) of the virtual address are equal to the value of bit (n−1) of the virtual address, where m is the length of the virtual address and n is a number of bits within the virtual address format used to map the virtual address to physical memory, for example as bits 0 through 42 are used in FIG. 8. In this way the present system at 550 allows for the user specified length given as byte length 544, to include or not include the size of an inaccessible gap in the example embodiment if the range of addresses the requesting process wishes to deallocate spans the gap. If the resultant end virtual address value is greater than or equal to the first free virtual address for the region described by the region descriptor 540, then some of the virtual memory in the deallocation request has previously been deallocated. Accordingly in that case the end virtual address variable is set to the value of the first free virtual address for that region minus one page, and sign-extended such that bits n through (m−1) of the virtual address are set equal to the value of bit (m−1). The value of the end virtual address 552 is output from step 550. Moreover, if the starting address 542 is greater than or equal to the first free virtual address, then the example embodiment simply returns success.

The number of virtual pages to deallocate is then determined at step 554. The number of virtual pages to deallocate is calculated at step 554 as the difference between a truncated end virtual address value and the starting address 542, also truncated, divided by the page size, plus one.

In the example embodiment of FIG. 23, the virtual addresses have a length of m bits, and bits 0 through n–1 of are used to map the virtual address to a physical address. For example, bits 0 through n–1 of the virtual address correspond to bits 0 through 42 as shown in FIG. 8, including those bits shown in Segments 1, 2 and 3 as well as the byte within page bits. Further in the virtual address of the example embodiment of FIG. 23, bits n through m–1 contain all zeros or all ones to match the value of bit n–1, just as in the field 210 shown in FIG. 8. Accordingly in the example of FIG. 23, a gap of inaccessible virtual addresses exists in the virtual address space, located equidistant from the highest virtual address and the lowest virtual address in the virtual address space, and having a size equal to $2^m - 2^n$. Further in the example embodiment of FIG. 23, a virtual address is 'truncated' by setting bits n through m–1 to zero.

Truncating the virtual addresses prior to taking the difference allows for one virtual address to be above the inaccessible gap in the example embodiment and the other virtual address to be below that gap. In this way the present system allows for a deallocation range to span an inaccessible gap within the virtual memory region indicated by the region descriptor 540.

At step 556 the virtual memory deallocation routine deallocates the number of pages determined in step 554 beginning for example at the end virtual address 550 and effectively skipping any pages within the inaccessible gap of virtual addresses within the virtual memory region described by the region descriptor 540. If the end virtual address 552 is the page immediately below the first free virtual address of the region described by the region descriptor 540, the example virtual memory deallocation routine updates the first free virtual address to point to each virtual page that is deallocated as each virtual page is deallocated. In this way, if an error is encountered and the total number of virtual pages cannot be deallocated, those which were deallocated contiguous to the old value of the first free virtual address are deallocated in spite of the error.

As each virtual page is deallocated at step 556, any page of physical memory mapped by the page table entry mapping that deallocated virtual page is returned to a pool of available physical memory for use by another process. To this end, the page table entry mapping the deallocated page of virtual memory, or some subfield thereof, may be cleared. For example, at step 556 physical pages mapped to the newly allocated virtual memory 536 in FIG. 22 would be returned to a pool of available physical memory. However, those virtual pages between the old first free virtual address 532 and the gap base 528, as well as those virtual pages not within the inaccessible gap 526 would not be mapped to physical memory, and therefore no physical pages would be returned to the pool of available physical memory for those virtual pages. Further, the physical memory used to store a page table entry mapping the deallocated page of virtual memory may also be returned to the pool of available physical memory on a page by page basis.

At step 558, the virtual memory deallocation routine updates the first free virtual address within the region descriptor 540 to point to the new first free virtual address which may subsequently be allocated to the currently executing process. For example, if all requested pages were successfully deallocated, and the end virtual address 552 indicated the page immediately below the old first free virtual address value for the region, then the first free virtual address within the region descriptor would be set to the value of starting address 542. Following step 558, at 560 the virtual memory deallocation routine returns a value indicating the status of the deallocation. For example, a successful deallocation would return the number of virtual pages successfully deallocated, or in the alternative return the range of virtual pages successfully deallocated, the number or range not including any virtual pages within the inaccessible gap.

In an alternative embodiment of the steps shown in FIG. 23, the end virtual address 552 is calculated at step 550 by adding the starting address 542 to the byte length 544 and sign-extending the result such that bits n through (m–1) of the virtual address are set equal to the value of bit (n1). In the alternative embodiment, the number of pages to deallocate is determined at step 554 as the difference between a truncated end virtual address value and the starting address 542, also truncated, divided by the predetermined page size. Further in the alternative embodiment, at step 556 pages are deallocated beginning with the page located at the ending virtual address minus one page, sign-extended as in step 550. And if the value of the ending virtual address 552 is equal to the first free virtual address, then at step 558 the alternative embodiment updates the first free virtual address to have a value equal to the value of the ending virtual address 552.

Figure 24:
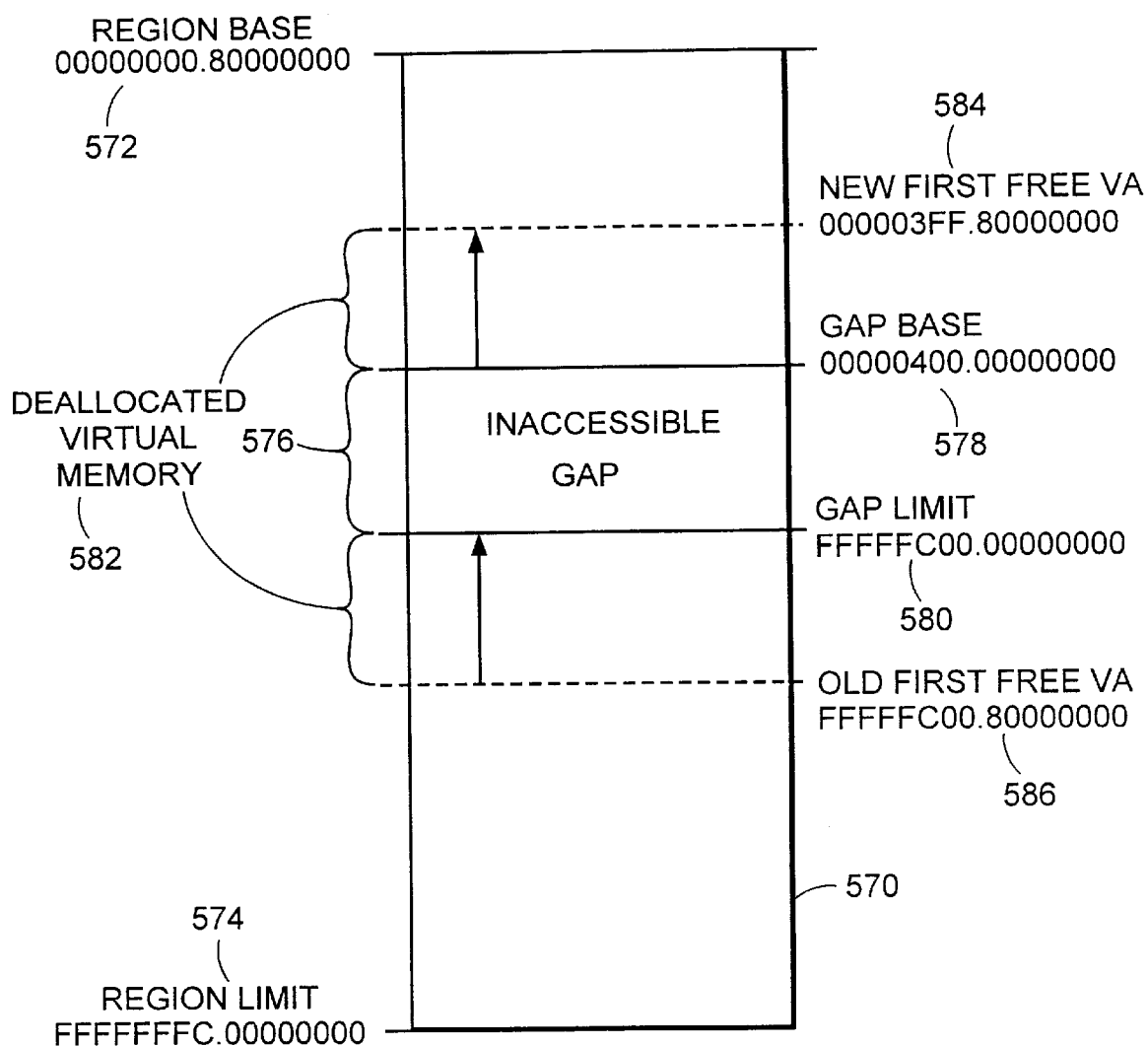
FIG. 24 is a block diagram showing virtual memory deallocation as performed by an example embodiment of a virtual memory deallocation routine.

FIG. 24 shows an example of a virtual memory region following an example execution of the virtual memory deallocation routine as described in FIG. 23. The example deallocation execution received as inputs a region descriptor describing a virtual memory region similar to virtual memory region 520 shown in FIG. 22, and a byte length of either 00000001.00000000 (hex) (not including the inaccessible gap), or FFFFF801.00000000 (hex) (including the inaccessible gap).

FIG. 24 shows a virtual memory region 570 extending between a region base 572 and a region limit 574. The virtual memory region 570 is shown including an inaccessible gap 576. A range of deallocated virtual memory 582 is shown extending between an old first free virtual address 586 and the gap limit 580, as well as between the gap base 578 and a new first free virtual address 584. In this way it is shown that the virtual memory deallocation routine described in FIG. 23 successfully deallocates the amount of virtual memory requested by a currently executing process, while avoiding an inaccessible gap 576 within the virtual memory region in which the virtual memory was deallocated.

Non-Current Page Table Structure Access

Figure 25:
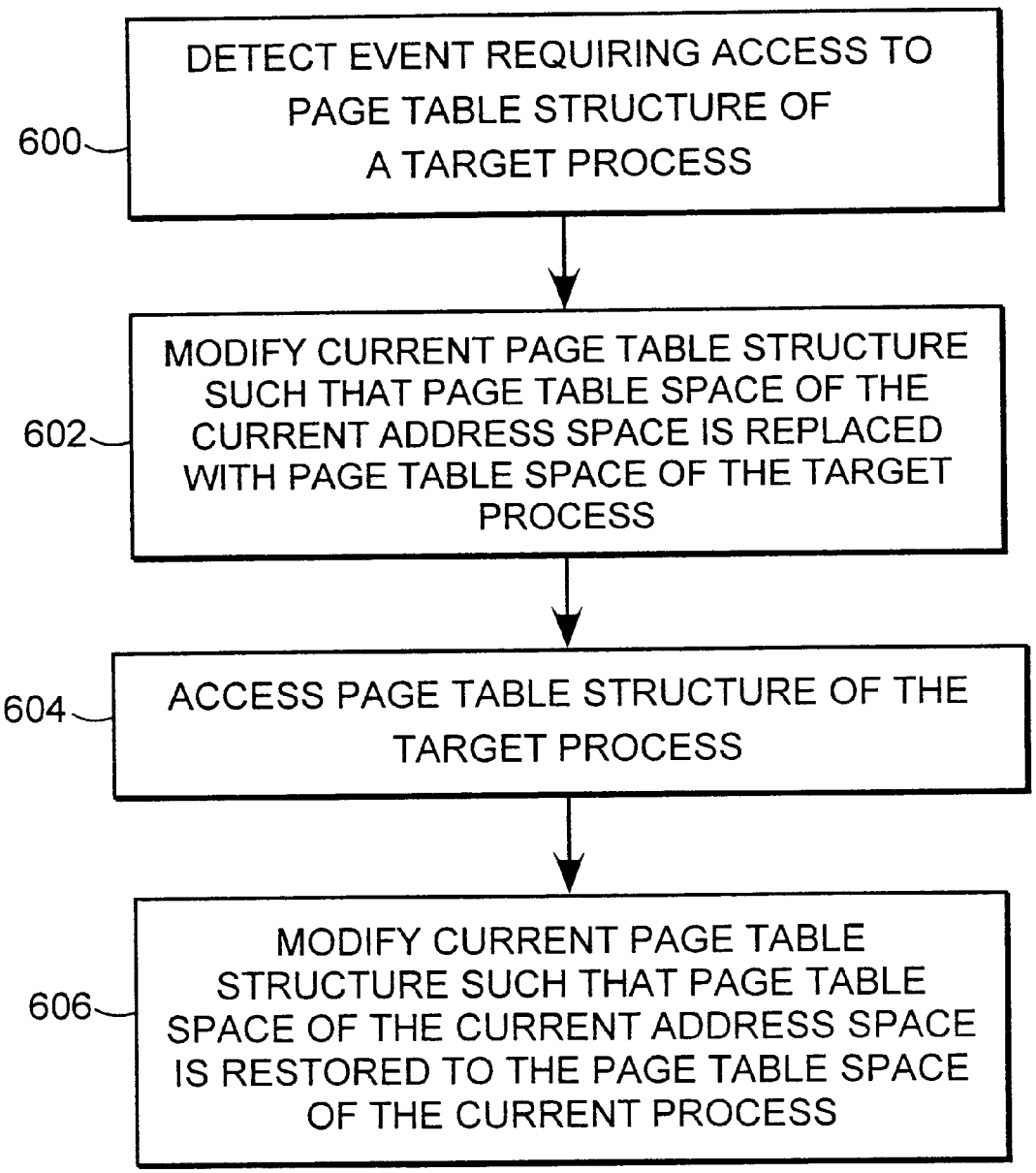
FIG. 25 is a flow chart showing the steps performed by an example embodiment of a system for providing access to the page table structure of a non-current process.

FIG. 25 shows steps performed by an example embodiment of a system for providing access to the page table structure of a non-current process. The example embodiment of FIG. 25 is for purposes of example an operating system routine or function, shown in FIG. 1 within shared/code data 28, and called or invoked by a currently executing process.

At step 600, the system of FIG. 25 detects an event requiring access to the page table structure of a non-current or "target" process. For example, the system may detect an event requiring access to process private PTEs of a target process, referred to as "target PTEs". One such event is for example when the operating system determines that the address space of the target process is to be outswapped to disk.

In an example embodiment of the system in FIG. 25, the system begins at step 600 and continues to execute in shared space, in which is located the operating system code and data, including the stack for the currently executing process. After execution of the system begins at step 600, the contents of process private space are not needed for execution, as the present system continues to execute from within shared space. Further in the system of FIG. 25, within the shared code/data there is provided a conventional data structure indicating the location of page tables for non-current processes.

At step 602 the present system modifies the current page table structure such hat the page table space of the current address space is replaced with the page table space mapping the page table structure of the target process. Step 602 is performed without a full context switch to the context of the target process.

In a first example embodiment, the present system at step 602 modifies a self-mapper PTE within the current page table structure to indicate a base of a page table structure for the target process. Examples of page table structure embodiments including a self-mapper PTE are shown in FIG. 8, FIG. 15 and FIG. 17. For example, the present system modifies the self-mapper PTE to indicate the base of a level one page table page (L1PTP) of the target process page table structure. Further in the example embodiment, as is shown in FIG. 17, the portion of the page table structure which maps shared space is itself shared for all processes. Accordingly, modification of the self-mapper in the page table structure has no effect on the execution of the present system of FIG. 25 within that shared space. The self-mapper PTE may for example be modified by writing the PFN of the L1PTP of the target process to the PFN field of the self-mapper PTE.

In an alternative example embodiment, at step 602 the system of FIG. 25 modifies the contents of the PTBR register 24. For purposes of example, in the current process context, the PTBR 24 points to the most significant page table page in the multi-level page table structure of the current process, for example as shown in FIG. 8. In the alternative embodiment of the system of FIG. 25, the PTBR register is written with a physical address (PFN) of the most significant page table page of the target process's page table structure. Thus, in this alternative example embodiment, the process context is completely unchanged except for the fact that the PTBR register has been directed to point to the page table structure of the target process.

At step 604, the system of FIG. 25 accesses the page table structure of the target process. For example, the process private page table entries of the target process may be prepared to be outswapped to disk at step 604. Accesses to the target process's page table entries are made using the same virtual addresses mapped by page table space as would be used if the target process's context were actually current. For this reason, code paths within the operating system used to access PTEs for a current process may be efficiently shared with those the present system uses to access target PTES. Such shared code paths need not be sensitive as to whether they are accessing target PTEs or those of the current process.

At step 606 the system of FIG. 25 modifies the current page table structure such that the page table space of the current address space again maps the page table entries in the page table structure of the current process. In the first example embodiment in which at step 602 the self-mapper PTE was modified to point to the page table structure of the target process, then at step 606 restoration of the current process's private space (and process private PTEs) is accomplished by writing the physical address (PFN) of the highest level page table page within the page table structure of the current process to the PFN field of the self-mapper PTE in the page table structure of the current process. This write must use a physical address to reference the self-mapper PTE of page table structure of the current process, and not the virtual address of the self-mapper PTE, since after the prior write to the self-mapper PTE in step 602, all virtual addresses within page table space are mapped to the page table structure of the target process. Accordingly, because the self-mapper PTE is itself a process private PTE, the self-mapper PTE of the current process is no longer accessible. As an alternative, a predetermined virtual address may be reserved in shared space to also map the self-mapper PTE for this purpose. One of these two techniques must be employed because the current self-mapper PTE ceased to be in the current virtual address space at its normal virtual address once it was modified to point to the target process's page table structure.

In the alternative example embodiment in which at step 602 the PTBR value was modified to point to the page table structure of the target process, restoration of the current process's private space (and corresponding process private PTEs) is accomplished by writing the PTBR with the PFN of the current process's highest level page table page.

The DIOBM Data Structure as Used to Facilitate I/O Accesses

As described above, the virtual address space of the process is related to physical memory by a tree-structured collection of page tables as described with regard to FIG. 8. Each page of virtual memory is mapped to physical memory by its specific page table entry in a specific page table for that process. The page tables for a process virtual address space are themselves contained in the virtual address space of the process. As a result the page tables that map the process private portion of the virtual address space of the given process are accessible only if the associated process is currently executing.

Such an arrangement presents a problem for I/O devices. High performance I/O devices need to be able to perform data transfers directly between the I/O device and the virtual memory of the given process.

Figure 26:
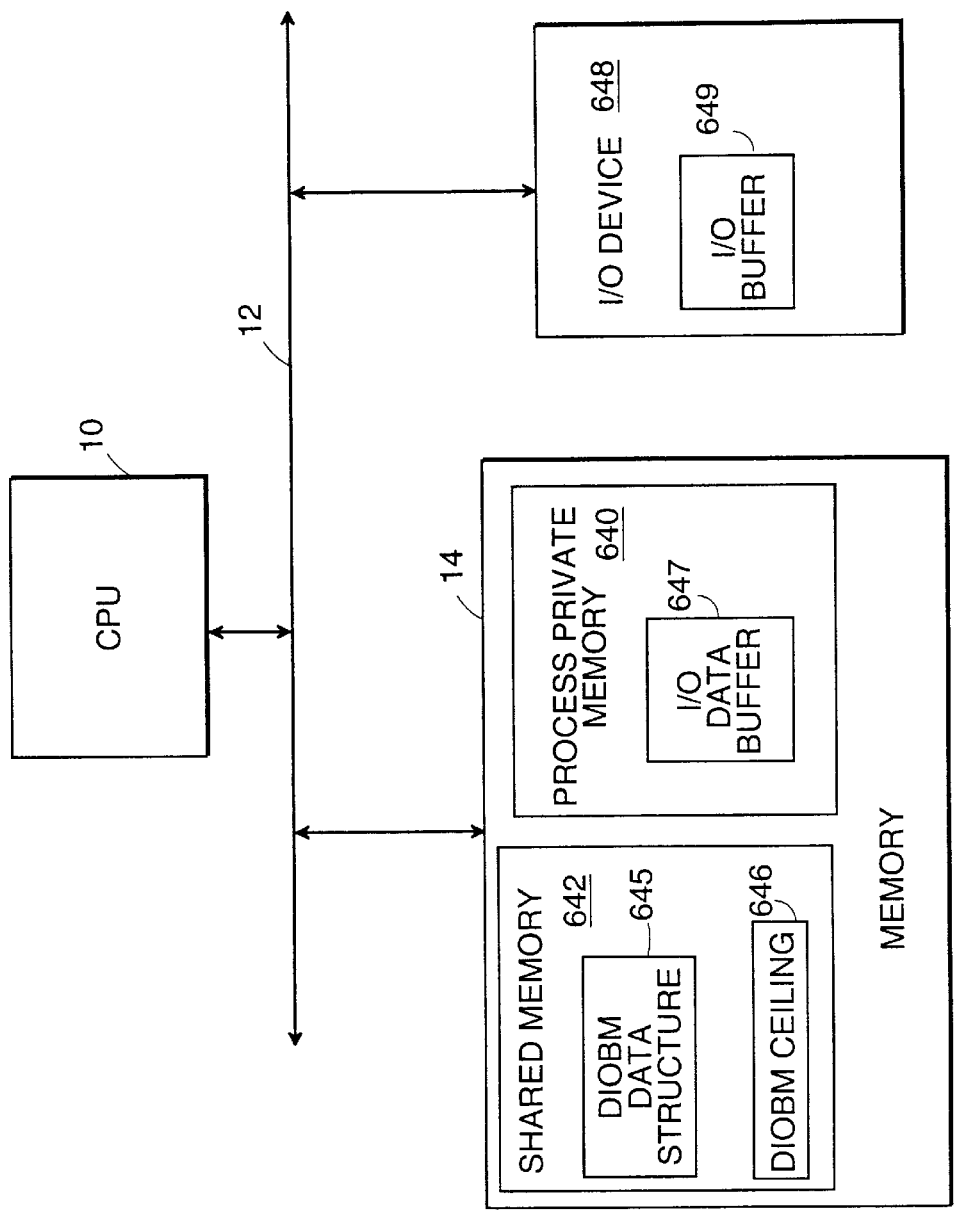
FIG. 26 is a block diagram of a computer system illustrating one embodiment of the use of a data structure for facilitating I/O access in a virtually addressed computer system.

Referring now to FIG. 26, a computer system such as that illustrated in FIG. 1 is shown to additionally include I/O device 648. Note, that for the present discussion, memory 14 is shown to include a process private memory portion 640, and a shared memory portion 642. The process memory portion includes data stored in I/O data buffer 647. This data represents data that is to be modified by an I/O device 648. A copy of the data that is to be modified is shown for example in I/O buffer 649.

The shared portion of memory 642 is shown to include a direct I/O buffer map (DIOBM) data structure 645 and a diobm ceiling cell 646. Because these values are stored in shared memory, they are available to any process executing on the CPU, and to any other device coupled to system bus 12, such as I/O device 648. As will become apparent from reading the specification, the DIOBM data structure is used to facilitate I/O transfers in the present embodiment of the invention, while the diobm ceiling cell 646 is used to select a method of physical I/O addresses translation.

The I/O subsystem and device drivers use the physical page frame number (PFN) stored in the process PTEs to enable the I/O devices to map the process virtual memory addresses into physical memory. Once such an I/O transfer is initiated, it must be able to proceed under the control of the I/O device without the continued involvement of the initiating process and especially if the initiating process is not current any more.

However, because the PTEs for process private space are stored in private space, when the process is switched out the PTE is no longer available to provide for physical to virtual address translation. Therefore, a solution must be provided that gives the I/O device drivers access to the PTEs to allow for them to correctly complete their accesses after the current process has swapped out.

According to one embodiment of the invention, there are three different methods that may be used to provide PTE access to I/O device drivers. Each of the three methods provides optimum performance for a given transfer size; however, the advantages to the three are particular to the associated size.

In determining which of the three methods to use to provide PTE access to the I/O driver, a common data structure, called the direct I/O buffer map (DIOBM) is used. The DIOBM data structures have three types: a fixed size DIOBM structure, a variably size DIOBM structure, and a SPTE window type DIOBM data structure.

Figure 27:
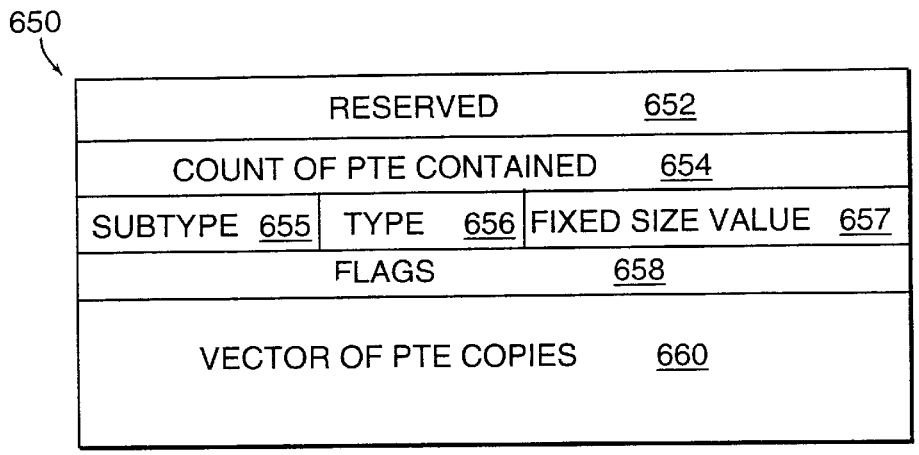
FIG. 27 illustrates one format of the data structure of FIG. 26, where the data structure is used to provide fixed size storage of PTE entries.

Referring now to FIG. 27, an example of a fixed size DIOBM data structure layout is shown. A fixed size DIOBM data structure 650 is shown to include a reserved field 652 (the function of which will be described later herein), a count field 654, a subtype field 655, a type field 656, a fixed sized field 657, a flags field 658, and a vector of PTE copies 660.

The size of the DIOBM data structure is 88 bytes, including 8 bytes each for each of the stored PTEs and additional bytes for the counts, flags, etc. The maximum value of 9 stored PTEs was selected because it is sufficient to handle the majority of I/O requests, although the majority of requests are mapped by 1, 2 or 3 PTEs.

The reserved field 652 is used for storing a pointer to other DIOBM data structures as will be described in more detail below. The count field 654 is for storing a count of the number of PTEs that are stored as the vector of PTE copies 660. The subtype and type fields, 655 and 656 respectively, are common fields to all types of Virtual Memory System (VMS) data structures, and store unique identifiers for every type of privileged data structure. In the present embodiment, the 'type' field identifies the data structure as a 'miscellaneous' type of data structure of subtype DIOBM.

The fixed size value field 657 stores the value 88 which is the total size of a fixed size DIOBM structure. The size field is also a common field to all types of VMS data structures, and is written to when the structure is allocated from shared memory and is read when the structure is deallocated and returned to the pool of available memory. As mentioned above, the present embodiment the fixed size value used was 9 PTE vectors, although it should be readily understood that that number may be increased or decreased depending upon the requirements of the I/O subsystem and the constraints of the memory address space.

The flags field includes the following flags: WINDOW, AUX_INUSE, and REL_DALLOC, among others. For a fixed size DIOBM data structure, none of these flags are set, and thus the function of these flags will be described with relation to the other types of data structures.

Thus the DIOBM data structure 650 is a small fixed size data structure that can be imbedded in various I/O control data structures with minimal impact on system memory consumption. A DIOBM can also be separately allocated from shared system space memory by a device driver as needed.

If the PTEs needed to map the range of virtual memory spanned by the I/O transfer fit into the fixed size DIOBM, the PTEs are copied into the vector field 660 of the DIOBM data structure 650. The device drivers in the I/O subsystem are given a pointer to the PTEs within the DIOBM and subsequently access the PTE copies within the DIOBM as if they were accessing the page table.

However, if the number of PTEs needed to map the I/O transfer exceeds the capacity of the fixed size DIOBM, a decision must be made as to whether to generate a second, variably sized DIOBM or whether to use a different method of PTE translation.

A variably sized DIOBM is a DIOBM can be used to store any number of PTE vectors. The variably sized DIOBM is typically used for very large and fairly atypical I/O transfers. However, there are some drawbacks to the use of the variably sized DIOBM data structure. First, the system memory consumption of a variable size DIOBM is directly proportional to the size of the I/O transfer; therefore, consideration must be given as to whether or not system resources should be allocated to storing these PTEs. Second, the performance impact required to copy the necessary PTEs is also proportional to the I/O transfer size and will begin to dominate other performance costs as the transfer size increases.

Accordingly, a ceiling or limit must be established on the number of PTEs that should be stored in the variably sized DIOBM data structure. The ceiling value is stored in a system-wide data cell 646 (see FIG. 26), and the procedure used to set the ceiling value will be discussed later herein.

If it is determined that the number of PTEs is within the ceiling value, then a variably sized DIOBM data structure will be selected for use. A variably sized DIOBM data structure is always linked to a fixed size DIOBM data structure. For example, referring now to FIG. 28, a layout of a fixed sized DIOBM structure 680 coupled to a secondary DIOBM 690 is shown.

The fixed DIOBM structure 680 includes field 682 (previously a reserved field) for storing a pointer to the secondary, variably sized DIOBM structure 690. The 'count' field 684 is set to a 0, since the 'count' field of the variably sized DIOBM will be used instead. The type, subtype and fixed size field (685,686, and 687, respectively) are identical to that described in FIG. 27. The flags field now has the AUX_INUSE set. This flag indicates that a variably sized DIOBM was dynamically created for this I/O transaction. The REL_DEALLOC flag in the flags field 698 in the variably sized DIOBM is set to indicate that the DIOBM 690 should be automatically deallocated. These flag indicate that a variably sized DIOBM data structure was dynamically created for this I/O transaction, and that the DIOBM 690 should be automatically deallocated when the I/O transaction is complete and the fixed size DIOBM data structure 680 is released.

Note that when using a variably sized DIOBM data structure, field 689 does not include any vectors for PTEs. Rather, all of the PTE vectors will be stored in field 699 of the variably sized DIOBM data structure 690.

Other fields of the secondary DIOBM data structure 690 are defined as follows. The count field 694 includes a count of PTE vectors stored in field 699. The count field 694 contains the count of PTE entries stored in the PTE vector field 699. The flags field has none of the flag values set. The actual size field 697 stores the total size of this DIOBM structure 690. It includes the bytes needed to store the vector of PTE entries plus the 16 bytes needed for the other fields (692, 694, 695, 696, 697 and 698) at the beginning of the DIOEM structure. In this embodiment, the PTE vector 699 will contain sufficient room to accommodate more than 9 PTE entries and the value stored in 697 will be greater than 88.

If the PTE count exceeds the DIOBM ceiling value stored in cell 646 (FIG. 26), or if there is currently insufficient system-dynamic memory to allocate the required secondary DIOBM, a different method of PTE translation is employed. This third method creates a window of shared system virtual address space onto the required page table pages in the private portion of the process page tables. The procedure for creating a window is similar to that described previously, however, there are some particulars with regard to the I/O transfer as will become apparent.

Figure 29:
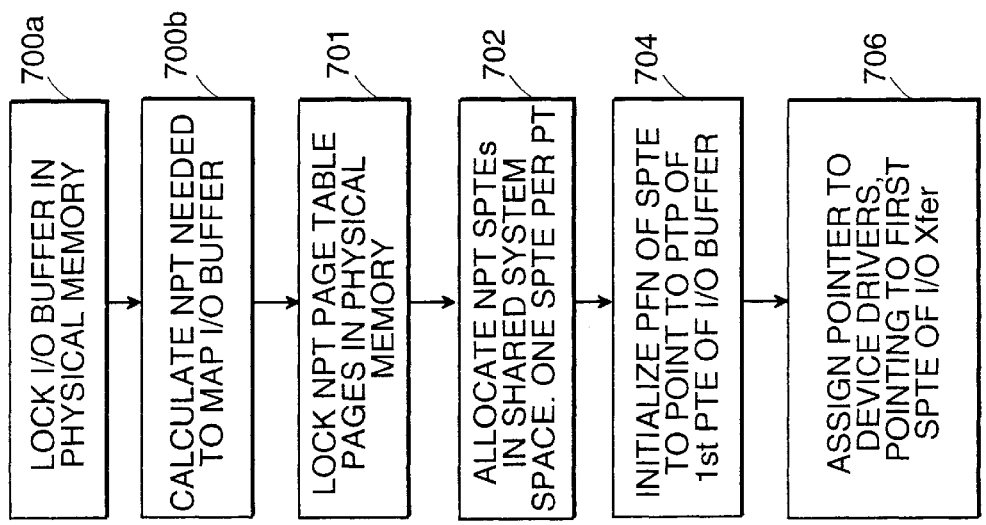
FIG. 29 is a flow diagram illustrating the process used for creating an SPTE window for use in an I/O transaction.

Referring now to FIG. 29, the procedure used to create an SPTE window onto process page tables will now be described with reference to some elements shown in FIG. 26.

At step 700a, the I/O buffer 647 in process memory with which the I/O device 648 is communicating is 'locked' into physical memory by the current process. By definition, the page table entries that map the user's buffer must be present in virtual memory since the process is current. The page table entries that map the I/O buffer are contained in one or more virtually contiguous page table pages, shown as 718 and 720 in FIG. 30.

At step 700b, the number of page tables (hereinafter referred to as NPT) needed to map the I/O buffer is calculated from the size of the I/O buffer, its alignment in virtual memory, and the number of page table entries that fit into a single page. At step 701, the NPT page table pages are 'locked' into physical memory.

At step 702, NPT virtually contiguous system page table entries are allocated. Accordingly, it can be seen that since only one SPTE is mapped for each page table page (which may include a number of PTEs), the memory consumption is small even for extremely large I/O transfers. This set of SPTEs provides the virtual to physical address mapping for a range of shared system virtual address space.

At step 704, the PFN of the first of the NPT allocated SPTEs is initialized to contain the value of the PFN of the first of the process page table pages that contain the PTEs that map the I/O buffer. In addition, all of the NPT allocated SPTEs are initialized such that the PFN of the SPTE is set to the PFN of the next process page table page. In this way, the process page tables are mapped into a range of shared system virtual address space. Effectively, this range of shared system address space becomes a 'window' into the process page tables and the PTEs that map the I/O buffer.

At step 706 a pointer within this window in shared system space is given to the device driver and the I/O subsystem. This pointer effectively points to the first PTE that maps the I/O buffer.

It should be noted that the PTE window exists only for the duration that the buffer is locked down for the I/O transaction. During the I/O buffer unlock, the system space pages used as the window on to the page table pages would be rendered invalid and then deallocated. The temporary double mapping of page tables would, therefore, evaporate.

Figure 30:
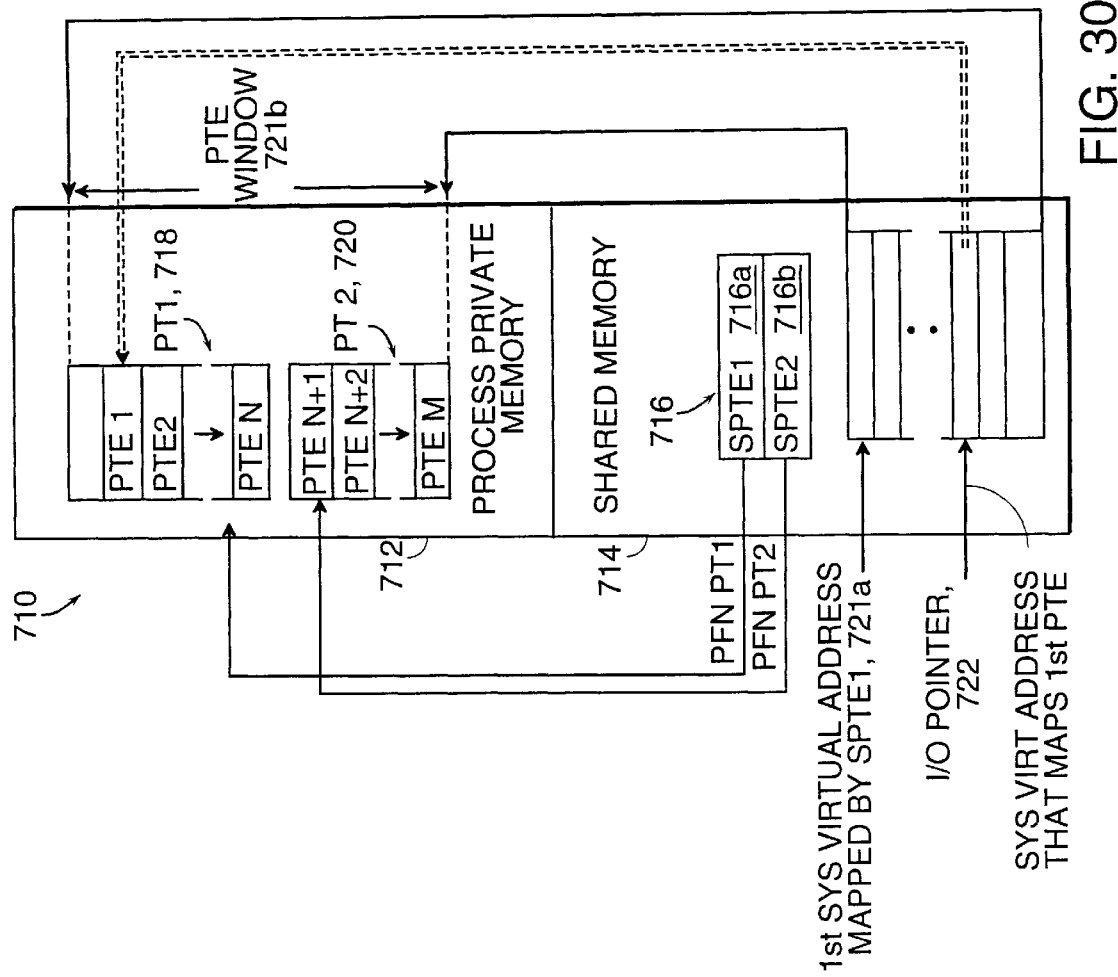
FIG. 30 is an example illustrating the contents of memory when providing an SPTE window through the process of FIG. 29.

Referring now to FIG. 30, an example block diagram of a PTE window created using the process provided in FIG. 29 is shown. The memory 710 is shown apportioned into process private memory 712 and shared memory 714. By way of example only, two SPTE entries 716a and 716b are shown, each pointing to page table pages 718 and 720, respectively. It should be understood that only 4 page table entries are shown for each page table page for ease of description only, and that in practice the page table pages are arranged as previously described in FIG. 8.

The SPTEs 716a and 716b each provide a mapping for one page of shared virtual address space. In this example, SPTE 716a maps the address 712a which is the lowest address of the PTE window 721b. Since there are two SPTEs in this example, the range of the PTE window 721b is two pages. Moreover, because the PFN field of SPTE 716a has been set to the PFN of PT1 and the PFN of SPTE 716b has been set to the PFN of PT2, an access to a system virtual address in the range of 721b results in an actual access to the process page table pages 718 and 720.

Because the PTE window is in shared system space, it can be used to access page tables in process private memory regardless of whether that page is current. The SPTEs in the shared system memory are the only additional real memory resources required to realize the window and are a small fraction of the shared system memory that would be required to contain copies of all the PTEs that map the I/O buffer.

The pointer within the window in shared system virtual outer space that is provided to the device drivers and I/O subsystem is shown as pointer 722. Note that accessing this SPTE will provide the page frame number of the page table page containing the first PTE that maps the I/O transfer.

The SPTE stack 716 thus provides a window onto the PTEs for each process may be obtained regardless of whether or not the process is current. Because only the SPTEs are stored in shared memory, a much smaller amount of memory resources are used for the I/O transfer.

In the unlikely event of insufficient SPTEs, the initiating process is suspended until additional system memory becomes available. When the initiating process is resumed, a determination is made as to whether the windowing is the still the best alternative at that time, or whether a secondary DIOBM data structure would provide the optimum solution.

Figure 31:
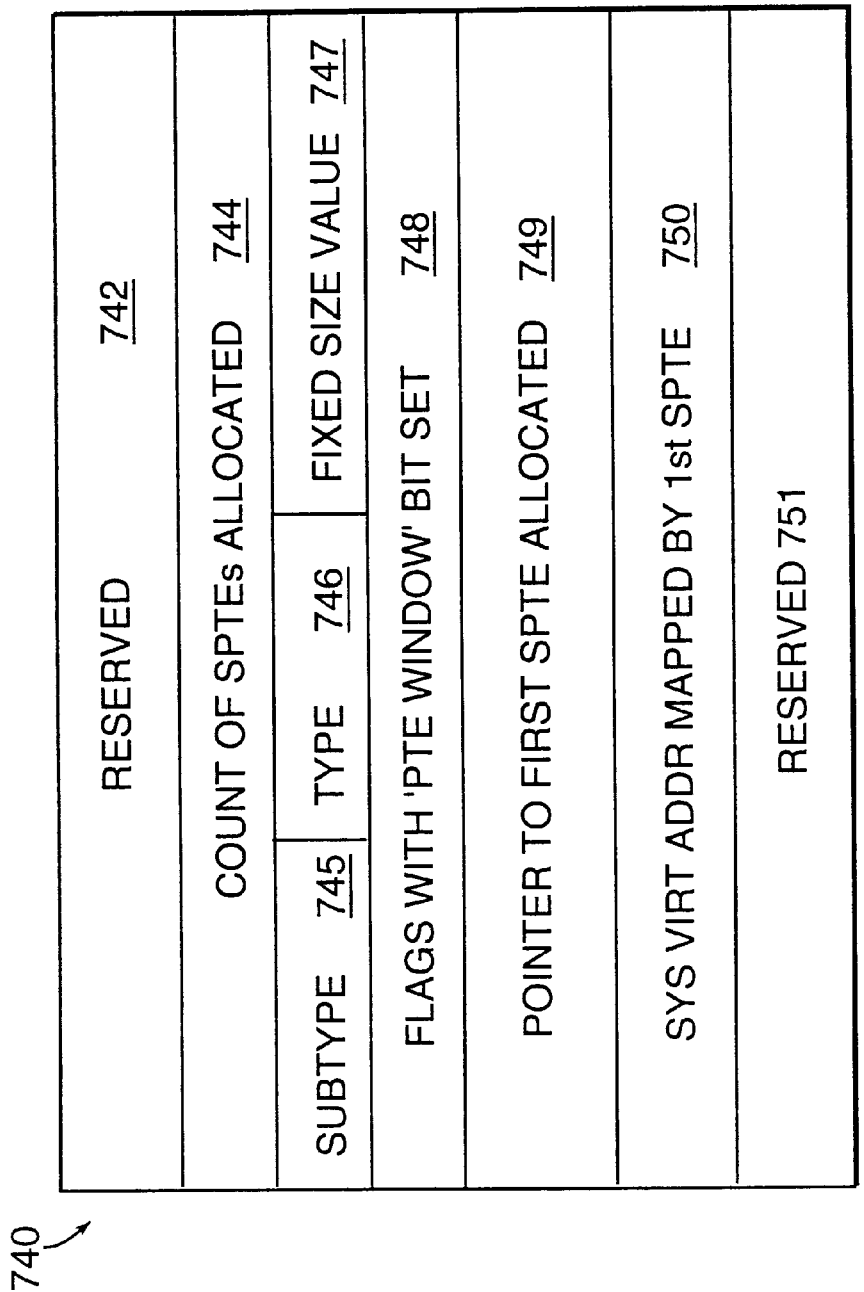
FIG. 31 illustrates a third format of the data structure of FIG. 26, where the data structure is used to provide an SPTE window as described in conjunction with FIG. 30.

Referring now to FIG. 31, a layout of-the fixed sized DIOBM structure when a PTE window is created using SPTEs is shown. Field 742 is unused. Field 744 now includes a count of the SPTEs that are allocated for the I/O transaction. Field 747 contains the size of a fixed size DIOBM which is 88 bytes in this embodiment. The flag bit PTE_WINDOW is set in flag field 748. Field 749 stores a pointer (such as the address of SPTE 716a in FIG. 30) to the first system PTE that is allocated. Field 750 stores the system virtual address that is mapped by system PTE pointed to by 749. This is the lowest address for the PTE window (such as address 712a in FIG. 30). The remaining space 751 in the fixed size DIOBM 740 is reserved.

Regardless which method is employed, the fixed size DIOBM data structure, the variably sized DIOBM data structure, or the windowing method, the I/O subsystem and device drivers are given a pointer within shared system virtual address space to the required PTE values. In all cases, the fixed size DIOBM data structure serves as the common handle. When the I/O transfer is completed, this DIOBM data structure is passed to a single system routine that deallocates the secondary DIOBM or deallocates the SPTEs as appropriate.

As mentioned above, the tradeoffs must be used when determining whether to use the secondary DIOBM transfer method, or to use the PTE windowing method. The determination is made through the examination of the value of the DIOBM ceiling cell 646 (FIG. 26). Thus it is the ceiling value that dictates how the system resources are to be used to perform the I/O transfer; i.e. whether SPTEs should be used with an additional level of translation to provide a window, or whether a vector of PTE copies are to be stored.

The ceiling value is a system wide data cell for controlling the switch from the use of PTE copies method to the use of the PTE window. Performance studies have demonstrated that for large I/O transfers, the run-time overhead for the secondary DIOBM method is relatively low but rises linearly with buffer size. In contrast, the runtime overhead for the PTE window method is initially relatively high but is essentially fixed regardless of I/O transfer size. Therefore, as the buffer size increases, the overhead of the secondary DIOBM method approaches the overhead of the SPTE window method until finally the fixed overhead of the PTE window method remains lower than the continually rising cost of the secondary DIOBM data structure method.

Although the overhead of the PTE window method does not vary significantly as a function of the I/O transfer size, it is significantly higher on a multiprocessor system when compared to a uniprocessor system. This is because invalidation of the PTE window must be propagated to all processors in a multiprocessor system. Therefore, the crossover point, as a function of the PTE count, was experimentally derived for uniprocessor and multiprocessor systems.

The system wide data ceiling value 646 cell contains the maximum number of PTEs that are to be stored in a variably size DIOBM data structure. On system bootstrap, it is initialized to the appropriate value based on whether the system is a uniprocessor or multiprocessor system. For uniprocessor systems, the ceiling value is typically in the range of 94 PTEs while for multiprocessor systems, the ceiling is in the range of 430 PTEs. It should be noted, however, that the present invention is not limited to providing an initial ceiling value. Rather it is the ability to dynamically control how the I/O transfer is to be performed that is a key concept of the present invention. Thus, because the ceiling value is system wide, it may be updated at any point during execution responsive to resource availability and the requirements of the various processes.

Figure 32:
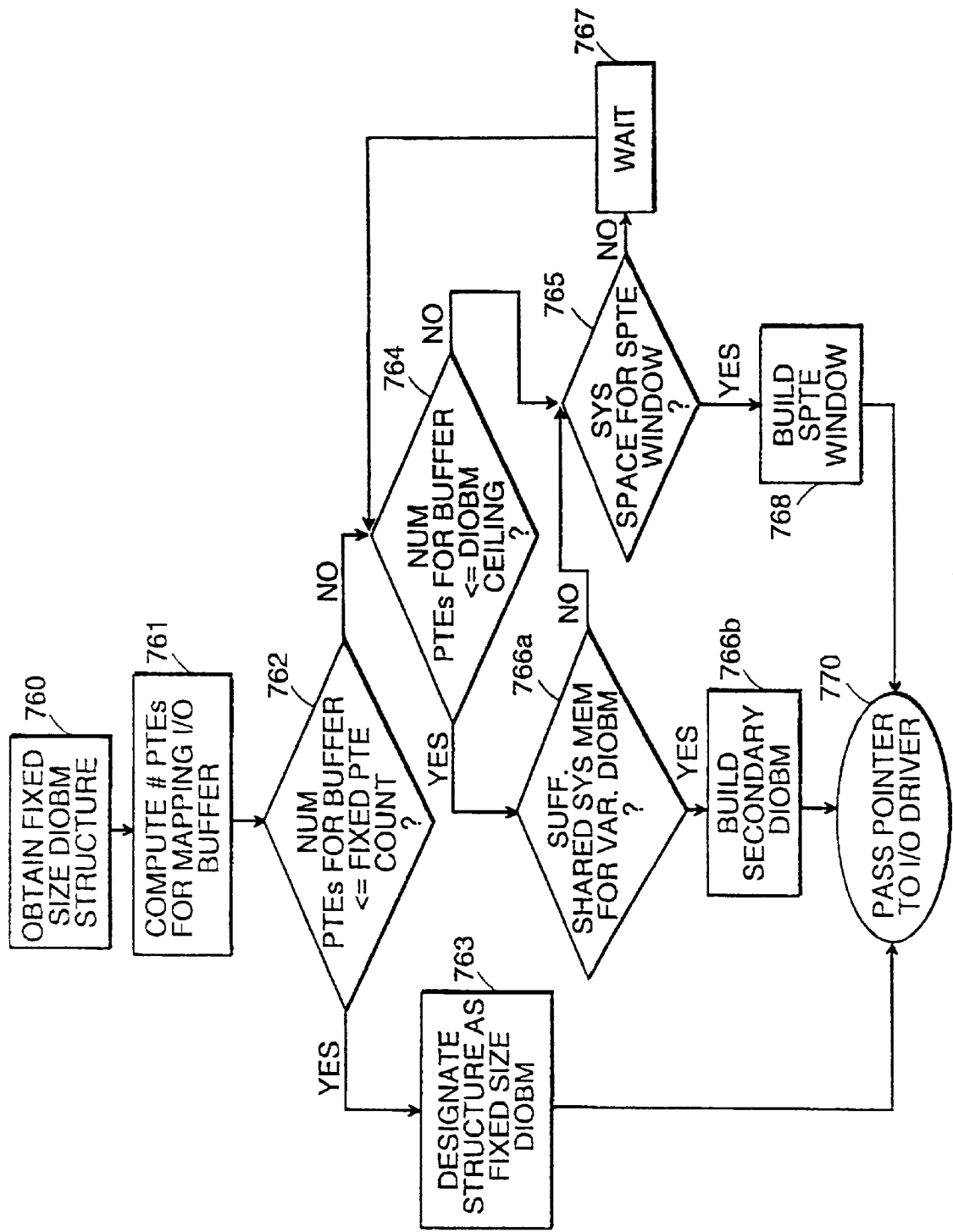
FIG. 32 is a flow diagram illustrating the decision process used to determine which of one of the data structures of FIGS. 27, 28 or 30 are used to perform an I/O transfer in the computer system of FIG. 26.

Referring now to FIG. 32, a flow diagram illustrating the entire dynamic mapping process is provided. At step 760 a fixed sized DIOBM is obtained. Because it is of fixed size, a DIOBM can be embedded in each standard system I/O request packet. Alternatively, a fixed size DIOBM structure can be allocated from shared memory.

At step 761, the number of PTEs that are required to map the I/O buffer are computed. The number of PTEs is a function of the size of the I/O transfer, the page alignment of the starting virtual address of the I/O buffer, and the page size.

At step 762 the computed number of PTEs required to map the I/O buffer is compared against the number of PTEs that can be contained in a fixed size DIOBM. As mentioned previously, in the present embodiment, a value of 9 is used, though other values may also be effective.

At step 763 if the computed number of PTEs will fit into the fixed size DIOBM, the PTEs are copied into the PTE vector, and at step 770, a pointer to the DIOBM is passed to the I/O driver.

If at step 762 it was determined that the computed number of PTEs exceeded the capacity of a fixed size DIOBM, then at step 764, the computed number is compared against the DIOBM ceiling value stored in cell 646 (FIG. 26).

Figure 28:
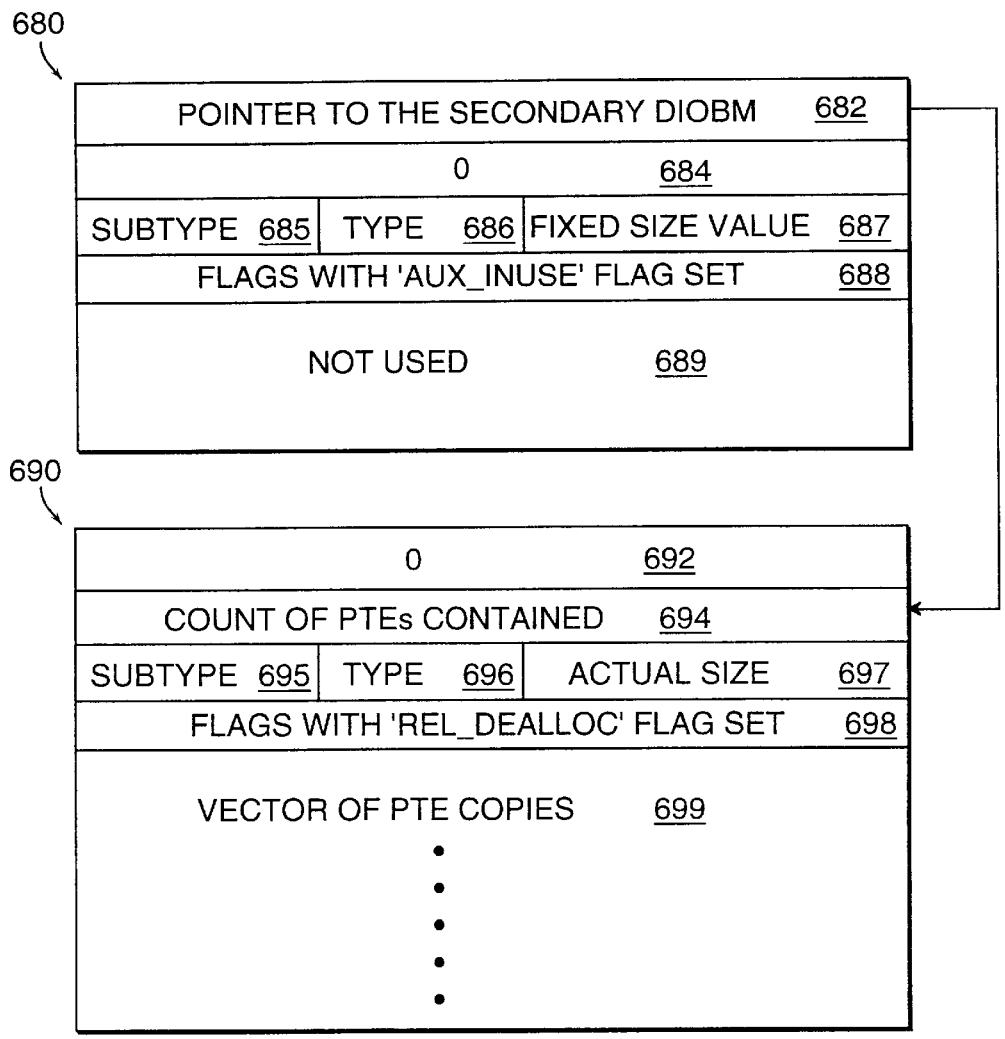
FIG. 28 illustrates a second formation of the data structure of FIG. 26, where the data structure is used to provide variably sized storage for PTE entries.

If the computed number of PTEs is less than or equal to the ceiling value at step 766*a* it is then determined if there is sufficient shared system memory to create a sufficiently sized secondary DIOBM. If there is sufficient shared system memory, at step 766*b*, a secondary DIOBM is created, linked into the fixed size DIOBM data structure as shown in FIG. 28, the PTEs that map the I/O buffer are copied to the PTE vector in the secondary DIOBM, and a pointer to the secondary DIOBM is passed to the I/O driver.

If, at step 764, it is determined that the computed number of PTEs is grater than the ceiling value, or if at step 766*a*, there is insufficient shared system memory for a sufficiently sized secondary DIOBM structure, then at step 765 it is determined if there are sufficient system PTEs to create a sufficiently sized PTE window. That is, a set of SPTEs is required such that there is one SPTE for each process page table page containing the PTEs that map the I/O buffer. When there are sufficient SPTEs, at step 768 the SPTE widow is created as described in FIG. 29, and the fixed size DIOBM structure is initialized as shown in FIG. 31. Then, at step 770, a pointer within the created PTE window in shared system space is passed to the I/O driver.

While the example embodiments have been described as allocating virtual memory from low virtual addresses into higher virtual addresses, and deallocating virtual memory from higher virtual addresses into lower virtual addresses, it will be evident to one skilled in the art that the principles of the invention herein disclosed apply to alternative embodiments in which the allocated virtual addresses of a process grow from higher into lower virtual addresses, and are deallocated from higher virtual addresses into lower virtual addresses. The modifications required by such alternative embodiments will be well apparent to those skilled in the art upon reference to this description.

In addition, while the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

Truncating the virtual addresses prior to taking the difference allows for one virtual address to be above the inaccessible gap in the example embodiment and the other virtual address to be below that gap. In this way the present system allows for a deallocation range to span an inaccessible gap within the virtual memory region indicated by the region descriptor 540.

At step 556 the virtual memory deallocation routine deallocates the number of pages determined in step 554 beginning for example at the end virtual address 550 and effectively skipping any pages within the inaccessible gap of virtual addresses within the virtual memory region described by the region descriptor 540. If the end virtual address 552 is the page immediately below the first free virtual address of the region described by the region descriptor 540, the example virtual memory deallocation routine updates the first free virtual address to point to each virtual page that is deallocated as each virtual page is deallocated. In this way, if an error is encountered and the total number of virtual pages cannot be deallocated, those which were deallocated contiguous to the old value of the first free virtual address are deallocated in spite of the error.

As each virtual page is deallocated at step 556, any page of physical memory mapped by the page table entry mapping that deallocated virtual page is returned to a pool of available physical memory for use by another process. To this end, the page table entry mapping the deallocated page of virtual memory, or some subfield thereof, may be cleared. For example, at step 556 physical pages mapped to the newly allocated virtual memory 536 in FIG. 22 would be returned to a pool of available physical memory. However, those virtual pages between the old first free virtual address 532 and the gap base 528, as well as those virtual pages not within the inaccessible gap 526 would not be mapped to physical memory, and therefore no physical pages would be returned to the pool of available physical memory for those virtual pages. Further, the physical memory used to store a page table entry mapping the deallocated page of virtual memory may also be returned to the pool of available physical memory on a page by page basis.

At step 558, the virtual memory deallocation routine updates the first free virtual address within the region descriptor 540 to point to the new first free virtual address which may subsequently be allocated to the currently executing process. For example, if all requested pages were successfully deallocated, and the end virtual address 552 indicated the page immediately below the old first free virtual address value for the region, then the first free virtual address within the region descriptor would be set to the value of starting address 542. Following step 558, at step 560 the virtual memory deallocation routine returns a value indicating the status of the deallocation. For example, a successful deallocation would return the number of virtual pages successfully deallocated, or in the alternative return the range of virtual pages successfully deallocated, the number or range not including any virtual pages within the inaccessible gap.

In an alternative embodiment of the steps shown in FIG. 23, the end virtual address 552 is calculated at step 550 by adding the starting address 542 to the byte length 544 and sign-extending the result such that bits n through (m−1) of the virtual address are set equal to the value of bit (n1). In the alternative embodiment, the number of pages to deallocate is determined at step 554 as the difference between a truncated end virtual address value and the starting address 542, also truncated, divided by the predetermined page size. Further in the alternative embodiment, at step 556 pages are deallocated beginning with the page located at the ending virtual address minus one page, sign-extended as in step 550. And if the value of the ending virtual address 552 is equal to the first free virtual address, then at step 558 the alternative embodiment updates the first free virtual address to have a value equal to the value of the ending virtual address 552.

FIG. 24 shows an example of a virtual memory region following an example execution of the virtual memory deallocation routine as described in FIG. 23. The example deallocation execution received as inputs a region descriptor describing a virtual memory region similar to virtual memory region 520 shown in FIG. 22, and a byte length of either 00000001.00000000 (hex) (not including the inaccessible gap), or FFFFF801.00000000 (hex) (including the inaccessible gap).

FIG. 24 shows a virtual memory region 570 extending between a region base 572 and a region limit 574. The virtual memory region 570 is shown including an inaccessible gap 576. A range of deallocated virtual memory 582 is shown extending between an old first free virtual address 586 and the gap limit 580, as well as between the gap base 578 and a new first free virtual address 584. In this way it is shown that the virtual memory deallocation routine described in FIG. 23 successfully deallocates the amount of virtual memory requested by a currently executing process, while avoiding an inaccessible gap 576 within the virtual memory region in which the virtual memory was deallocated.

Non-Current Page Table Structure Access

FIG. 25 shows steps performed by an example embodiment of a system for providing access to the page table structure of a non-current process. The example embodiment of FIG. 25 is for purposes of example an operating system routine or function, shown in FIG. 1 within shared/code data 28, and called or invoked by a currently executing process.

At step 600, the system of FIG. 25 detects an event requiring access to the page table structure of a non-current or "target" process. For example, the system may detect an event requiring access to process private PTEs of a target process, referred to as "target PTEs". One such event is for example when the operating system determines that the address space of the target process is to be outswapped to disk.

In an example embodiment of the system in FIG. 25, the system begins at step 600 and continues to execute in shared space, in which is located the operating system code and data, including the stack for the currently executing process. After execution of the system begins at step 600, the contents of process private space are not needed for execution, as the present system continues to execute from within shared space. Further in the system of FIG. 25, within the shared code/data there is provided a conventional data structure indicating the location of page tables for non-current processes.

At step 602 the present system modifies the current page table structure such that the page table space of the current address space is replaced with the page table space mapping the page table structure of the target process. Step 602 is performed without a full context switch to the context of the target process.

In a first example embodiment, the present system at step 602 modifies a self-mapper PTE within the current page table structure to indicate a base of a page table structure for the target process. Examples of page table structure embodiments including a self-mapper PTE are shown in FIG. 8, FIG. 15 and FIG. 17. For example, the present system modifies the self-mapper PTE to indicate the base of a level one page table page (L1PTP) of the target process page table structure. Further in the example embodiment, as is shown in FIG. 17, the portion of the page table structure which maps shared space is itself shared for all processes. Accordingly, modification of the self-mapper in the page table structure has no effect on the execution of the present system of FIG. 25 within that shared space. The self-mapper PTE may for example be modified by writing the PFN of the L1PTP of the target process to the PFN field of the self-mapper PTE.

In an alternative example embodiment, at step 602 the system of FIG. 25 modifies the contents of the PTBR register 24. For purposes of example, in the current process context, the PTBR 24 points to the most significant page table page in the multi-level page table structure of the current process, for example as shown in FIG. 8. In the alternative embodiment of the system of FIG. 25, the PTBR register is written with a physical address (PFN) of the most significant page table page of the target process's page table structure. Thus, in this alternative example embodiment, the process context is completely unchanged except for the fact that the PTBR register has been directed to point to the page table structure of the target process.

At step 604, the system of FIG. 25 accesses the page table structure of the target process. For example, the process private page table entries of the target process may be prepared to be outswapped to disk at step 604. Accesses to the target process's page table entries are made using the same virtual addresses mapped by page table space as would be used if the target process's context were actually current.

For this reason, code paths within the operating system used to access PTEs for a current process may be efficiently shared with those the present system uses to access target PTES. Such shared code paths need not be sensitive as to whether they are accessing target PTEs or those of the current process.

At step 606 the system of FIG. 25 modifies the current page table structure such that the page table space of the current address space again maps the page table entries in the page table structure of the current process. In the first example embodiment in which at step 602 the self-mapper PTE was modified to point to the page table structure of the target process, then at step 606 restoration of the current process's private space (and process private PTEs) is accomplished by writing the physical address (PFN) of the highest level page table page within the page table structure of the current process to the PFN field of the self-mapper PTE in the page table structure of the current process. This write must use a physical address to reference the self-mapper PTE of page table structure of the current process, and not the virtual address of the self-mapper PTE, since after the prior write to the self-mapper PTE in step 602, all virtual addresses within page table space are mapped to the page table structure of the target process. Accordingly, because the self-mapper PTE is itself a process private PTE, the self-mapper PTE of the current process is no longer accessible. As an alternative, a predetermined virtual address may be reserved in shared space to also map the self-mapper PTE for this purpose. One of these two techniques must be employed because the current self-mapper PTE ceased to be in the current virtual address space at its normal virtual address once it was modified to point to the target process's page table structure.

In the alternative example embodiment in which at step 602 the PTBR value was modified to point to the page table structure of the target process, restoration of the current process's private space (and corresponding process private PTEs) is accomplished by writing the PTBR with the PFN of the current process's highest level page table page.

The DIOBM Data Structure as Used to Facilitate I/O Accesses

As described above, the virtual address space of the process is related to physical memory by a tree-structured collection of page tables as described with regard to FIG. 8. Each page of virtual memory is mapped to physical memory by its specific page table entry in a specific page table for that process. The page tables for a process virtual address space are themselves contained in the virtual address space of the process. As a result the page tables that map the process private portion of the virtual address space of the given process are accessible only if the associated process is currently executing.

Such an arrangement presents a problem for I/O devices. High performance I/O devices need to be able to perform data transfers directly between the I/O device and the virtual memory of the given process.

Referring now to FIG. 26, a computer system such as that illustrated in FIG. 1 is shown to additionally include I/O device 648. Note, that for the present discussion, memory 14 is shown to include a process private memory portion 640, and a shared memory portion 642. The process memory portion includes data stored in I/O data buffer 647. This data represents data that is to be modified by an I/O device 648. A copy of the data that is to be modified is shown for example in I/O buffer 649.

The shared portion of memory 642 is shown to include a direct I/O buffer map (DIOBM) data structure 645 and a diobm ceiling cell 646. Because these values are stored in shared memory, they are available to any process executing on the CPU, and to any other device coupled to system bus 12, such as I/O device 648. As will become apparent from reading the specification, the DIOBM data structure is used to facilitate I/O transfers in the present embodiment of the invention, while the diobm ceiling cell 646 is used to select a method of physical I/O addresses translation.

The I/O subsystem and device drivers use the physical page frame number (PFN) stored in the process PTEs to enable the I/O devices to map the process virtual memory addresses into physical memory. Once such an I/O transfer is initiated, it must be able to proceed under the control of the I/O device without the continued involvement of the initiating process and especially if the initiating process is not current any more.

However, because the PTEs for process private space are stored in private space, when the process is switched out the PTE is no longer available to provide for physical to virtual address translation. Therefore, a solution must be provided that gives the I/O device drivers access to the PTEs to allow for them to correctly complete their accesses after the current process has swapped out.

According to one embodiment of the invention, there are three different methods that may be used to provide PTE access to I/O device drivers. Each of the three methods provides optimum performance for a given transfer size; however, the advantages to the three are particular to the associated size.

In determining which of the three methods to use to provide PTE access to the I/O driver, a common data structure, called the direct I/O buffer map (DIOBM) is used. The DIOBM data structures have three types: a fixed size DIOBM structure, a variably size DIOBM structure, and a SPTE window type DIOBM data structure.

Referring now to FIG. 27, an example of a fixed size DIOBM data structure layout is shown. A fixed size DIOBM data structure 650 is shown to include a reserved field 652 (the function of which will be described later herein), a count field 654, a subtype field 655, a type field 656, a fixed sized field 657, a flags field 658, and a vector of PTE copies 660.

The size of the DIOBM data structure is 88 bytes, including 8 bytes each for each of the stored PTEs and additional bytes for the counts, flags, etc. The maximum value of 9 stored PTEs was selected because it is sufficient to handle the majority of I/O requests, although the majority of requests are mapped by 1, 2 or 3 PTEs.

The reserved field 652 is used for storing a pointer to other DIOBM data structures as will be described in more detail below. The count field 654 is for storing a count of the number of PTEs that are stored as the vector of PTE copies 660. The subtype and type fields, 655 and 656 respectively, are common fields to all types of Virtual Memory System (VMS) data structures, and store unique identifiers for every type of privileged data structure. In the present embodiment, the 'type' field identifies the data structure as a 'miscellaneous' type of data structure of subtype DIOBM.

The fixed size value field 657 stores the value 88 which is the total size of a fixed size DIOBM structure. The size field is also a common field to all types of VMS data structures, and is written to when the structure is allocated from shared memory and is read when the structure is deallocated and returned to the pool of available memory. As mentioned above, the present embodiment the fixed size value used was 9 PTE vectors, although it should be readily understood that that number may be increased or decreased depending upon the requirements of the I/O subsystem and the constraints of the memory address space.

The flags field includes the following flags: WINDOW, AUX_INUSE, and REL_DALLOC, among others. For a fixed size DIOBM data structure, none of these flags are set, and thus the function of these flags will be described with relation to the other types of data structures.

Thus the DIOBM data structure 650 is a small fixed size data structure that can be imbedded in various I/O control data structures with minimal impact on system memory consumption. A DIOBM can also be separately allocated from shared system space memory by a device driver as needed.

If the PTEs needed to map the range of virtual memory spanned by the I/O transfer fit into the fixed size DIOBM, the PTEs are copied into the vector field 660 of the DIOBM data structure 650. The device drivers in the I/O subsystem are given a pointer to the PTEs within the DIOBM and subsequently access the PTE copies within the DIOBM as if they were accessing the page table.

However, if the number of PTEs needed to map the I/O transfer exceeds the capacity of the fixed size DIOBM, a decision must be made as to whether to generate a second, variably sized DIOBM or whether to use a different method of PTE translation.

A variably sized DIOBM is a DIOBM can be used to store any number of PTE vectors. The variably sized DIOBM is typically used for very large and fairly atypical I/O transfers. However, there are some drawbacks to the use of the variably sized DIOBM data structure. First, the system memory consumption of a variable size DIOBM is directly proportional to the size of the I/O transfer; therefore, consideration must be given as to whether or not system resources should be allocated to storing these PTEs. Second, the performance impact required to copy the necessary PTEs is also proportional to the I/O transfer size and will begin to dominate other performance costs as the transfer size increases.

Accordingly, a ceiling or limit must be established on the number of PTEs that should be stored in the variably sized DIOBM data structure. The ceiling value is stored in a system-wide data cell 646 (see FIG. 26), and the procedure used to set the ceiling value will be discussed later herein.

If it is determined that the number of PTEs is within the ceiling value, then a variably sized DIOBM data structure will be selected for use. A variably sized DIOBM data structure is always linked to a fixed size DIOBM data structure. For example, referring now to FIG. 28, a layout of a fixed sized DIOBM structure 680 coupled to a secondary DIOBM 690 is shown.

The fixed DIOBM structure 680 includes field 682 (previously a reserved field) for storing a pointer to the secondary, variably sized DIOBM structure 690. The 'count' field 684 is set to a 0, since the 'count' field of the variably sized DIOBM will be used instead. The type, subtype and fixed size field (685,686, and 687, respectively) are identical to that described in FIG. 27. The flags field now has the AUX_INUSE set. This flag indicates that a variably sized DIOBM was dynamically created for this I/O transaction. The REL_DEALLOC flag in the flags field 698 in the variably sized DIOBM is set to indicate that the DIOBM 690 should be automatically deallocated. These flag indicate that a variably sized DIOBM data structure was dynamically created for this I/O transaction, and that the DIOBM 690 should be automatically deallocated when the I/O transaction is complete and the fixed size DIOBM data structure 680 is released.

Note that when using a variably sized DIOBM data structure, field 689 does not include any vectors for PTEs. Rather, all of the PTE vectors will be stored in field 699 of the variably sized DIOBM data structure 690.

Other fields of the secondary DIOBM data structure 690 are defined as follows. The count field 694 includes a count of PTE vectors stored in field 699. The count field 694 contains the count of PTE entries stored in the PTE vector field 699. The flags field has none of the flag values set. The actual size field 697 stores the total size of this DIOBM structure 690. It includes the bytes needed to store the vector of PTE entries plus the 16 bytes needed for the other fields (692, 694, 695, 696, 697 and 698) at the beginning of the DIOEM structure. In this embodiment, the PTE vector 699 will contain sufficient room to accommodate more than 9 PTE entries and the value stored in 697 will be greater than 88.

If the PTE count exceeds the DIOBM ceiling value stored in cell 646 (FIG. 26), or if there is currently insufficient system-dynamic memory to allocate the required secondary DIOBM, a different method of PTE translation is employed. This third method creates a window of shared system virtual address space onto the required page table pages in the private portion of the process page tables. The procedure for creating a window is similar to that described previously, however, there are some particulars with regard to the I/O transfer as will become apparent.

Referring now to FIG. 29, the procedure used to create an SPTE window onto process page tables will now be described with reference to some elements shown in FIG. 26.

At step 700a, the I/O buffer 647 in process memory with which the I/O device 648 is communicating is 'locked' into physical memory by the current process. By definition, the page table entries that map the user's buffer must be present in virtual memory since the process is current. The page table entries that map the I/O buffer are contained in one or more virtually contiguous page table pages, shown as 718 and 720 in FIG. 30.

At step 700b, the number of page tables (hereinafter referred to as NPT) needed to map the I/O buffer is calculated from the size of the I/O buffer, its alignment in virtual memory, and the number of page table entries that fit into a single page. At step 701, the NPT page table pages are 'locked' into physical memory.

At step 702, NPT virtually contiguous system page table entries are allocated. Accordingly, it can be seen that since only one SPTE is mapped for each page table page (which may include a number of PTEs), the memory consumption is small even for extremely large I/O transfers. This set of SPTEs provides the virtual to physical address mapping for a range of shared system virtual address space.

At step 704, the PFN of the first of the NPT allocated SPTEs is initialized to contain the value of the PFN of the first of the process page table pages that contain the PTEs that map the I/O buffer. In addition, all of the NPT allocated SPTEs are initialized such that the PFN of the SPTE is set to the PFN of the next process page table page. In this way, the process page tables are mapped into a range of shared system virtual address space. Effectively, this range of shared system address space becomes a 'window' into the process page tables and the PTEs that map the I/O buffer.

At step 706 a pointer within this window in shared system space is given to the device driver and the I/O subsystem. This pointer effectively points to the first PTE that maps the I/O buffer.

It should be noted that the PTE window exists only for the duration that the buffer is locked down for the I/O transaction. During the I/O buffer unlock, the system space pages used as the window on to the page table pages would be rendered invalid and then deallocated. The temporary double mapping of page tables would, therefore, evaporate.

Referring now to FIG. 30, an example block diagram of a PTE window created using the process provided in FIG. 29 is shown. The memory 710 is shown apportioned into process private memory 712 and shared memory 714. By way of example only, two SPTE entries 716a and 716b are shown, each pointing to page table pages 718 and 720, respectively. It should be understood that only 4 page table entries are shown for each page table page for ease of description only, and that in practice the page table pages are arranged as previously described in FIG. 8.

The SPTEs 716a and 716b each provide a mapping for one page of shared virtual address space. In this example, SPTE 716a maps the address 712a which is the lowest address of the PTE window 721b. Since there are two SPTEs in this example, the range of the PTE window 721b is two pages. Moreover, because the PFN field of SPTE 716a has been set to the PFN of PT1 and the PFN of SPTE 716b has been set to the PFN of PT2, an access to a system virtual address in the range of 721b results in an actual access to the process page table pages 718 and 720.

Because the PTE window is in shared system space, it can be used to access page tables in process private memory regardless of whether that page is current. The SPTEs in the shared system memory are the only additional real memory resources required to realize the window and are a small fraction of the shared system memory that would be required to contain copies of all the PTEs that map the I/O buffer.

The pointer within the window in shared system virtual outer space that is provided to the device drivers and I/O subsystem is shown as pointer 722. Note that accessing this SPTE will provide the page frame number of the page table page containing the first PTE that maps the I/O transfer.

The SPTE stack 716 thus provides a window onto the PTEs for each process may be obtained regardless of whether or not the process is current. Because only the SPTEs are stored in shared memory, a much smaller amount of memory resources are used for the I/O transfer.

In the unlikely event of insufficient SPTEs, the initiating process is suspended until additional system memory becomes available. When the initiating process is resumed, a determination is made as to whether the windowing is the still the best alternative at that time, or whether a secondary DIOBM data structure would provide the optimum solution.

Referring now to FIG. 31, a layout of-the fixed sized DIOBM structure when a PTE window is created using SPTEs is shown. Field 742 is unused. Field 744 now includes a count of the SPTEs that are allocated for the I/O transaction. Field 747 contains the size of a fixed size DIOBM which is 88 bytes in this embodiment. The flag bit PTE_WINDOW is set in flag field 748. Field 749 stores a pointer (such as the address of SPTE 716a in FIG. 30) to the first system PTE that is allocated. Field 750 stores the system virtual address that is mapped by system PTE pointed to by 749. This is the lowest address for the PTE window (such as address 712a in FIG. 30). The remaining space 751 in the fixed size DIOBM 740 is reserved.

Regardless which method is employed, the fixed size DIOBM data structure, the variably sized DIOBM data structure, or the windowing method, the I/O subsystem and device drivers are given a pointer within shared system virtual address space to the required PTE values. In all cases, the fixed size DIOBM data structure serves as the common handle. When the I/O transfer is completed, this DIOBM data structure is passed to a single system routine that deallocates the secondary DIOBM or deallocates the SPTEs as appropriate.

As mentioned above, the tradeoffs must be used when determining whether to use the secondary DIOBM transfer method, or to use the PTE windowing method. The determination is made through the examination of the value of the DIOBM ceiling cell 646 (FIG. 26). Thus it is the ceiling value that dictates how the system resources are to be used to perform the I/O transfer; i.e. whether SPTEs should be used with an additional level of translation to provide a window, or whether a vector of PTE copies are to be stored.

The ceiling value is a system wide data cell for controlling the switch from the use of PTE copies method to the use of the PTE window. Performance studies have demonstrated that for large I/O transfers, the run-time overhead for the secondary DIOBM method is relatively low but rises linearly with buffer size. In contrast, the runtime overhead for the PTE window method is initially relatively high but is essentially fixed regardless of I/O transfer size. Therefore, as the buffer size increases, the overhead of the secondary DIOBM method approaches the overhead of the SPTE window method until finally the fixed overhead of the PTE window method remains lower than the continually rising cost of the secondary DIOBM data structure method.

Although the overhead of the PTE window method does not vary significantly as a function of the I/O transfer size, it is significantly higher on a multiprocessor system when compared to a uniprocessor system. This is because invalidation of the PTE window must be propagated to all processors in a multiprocessor system. Therefore, the crossover point, as a function of the PTE count, was experimentally derived for uniprocessor and multiprocessor systems.

The system wide data ceiling value 646 cell contains the maximum number of PTEs that are to be stored in a variably size DIOBM data structure. On system bootstrap, it is initialized to the appropriate value based on whether the system is a uniprocessor or multiprocessor system. For uniprocessor systems, the ceiling value is typically in the range of 94 PTEs while for multiprocessor systems, the ceiling is in the range of 430 PTEs. It should be noted, however, that the present invention is not limited to providing an initial ceiling value. Rather it is the ability to dynamically control how the I/O transfer is to be performed that is a key concept of the present invention. Thus, because the ceiling value is system wide, it may be updated at any point during execution responsive to resource availability and the requirements of the various processes.

Referring now to FIG. 32, a flow diagram illustrating the entire dynamic mapping process is provided. At step 760 a fixed sized DIOBM is obtained. Because it is of fixed size, a DIOBM can be embedded in each standard system I/O request packet. Alternatively, a fixed size DIOBM structure can be allocated from shared memory.

At step 761, the number of PTEs that are required to map the I/O buffer are computed. The number of PTEs is a function of the size of the I/O transfer, the page alignment of the starting virtual address of the I/O buffer, and the page size.

At step 762 the computed number of PTEs required to map the I/O buffer is compared against the number of PTEs that can be contained in a fixed size DIOBM. As mentioned previously, in the present embodiment, a value of 9 is used, though other values may also be effective.

At step 763 if the computed number of PTEs will fit into the fixed size DIOBM, the PTEs are copied into the PTE vector, and at step 770, a pointer to the DIOBM is passed to the I/O driver.

If at step 762 it was determined that the computed number of PTEs exceeded the capacity of a fixed size DIOBM, then at step 764, the computed number is compared against the DIOBM ceiling value stored in cell 646 (FIG. 26).

If the computed number of PTEs is less than or equal to the ceiling value at step 766a it is then determined if there is sufficient shared system memory to create a sufficiently sized secondary DIOBM. If there is sufficient shared system memory, at step 766b, a secondary DIOBM is created, linked into the fixed size DIOBM data structure as shown in FIG. 28, the PTEs that map the I/O buffer are copied to the PTE vector in the secondary DIOBM, and a pointer to the secondary DIOBM is passed to the I/O driver.

If, at step 764, it is determined that the computed number of PTEs is grater than the ceiling value, or if at step 766a, there is insufficient shared system memory for a sufficiently sized secondary DIOBM structure, then at step 765 it is determined if there are sufficient system PTEs to create a sufficiently sized PTE window. That is, a set of SPTEs is required such that there is one SPTE for each process page table page containing the PTEs that map the I/O buffer. When there are sufficient SPTEs, at step 768 the SPTE widow is created as described in FIG. 29, and the fixed size DIOBM structure is initialized as shown in FIG. 31. Then, at step 770, a pointer within the created PTE window in shared system space is passed to the I/O driver.

While the example embodiments have been described as allocating virtual memory from low virtual addresses into higher virtual addresses, and deallocating virtual memory from higher virtual addresses into lower virtual addresses, it will be evident to one skilled in the art that the principles of the invention herein disclosed apply to alternative embodiments in which the allocated virtual addresses of a process grow from higher into lower virtual addresses, and are deallocated from higher virtual addresses into lower virtual addresses. The modifications required by such alternative embodiments will be well apparent to those skilled in the art upon reference to this description.

In addition, while the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

What is claimed is:

1. A virtual memory system comprising:
   a virtual address space formed by implementation of a subset of a full range of virtual addresses permitted by a virtual address size, such that the virtual address space has at least one gap of permanently inaccessible virtual addresses, among accessible virtual addresses within said virtual address space;
   a virtual memory allocation routine, responsive to a request for allocation of additional page table entries for accessible virtual addresses by a currently executing process, said request including a byte length and associated with a first free virtual address, for providing a starting address of a range of additional accessible virtual addresses to said currently executing process;
   a gap limit equal to a lowest virtual address greater than said permanently inaccessible range of virtual addresses within said virtual address space;
   means, within said virtual memory allocation routine, for calculating an end address of said request equal to a sum of said first free virtual address plus said byte length; and
   means, within said virtual memory allocation routine, for determining if said end address is within said permanently inaccessible range of virtual addresses, and for setting said starting address to said gap limit if said end address is within said permanently inaccessible range of virtual addresses.

2. The virtual memory system as in claim 1, further comprising:
   a gap base equal to a lowest virtual address within said permanently inaccessible range of virtual addresses within said virtual address space;
   means, within said virtual memory allocation routine, for determining whether said first free virtual address is less than said gap base;
   means, within said virtual memory allocation routine, for determining whether said end address is greater than said gap limit; and
   means, within said virtual memory allocation routine, for setting said starting address to said gap limit if said first free virtual address is less than said gap base and said end address is greater than said gap limit.

3. The virtual memory system as in claim 2, wherein said virtual memory allocation routine further comprises:
   means for setting said starting address to said first free virtual address if said first free virtual address and said end address are both less than said gap base.

4. The virtual memory system as in claim 3, wherein said virtual memory allocation routine further comprises:
   means for setting said starting address to said first free virtual address if said first free virtual address and said end address are both greater than or equal to said gap limit.

5. A virtual memory system comprising:
   a virtual address format having a length of m bits, where bits 0 through n−1 of said m bits map said virtual address to a physical address, and where bits n through m−1 contain all zeros or all ones to match said value of bit n−1;
   a virtual address space having a range between a lowest virtual address of all zeros and a highest virtual address equal to all ones;
   a gap of permanently inaccessible virtual addresses, within said virtual address space, located between said highest virtual address and said lowest virtual address, and having a size equal to 2m−2n; and
   said virtual address space comprising a first system virtual address space and a second system virtual address space;
   said first system virtual address space defined between a first limit address value, and a second limit address value, and comprising a permanently inaccessible virtual address space region and a shared virtual address space region;
   said second system virtual address space comprising a first region and a second region;
   said first region located between said lowest virtual address of all zeros and a first region highest virtual address sequentially next to said first limit address value, wherein the bits n through m−1 of said first limit address value all have the same value as the n−1th bit of said first region highest virtual address value;
   said second region located between said highest virtual address of all ones and a second region lowest virtual address sequentially next to said second limit address value, wherein the bits n through m−1 of said second limit address value all have the same value as the n−1th bit of said second region lowest virtual address value;

one of said first and second regions of said second system virtual address space defining a permanently inaccessible virtual address space region contiguous with said first system permanently inaccessible virtual address space region, and the other of said first and second regions of said second system virtual address space defining a shared access virtual address space region contiguous with said first system shared access virtual address space region; and a virtual memory allocation routine, responsive to a request for additional accessible virtual memory by a currently executing process, for providing a starting address of additional accessible virtual addresses.

6. A virtual memory system comprising:

a virtual address format having a length of m bits, where bits 0 through n−1 of said m bits map said virtual address to a physical address, and where bits n through m−1 contain all zeros or all ones to match said value of bit n−1;

a virtual address space having a range between a lowest virtual address of all zeros and a highest virtual address equal to all ones;

a gap of permanently inaccessible virtual addresses, within said virtual address space, located between said highest virtual address and said lowest virtual address, and having a size equal to 2m−2n;

a virtual memory allocation routine, responsive to a request for additional accessible virtual memory by a currently executing process, for providing a starting address of additional accessible virtual addresses;

said request for additional accessible virtual addresses including a byte length and a first free virtual address;

a gap limit equal to a lowest virtual address greater than said permanently inaccessible range of virtual addresses within said virtual address space;

means, within said virtual memory allocation routine, for calculating an end address of said request equal to the sum of said first free virtual address and said byte length; and means, within said virtual memory allocation routine, for determining if said end address is within said permanently inaccessible range of virtual addresses, and for writing said gap limit value to said starting address if said end address is within said permanently inaccessible range of virtual addresses.

7. The virtual memory system as in claim 6, further comprising:

a gap base equal to a lowest virtual address within said permanently inaccessible range of virtual addresses within said virtual address space;

means, within said virtual memory allocation routine, for determining whether said first free virtual address is less than said gap base;

means, within said virtual memory allocation routine, for determining whether said end address is greater than or equal to said gap limit; and means, within said virtual memory allocation routine, for setting said starting address to said gap limit if said first free virtual address is less than said gap base and said end address is greater than or equal to said gap limit.

* * * * *